(12) United States Patent
Yoshida et al.

(10) Patent No.: US 7,246,180 B1
(45) Date of Patent: Jul. 17, 2007

(54) CONNECTION-CONFIRMABLE INFORMATION PROCESSING SYSTEM, CONNECTION-CONFIRMABLE INFORMATION PROCESSING APPARATUS, INFORMATION PROCESSING METHOD BY WHICH CONNECTION IS CONFORMABLE, RECORDER, RECORDING SYSTEM, RECORDING METHOD, METHOD FOR RECOGNIZING CORRESPONDENCE BETWEEN NODE AND TERMINAL, COMPUTER, TERMINAL, AND PROGRAM RECOR

(75) Inventors: Junji Yoshida, Neyagawa (JP); Chiyoko Matsumi, Suita (JP); Yukio Kurano, Higashiosaka (JP); Tatsuro Juri, Osaka (JP); Akira Iketani, Higashiosaka (JP); Masazumi Yamada, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/744,885

(22) PCT Filed: Jul. 28, 1999

(86) PCT No.: PCT/JP99/04033

§ 371 (c)(1),
(2), (4) Date: Jan. 31, 2001

(87) PCT Pub. No.: WO00/07111

PCT Pub. Date: Feb. 10, 2000

(30) Foreign Application Priority Data

| Jul. 31, 1998 | (JP) | ................................ 10/217274 |
| Dec. 14, 1998 | (JP) | ................................ 10/354991 |
| Mar. 19, 1999 | (JP) | ................................ 11/059412 |
| May 14, 1999 | (JP) | ................................ 11/133611 |

(51) Int. Cl.
*G06F 3/00* (2006.01)
*G06F 13/00* (2006.01)
*G06F 13/28* (2006.01)

(52) U.S. Cl. ................ 710/15; 710/3; 710/5; 710/8; 710/10; 709/208

(58) Field of Classification Search ............ 710/3, 710/5, 8, 10, 15, 19; 709/208
See application file for complete search history.

(56) References Cited

U.S. PATENT DOCUMENTS

| 6,421,069 B1 * | 7/2002 | Ludtke et al. ............ 715/762 |
| 6,425,019 B1 * | 7/2002 | Tateyama et al. .......... 710/11 |
| 6,580,827 B2 * | 6/2003 | Ueda ..................... 382/232 |
| 6,587,477 B1 * | 7/2003 | Takeda et al. ............ 370/468 |
| 6,603,737 B1 * | 8/2003 | Fukunaga et al. ......... 370/229 |
| 6,611,537 B1 * | 8/2003 | Edens et al. ............. 370/503 |
| 6,691,150 B1 * | 2/2004 | Yoshino et al. ........... 709/201 |
| 6,829,225 B2 * | 12/2004 | Staats .................. 370/255 |
| 6,973,087 B2 * | 12/2005 | Lym et al. ............... 370/394 |

FOREIGN PATENT DOCUMENTS

| EP | 0 821 359 | 1/1998 |
| JP | 4-57139 | 2/1992 |
| JP | 4-250551 | 9/1992 |
| JP | 4-291427 | 10/1992 |
| JP | 8-137781 | 5/1996 |
| JP | 9-237243 | 9/1997 |
| JP | 9-282263 | 10/1997 |
| JP | 9-293332 | 11/1997 |
| JP | 10-116240 | 5/1998 |
| JP | 10-187581 | 7/1998 |

OTHER PUBLICATIONS

Japanese search report for PCT/JP99/04033 dated Nov. 24, 1999.
English translation of Form PCT/ISA/210.

* cited by examiner

*Primary Examiner*—Kim Huynh
*Assistant Examiner*—Scott Sun
(74) *Attorney, Agent, or Firm*—RatnerPrestia

(57) ABSTRACT

The connection verifiable information processing system of the invention comprises: a system service 5 which outputs a first transmit request to request an output of connection information, and which processes response information to the first request, the response information being described following a first format; a WDM driver 7 which outputs a second request to request an output of connection information, and which receives response information described following a second format that a WDM compliant device 8 outputs in response to the second transmit request, while remaining unresponsive to the first transmit request; and a second FSD 13 which converts the response information described following the second format received by the WDM driver 7 into response information of the first format that the system service can process.

26 Claims, 25 Drawing Sheets

1502a, 1502b  DV
1503a, 1503b  RECORDING AND PLAYBACK CIRCUIT
1504a, 1504b  IEEE 1394 INTERFACE
1505, 1505a, 1505b  DATA
1506a, 1506b  MONITOR
1507a, 1507b  REPRODUCED VIDEO IMAGE
1508a, 1508b  CHANGE INSTRUCTION 1702a, 1702b DV
1703, 1703a, 1703b IDENTIFYING INFORMATION
1704a, 1704b IEEE 1394 INTERFACE
1705a, 1705b INPUT CIRCUIT
1706a, 1706b MEMORY
1707a, 1707b CONTROL CIRCUIT 1801a, 1801b DV
1802a, 1802b CONTROL CIRCUIT
1803a, 1803b DISPLAY CIRCUIT
1804a, 1804b MEMORY

Fig. 24 PRIOR ART

| | | BEFORE RESTART | AFTER RESTART |
|---|---|---|---|
| DV 502a | NODE ID | 1 | 2 |
| | DEVICE NUMBER | 0 | 1 |
| DV 502b | NODE ID | 2 | 1 |
| | DEVICE NUMBER | 1 | 0 |

Fig. 25

| | | BEFORE RESTART | AFTER RESTART |
|---|---|---|---|
| DV 402a | DEVICE NUMBER | 0 | 1 |
| | NODE UNIQUE ID | 0080458011111111h | 0080458011111111h |
| | DEVICE NAME | FIRST | FIRST |
| DV 402b | DEVICE NUMBER | 1 | 0 |
| | NODE UNIQUE ID | 0080458022222222h | 0080458022222222h |
| | DEVICE NAME | SECOND | SECOND |

CONNECTION-CONFIRMABLE INFORMATION PROCESSING SYSTEM, CONNECTION-CONFIRMABLE INFORMATION PROCESSING APPARATUS, INFORMATION PROCESSING METHOD BY WHICH CONNECTION IS CONFORMABLE, RECORDER, RECORDING SYSTEM, RECORDING METHOD, METHOD FOR RECOGNIZING CORRESPONDENCE BETWEEN NODE AND TERMINAL, COMPUTER, TERMINAL, AND PROGRAM RECOR

This Application is a U.S. National Phase Application of PCT International Application PCT/JP99/04033.

TECHNICAL FIELD

The present invention relates to: a connection verifiable information processing system; a connection verifiable information processing apparatus; a connection verifiable information processing method; a recording apparatus; a recording system; a recording method; a method of acquiring correspondence between a node and a terminal device; a computer; a terminal device; and a program recording medium.

BACKGROUND ART

Conventionally, floppy disk drive (hereinafter called FDD) units, CD-ROM drives, etc. are used as external recording devices for recording data for personal computers (hereinafter called PCs).

These external recording devices are connected to PCs via an interface called IDE or SCSI. Such external recording devices and other devices connected externally to the PC, as well as hardware internal to the PC, are controlled for operation by software called an operating system (hereinafter called OS) the representative examples of which include Windows 98, MacOS, and UNIX.

The OS employs a concept called file system for the overall management of file name, file recording date, file length, file recording location and other information relating to data (file) recorded or to be recorded on a medium of an external recording device such as an FDD or CD-ROM drive.

In the OS called Windows 98, for example, the file system employed for FDD units is called FAT (File Allocation Table) and that for CD-ROM drives is called CDFS (CD File System).

Software responsible for the file system is the file system driver (hereinafter called FSD) which is included as a part of the OS. Using the FSD, it becomes possible to perform manipulations such as recording data (file) on a medium of an external recording device and reproducing data (file) recorded thereon.

In recent years, digital interfaces based on new standards such as the IEEE 1394 standard have been introduced for PCs, enabling devices, such as a DV for recording or reproducing digital multimedia information containing video and audio data on a magnetic tape, to be connected to PCs.

Thus, when connecting an external device to a PC using an IEEE 1394 interface, the OS of Windows 98 requires the use of a driver conforming to the IEEE 1394 standard, that is, a WDM (Windows Driver Model) driver designed to WDM architecture, a new architecture different from the existing architecture.

Next, data transfers between a PC and an FDD unit and DV will be described with reference to FIG. 4 when the OS of Windows 98 is used. FIG. 4 is a diagram for explaining a connection verifiable information processing apparatus of a prior art when Windows 98 is used. The connection verifiable information processing apparatus here means the PC described above.

In FIG. 4, reference numeral 50 is the connection verifiable information processing apparatus of the prior art, 3 is a display application for displaying connection state, 5 is a system service, 6 is an I/O manager subset, 7 is a WDM driver, 8 is a WDM compliant device, 11 is an IFS manager, 12 is a first FSD, 14 is an I/O subsystem, 15 is a WDM non-compliant device driver, 16 is a WDM non-compliant device, 40 is a system virtual machine, and 20 is a display screen (monitor).

As shown in FIG. 4, the connection verifiable information processing apparatus 50 is connected to the WDM non-compliant device 16 via the WDM non-compliant device driver 15, and to the WDM compliant device 8 via the WDM driver 7.

For convenience of explanation, the following description assumes that the WDM non-compliant device 16 is an FDD unit, that is, a device for recording moving image data of digital video and audio on a floppy disk (hereinafter called FD) or reproducing the moving image data recorded thereon.

On the other hand, the WDM compliant device 8 is assumed to be a DV, that is, a device for recording moving image data of digital video and audio on a magnetic tape or reproducing the moving image data recorded thereon.

Here, when transferring contents such as document data or video data from the connection verifiable information processing apparatus 50 to the WDM non-compliant device 16 (FDD unit), the contents are transferred to the WDM non-compliant device 16 (FDD unit) via the system virtual machine 40, IFS manager 11, first FSD 12, I/O subsystem 14, and WDM non-compliant device driver 15.

Conversely, when transferring contents from the WDM non-compliant device 16 (FDD unit) to the connection verifiable information processing apparatus 50, the contents are transferred along the same route but in the opposite direction. The route along which contents are transferred between the connection verifiable information processing apparatus 50 and the WDM non-compliant device 16 (FDD unit) is referred to as the route 1.

In FIG. 4, the WDM non-compliant device driver 15 provides an interface between the connection verifiable information processing apparatus 50 and the WDM non-compliant device 16 (FDD unit), and the I/O subsystem 14 controls the file system of FAT supported by Windows 98.

The IFS manager 11 is the overall management part in order to allow the data used in the file system format to be used by application software such as a playback application. The playback application is not shown in FIG. 4. The system service 5 provides the role of an interface between the IFS manager 11 and an application such as a playback application.

On the other hand, when transferring contents such as video data from the connection verifiable information processing apparatus 50 to the WDM compliant device 8 (DV), the contents are transferred to the WDM compliant device 8 via the system virtual machine 40, I/O manager subset 6, and WDM driver 7.

Conversely, when transferring contents from the WDM compliant device 8 (DV) to the connection verifiable information processing apparatus 50, the contents are transferred along the same route but in the opposite direction. The route along which contents are transferred between the connection verifiable information processing apparatus 50 and the WDM compliant device 8 (DV) is referred to as the route 2.

Transfer of contents between the connection verifiable information processing apparatus 50 and the WDM compliant device 8 (DV) is implemented using isochronous data transfer as defined in IEEE 1394.

In that case, however, since the contents are transferred along the above-described route 2, that is, since no file system is available for the WDM compliant device 8 (DV), the data (file) recorded on a magnetic tape in the WDM compliant device 8 (DV) cannot be handled in a file format, like the data (file) recorded on an FD in the WDM non-compliant device 16 (FDD unit) is handled in a file format.

If a file system were devised for the WDM compliant device 8 (DV), and an FSD for the DV file system were used, it would not be possible to directly use the route containing the FSD, since the DV is a WDM non-compliant device as described above.

Furthermore, the route 1 is used for the transfer of contents between the connection verifiable information processing apparatus 50 and the WDM non-compliant device 16 (FDD unit) and the route 2 for the transfer of contents between the connection verifiable information processing apparatus 50 and the WDM compliant device 8 (DV), and it is not possible to transfer data laterally between the route 1 and the route 2, for example, to transfer data by connecting the WDM driver 7 with the first FSD 12.

The WDM driver 7 provides an interface between the connection verifiable information processing apparatus 50 and the WDM compliant device 8 (DV), and the I/O manager subset 6 has the function of controlling the overall operation of the WDM driver 7. The system service 5 provides not only an interface between the IFS manager 11 and an application such as a playback application, but also an interface between the I/O manager subset 6 and an application such as a playback application.

Data transfers between the connection verifiable information processing apparatus 50 and the WDM non-compliant device 16 (FDD unit) and WDM compliant device 8 (DV) have been described above with reference to FIG. 4; next, the connections between the connection verifiable information processing apparatus 50 and the WDM non-compliant device 16 (FDD unit) and WDM compliant device 8 (DV) will be described using the same FIG. 4.

As described above, when the WDM non-compliant device 16 (FDD unit) or the WDM compliant device 8 (DV) is connected to the connection verifiable information processing apparatus 50, data can be transferred between the connection verifiable information processing apparatus 50 and the WDM non-compliant device 16 (FDD unit) or the WDM compliant device 8 (DV) through the route 1 or the route 2, but if they are not connected, data cannot be transferred.

Accordingly, the connection verifiable information processing apparatus 50 examines whether or not it connects to the WDM non-compliant device 16 (FDD unit) and WDM compliant device 8 (DV).

First, a description will be given of how the connection verifiable information processing apparatus 50 examines whether or not it connects to the WDM non-compliant device 16 (FDD unit).

To examine whether or not the WDM non-compliant device 16 (FDD unit) is connected to the connection verifiable information processing apparatus 50, the system service 5 in the connection verifiable information processing apparatus 50 issues a first transmit request to the IFS manager 11 to request an output of information concerning the connection. The first transmit request is transferred from the IFS manager 11 to the WDM non-compliant device driver 15 via the first FSD 12 and I/O subsystem 14, and is output from the WDM non-compliant device driver 15.

The first transmit request output from the WDM non-compliant device driver 15 is input to the WDM non-compliant device 16 (FDD unit) if the WDM non-compliant device 16 (FDD unit) is connected to the connection verifiable information processing apparatus 50; responding to the first transmit request, the WDM non-compliant device 16 (FDD unit) outputs response information containing information concerning its own device type, i.e., FDD unit. The response information is returned to the system service 5 via the route 1.

In this way, when the response information is returned to the system service 5, it is determined that the WDM non-compliant device 16 (FDD unit) is connected to the connection verifiable information processing apparatus 50.

On the other hand, if the WDM non-compliant device 16 (FDD unit) is not connected to the connection verifiable information processing apparatus 50, the first transmit request output from the WDM non-compliant device driver 15 is not input to the WDM non-compliant device 16 (FDD unit) and, therefore, no response information is output; as a result, the connection verifiable information processing apparatus 50 does not receive any response information.

That is, no response information is returned to the system service 5. In this way, when no response information is returned to the connection verifiable information processing apparatus 50, it is determined that the WDM non-compliant device 16 (FDD unit) is not connected to the connection verifiable information processing apparatus 50.

The information concerning the connection of the WDM non-compliant device 16 (FDD unit) to the connection verifiable information processing apparatus 50 is transferred from the system service 5 to the display application 3 for display on the display screen 20 when there is a user instruction. By viewing the connection information displayed on the display screen 20, the user can verify whether or not the WDM non-compliant device 16 (FDD unit) is connected to the connection verifiable information processing apparatus 50.

Application software called "Microsoft Explorer" has been known in the prior art as a specific example of the display application 3.

Next, a description will be given of how the connection verifiable information processing apparatus 50 examines whether or not it connects to the WDM compliant device 8 (DV).

To examine whether or not the WDM compliant device 8 (DV) is connected to the connection verifiable information processing apparatus 50, the I/O manager subset 6 in the connection verifiable information processing apparatus 50 issues a second transmit request to the WDM driver 7 to request an output of information concerning the connection. The second transmit request is then output from the WDM driver 7. The second transmit request output from the WDM driver 7 is input to the WDM compliant device 8 (DV) if the WDM compliant device 8 (DV) is connected to the connection verifiable information processing apparatus 50. Responding to the thus input second transmit request, the WDM compliant device 8 (DV) outputs response information containing information concerning its own device type, i.e., DV. The response information is input to the WDM driver 7 and transferred to the I/O manager subset 6.

In this way, when the response information is returned to the I/O manager subset 6, it is determined that the WDM compliant device 8 (DV) is connected to the connection verifiable information processing apparatus 50.

On the other hand, if the WDM compliant device 8 (DV) is not connected to the connection verifiable information processing apparatus 50, the second transmit request output from the WDM driver 7 is not input to the WDM compliant device 8 (DV) and, therefore, no response information is output; as a result, no response information is returned to the I/O manager subset 6.

Further, when the WDM compliant device 8 (DV) is not connected to the connection verifiable information processing apparatus 50, the whole or part of the WDM driver 7 may not exist. In that case, the I/O manager subset 6 cannot issue the second transmit request, nor does it receive any response information.

In this way, when no response information is returned to the I/O manager subset 6, it is determined that the WDM compliant device 8 (DV) is not connected to the connection verifiable information processing apparatus 50.

As earlier described, the information concerning the connection of the WDM non-compliant device 16 (FDD unit) to the connection verifiable information processing apparatus 50 is displayed on the display screen 20 by the display application 3.

However, the information concerning the connection of the WDM compliant device 8 (DV) to the connection verifiable information processing apparatus 50 is not displayed on the display screen 20 by the display application 3.

This is because the display application 3 is a means for displaying the "connection information" processed by the system service 5 and the "information concerning the connection of the WDM compliant device 8 (DV) to the connection verifiable information processing apparatus 50" is not processed by the system service 5.

More specifically, the format of the "connection information" output from the WDM driver 7 is different from the format of the "connection information" that the system service 5 can process, and the I/O manager subset 6 does not have the function of converting the format of the "connection information" output from the WDM driver 7 into the format of the "connection information" that the system service 5 can process.

Accordingly, even if the WDM driver 7 and the I/O manager subset 6 have the "information concerning the connection of the WDM compliant device 8 (DV) to the connection verifiable information processing apparatus 50", the system service 5 cannot process the information.

As a result, even in cases where devices which can be connected or disconnected from a PC (such as a DV) can be connected to or disconnected (detached) from a PC while the PC is operating, by using an interface conforming to the IEEE 1394 standard (connecting/disconnecting of a device while the PC is operating is hereinafter called Hot Plugging), the information concerning the connection or disconnection is not displayed on the display screen 20 by the display application 3 although the WDM driver 7 can have such information. Therefore, using "Microsoft Explorer", a list of information concerning the connections of the PC and external connection devices cannot be displayed on the monitor to present hot plugging information of each device: presenting hot plugging information means that if a device is connected, the folder for that device is displayed on the monitor and, if the device is disconnected, the folder for that device is not displayed.

Next, consider the case where an existing storage device (a device corresponding to the WDM non-compliant device 16 in FIG. 4) is connected to the PC (the connection verifiable information processing apparatus 50) and the connection state of the existing storage device thus connected is displayed on the monitor by using "Microsoft Explorer" as the display application 3.

For a device icon, if the device is an FDD unit, the same FDD folder is displayed irrespective of the manufacturer of the FDD, and if the device is a CD-ROM drive, the same CD-ROM drive folder is displayed irrespective of the manufacturer of the CD-ROM drive.

Accordingly, by only viewing the monitor, the user cannot identify the manufacturer of the connected device and, if the device is the same and is from the same manufacturer, there is no knowing when the device was manufactured, that is, whether the device is a new model or an old model.

This is because the WDM non-compliant device 16 in FIG. 4 does not carry manufacturer or manufacturing date information in the response information and information concerning the manufacturer, manufacturing date, etc. is therefore not supplied to the system service 5.

"Microsoft Explorer" is an application that, if information concerning the manufacturer, manufacturing date, etc. is input and processed by the system service 5, can present a display by distinguishing not only the type of the device but also the manufacturer, manufacturing date, etc. based on the information processed by the system service 5.

Accordingly, if information concerning the manufacturer, manufacturing date, etc. is input together with the information identifying the type of the device for processing by the system service 5, then the type of the device, the manufacturer, and the date of manufacturing will be displayed on the display screen 20.

Consider here a DV as a specific example of the WDM compliant device 8. In this case, this DV outputs information concerning the type of the device, the manufacturer, the date of manufacturing, etc. upon receiving the second transmit request from the WDM driver 7; that is, the information concerning the type of the device, the manufacturer, the date of manufacturing, etc. output from the WDM compliant device 8 can be input to the WDM driver 7. This means that if this information is input and processed by the system service 5, then the information identifying not only the type of the device but also the manufacturer, manufacturing date, etc. can be displayed on the display screen 20 by "Microsoft Explorer" as the display application 3.

To summarize the above, the prior art has had the problem that the information processing means which processes response information to the first transmit request, said response information being described following the first format, that the first transmit request means which issues the first transmit request issues to request an output of connection information cannot process response information to the second transmit request, said response information being described following the second format, that the second transmit request means which issues the second transmit request issues to request an output of connection information different from that requested by the first transmit request means.

Here, the first transmit request means and the information processing means together correspond to the system service 5 in FIG. 4. The second transmit request means corresponds to the I/O manager subset 6 in FIG. 4.

On the other hand, a DV (Digital Video Cassette) using a magnetic tape has been around as a medium for storing multimedia information containing video and audio. Currently, studies are under way to connect the DV to a PC (personal computer) and use it as a computer storage medium like the existing media such as hard disks and floppy disks.

A previously proposed DV for the current TV signal (hereinafter called the SD-DV) will be shown below as a prior art example.

In FIG. 14, reference numeral 201B is a recording and playback apparatus. Reference numeral 203 is a cassette for recording data formatted, error correction coded, modulated, etc. by a recording and playback processing circuit 206B. Reference numeral 206B is the recording and playback processing circuit that applies processing such as formatting, error correction coding, and modulation on the data received via an interface 205. Reference numeral 205 is the interface which transfers data, received from an external device, to a controller 111 as well as to the recording and playback processing circuit 206B.

The operation of the recording and playback apparatus having the above configuration will be described below.

Data transmitted from the external device and received by the recording and playback apparatus 201B via the interface 205 is formatted (for data reordering, appending of auxiliary information), error correction coded, modulated, etc. by the recording and playback processing circuit 206, and then recorded on the cassette 203. The recording track format is shown in FIG. 6.

Each track is divided into ITI, Audio, Video, and Subcode sectors. The Audio sector comprises nine audio data recording packets (sync blocks) and five parity recording packets (sync blocks) for recording parity data resulting from the error correction coding of data (in this example, error correction outer code).

The Video sector comprises 135 video data recording packets (sync blocks), 11 parity recording packets (sync blocks), and a total of three VAUX recording packets (sync blocks) for recording information indicating video format, etc.

FIGS. 7(1) and 7(2) show video data recording packet formats.

The recording packet shown in FIG. 7(1) is a 25-Mbps mode DVC packet which contains DCT (discrete cosine transform) coded data in six DCT blocks ($Y_1$ to $Y_4$, $C_R$, and $C_B$). Within each DCT block, the DC component (indicated by DC in the figure) of the DCT coded data is placed in a fixed position shown in FIG. 7(1), which is followed by AC components (indicated by AC in the figure), EOB (end of block) code, etc. The EOB code is a code indicating that the DCT block contains no further data after the position where the code is placed.

On the other hand, FIG. 7(2) shows a low-rate 12.5-Mbps mode DVC packet which comprises eight DCT blocks; in this case also, within each DCT block the DC component is placed in a fixed position, as in the above case. Two-byte sync information, three-byte ID information, and eight-byte error correction inner code are appended to each recording packet.

The existing digital VTR described above is only allowed to record video and audio signals of a designated format, and if a tape on which PC file data is recorded in its original form is played back, there arises the problem that the tape is erroneously recognized or trouble occurs such as the generation of noise (the noise may destroy audio output equipment) or abnormal video output.

Furthermore, it does not provide a function such as file-by-file access which is possible, for example, with a hard disk connected to a PC, and it is therefore difficult to readily know the contents or quickly access the location of the desired contents. Japanese Patent Application No. 09-067653 is devised to solve this problem.

While the prior art allows the recording of ordinary PC data as well as DV data, as described above, the prior art has had the problem that it cannot provide the high error correction capability required for PC data when PC data usually demands a higher error correction quality than DV data does.

More specifically, in the case of video data such as DV data, if an error occurs, only a frame that is displayed for 1/30 second or a portion of the frame is disrupted and, since the resulting degradation in picture quality is virtually imperceptible to the user (viewer), it does not present much of a problem. On the other hand, in the case of PC data, if a single byte of data is in error, the file itself may not be able to be opened, and in the worst case, there may be danger that it damages the PC itself.

The above prior art refers also to a method of recording the same data a plurality of times to enhance the error correction capability, but this method is extremely inefficient from the viewpoint of recording capacity, and there has been a need for a method that can increase the error correction capability efficiently.

On the other hand, with advances in LSI technology, development of networks for transmitting video and audio information in digital form has been proceeding. Since video and audio signals must be reproduced in real time, there arises a need for a network capable of realtime transmission.

A network called IEEE 1394 is proposed as a network suited for such realtime transmission. IEEE 1394 is a serial high-speed bus system and is capable of realtime transmission since it allows synchronous transmission of data.

IEEE 1394 is mounted as an external interface in many digital video/audio apparatuses including home digital VCRs (hereinafter referred to as DVs). In a DV, for example, by using IEEE 1394, it becomes possible to control the operation of the DV from an external device or to transmit data to the DV from an external device and record and/or play back the data on the DV.

Furthermore, in personal computers (hereinafter referred to as PCs), IEEE 1394 is rapidly spreading in the world of PCs because IEEE 1394 is officially supported by Microsoft Windows 98, the standard OS.

In view of this, work has been proceeding for the fusion of PCs and digital video/audio apparatuses such as DVs.

A method of controlling the operation of a DV from a PC and a method of transmitting data from a PC to a DV and playing back the data on the DV will be described with reference to FIGS. 23 and 24.

FIG. 23 shows an example of a PC and DVs connected to an IEEE 1394 bus. In FIG. 23, reference numeral 1103 is the IEEE 1394 bus; 1104, 1504*a*, and 1504*b* are IEEE 1394 interfaces; 1108, 1108*a*, and 1108*b* are commands; 1109 is a device number; 1301 is the PC; 1502*a* and 1502*b* are the DVs; 1503*a* and 1503*b* are recording and playback circuits; 1505 is data; 1506*a* is a monitor; and 1507*a* is a reproduced video image.

FIG. 24 shows an example of node ID and device number assigned to the DV 1502*a* and DV 1502*b*.

First, a description will be given of a method of assigning the device number (1109) necessary for the PC 1301 to access the respective DVs.

On the IEEE 1394 bus 1103, a unique value called a node ID is assigned to each DV. Assume, for example, that 1 is assigned to the DV 1502*a* and 2 to the DV 1502*b*. When the number of devices connected to the IEEE 1394 bus 1103 is changed, or when a certain device explicitly causes a bus reset, the node IDs are reassigned, but in this case, each device is not always assigned the same node ID value as previously assigned.

To access the respective DVs, the PC 1301 assigns the device number (1109) to each DV when power is turned on to the PC 1301 or when the PC 1301 is newly connected to the IEEE 1394 bus 1103. In one method of assignment, if provisions are made to assign numbers 0, 1, 2, . . . in sequence to the DVs, for example, in order of increasing node IDs assigned at that time, then 0 is assigned to the DV 1502*a* and 1 is assigned to the DV 1502*b*. At this time, the node ID and the device number (1109) of each DV are as shown in the column of "BEFORE RESTART" in FIG. 24.

When the PC 1301 is restarted here, reassignment of device numbers (1109) for all DVs takes place. If, at this time, the node ID of the DV 1502*a* changes to 2 and the node ID of the DV 1502*b* changes to 1 shown in FIG. 24, then the device number 1 is assigned to the DV 1502*a* and 0 to the DV 1502*b*.

Next, the method of controlling the operation of the DV 1502*a* and DV 1502*b* from the PC 1301 will be described.

Assuming that the device number of the DV 1502*a* is 0, for example, if it is desired to instruct the DV 1502*a* to perform a particular operation, 0 as the device number (1109) corresponding to the DV 1502*a* and a command 1108 are input to the IEEE 1394 interface 1104. The IEEE 1394 interface 1104 transmits the command 1108 as a command 1108*a* via the IEEE 1394 bus 1103 to the DV 1502*a* corresponding to the received device number (1109). The IEEE 1394 interface 1504*a* receives the command 1108*a* thus transmitted to the DV 1502*a* via the IEEE 1394 bus 1103, and transfers it to a control circuit 1107*a*. The control circuit 1107*a* interprets the contents of the command 1108*a* and instructs the recording and playback circuit 1503*a* to perform the specified operation.

Next, the method of transmitting data from the PC 1301 to the DV 1502*a* will be described.

Assuming that the device number of the DV 1502*a* is 0, for example, if it is desired to transmit data 1505 to the DV 1502*a*, 0 as the device number (1109) corresponding to the DV 1502*a* and the data 1505*a* are input to the IEEE 1394 interface 1104.

Generally, the IEEE 1394 bus 1103 has a plurality of channels so that different data communications can proceed over the plurality of channels concurrently. For data communication, therefore, the channel must be specified.

Assume, for example, that the DV 1502*a* is using channel 63. At this time, to transmit the data 1505 to the DV 1502*a* designated by the device number (1109) of 0, the IEEE 1394 interface 1104 transmits the data 1505 over channel 63 on the IEEE 1394 bus 1103.

The IEEE 1394 interface 1504*a* receives the data 1505 thus transmitted to the DV 1502*a* via the IEEE 1394 bus 1103, and transfers it to the recording and playback circuit 1503*a*. The recording and playback circuit 1503*a* plays back and/or records the input data 1505. When playing back the data, the reproduced video image 1507*a* is output to the monitor 1506*a*.

If, at this time, the DV 1502*b* is using channel 63, the DV 1502*b* also can receive the data 1505 at the same time.

In the above prior art configuration, however, when the user desires to control the operation of a DV from the PC, the user is required to specify the DV whose operation is to be controlled by using the device number assigned to the DV.

The PC assigns the device number to each DV during power on, but when a plurality of DVs are connected to the IEEE 1394 bus, the device number assigned to a DV may not be the same as the device number previously assigned to the DV. The prior art, therefore, has had the problem that the user cannot distinguish the DV whose operation is to be controlled, since the user does not know which device number is currently assigned to which DV.

DISCLOSURE OF THE INVENTION

In view of the above problems of the prior art, it is an object of the present invention to provide a connection verifiable information processing system, a connection verifiable information processing apparatus, and a connection verifiable information processing method, wherein the information processing means which can only process response information of the first format can be made to process response information of the second format corresponding to the second transmit request that the second transmit request means issues to request an output of connection information different from that requested by the first transmit request.

In view of the fact that when it is made possible to record ordinary data such as PC data in addition to conventional DV data, a higher error correction quality is required for PC data than for DV data, as previously described, it is another object of the present invention to provide a recording apparatus, a recording system, a recording method, and a program recording medium, capable of providing a sufficient error correction capability, while making use of the existing digital VTR format, and while making file-by-file access possible, when recording a data file other than video and audio signals of a prescribed digital VTR format.

In view of the above-described problems of the prior art, it is a further object of the present invention to provide a method of acquiring correspondence between a node and a terminal device, a computer, a terminal device, and a program recording medium, wherein in a network where the device number for identifying a device changes, the device whose operation is to be controlled can be distinguished in a simple manner.

One Aspect of the present invention is a connection verifiable information processing system comprising:

first transmit request means of outputting a first transmit request to request an output of connection information;

information processing means of processing at least response information for said first transmit request output by said first transmit request means, said response information being described following a first format;

second transmit request means of outputting a second transmit request to request an output of connection information;

connection information outputting means of outputting response information described following a second format in response to said second transmit request when said second transmit request output by said second transmit request means is input, while remaining unresponsive to said first transmit request output by said first transmit request means;

response information receiving means of receiving the response information described following said second format output from said connection information outputting means; and converting means of converting the response information described following said second format received by said response information receiving means into response information described following said first format that said information processing means can process, and wherein:

said information processing means processes not only the response information described following said first format returned in response to said first transmit request output from said first transmit request means, but also the response information described following said first format into which the response information described following said second format has been converted by said converting means.

Another aspect of the present invention is a connection verifiable information processing apparatus comprising:

first transmit request means of outputting a first transmit request to request an output of connection information;

information processing means of processing at least response information for said first transmit request output by said first transmit request means, said response information being described following a first format;

second transmit request means of outputting a second transmit request to request an output of connection information;

response information receiving means of receiving response information described following a second format that a connection information output device outputs in response to said second transmit request output by said second transmit request means, while remaining unresponsive to said first transmit request output by said first transmit request means; and converting means of converting the response information described following said second format received by said response information receiving means into response information described following said first format that said information processing means can process, and wherein:

said information processing means processes not only the response information described following said first format returned in response to said first transmit request output from said first transmit request means, but also the response information described following said first format into which the response information of said second format has been converted by said converting means.

Still another aspect of the present invention is a connection verifiable information processing method comprising:

a first transmit request step for outputting a first transmit request to request an output of connection information;

an information processing step for processing at least response information for said first transmit request output in at least said first transmit request step, said response information being described following a first format;

a second transmit request step for outputting a second transmit request to request an output of connection information;

a response information receiving step for receiving response information described following a second format that a connection information output device outputs in response to said second transmit request output in said second transmit request step, while remaining unresponsive to said first transmit request output in said first transmit request step; and converting step for converting the response information described following said second format received in said response information receiving step into response information described following said first format that can be processed in said information processing step, and wherein:

said information processing step processes not only the response information described following said first format returned in response to said first transmit request output in said first transmit request step, but also the response information described following said first format into which the response information described following said second format has been converted in said converting step.

Yet another aspect of the present invention is a recording apparatus for recording a digital video/audio encoded signal of a prescribed format and data other than said digital video/audio encoded signal on a recording medium in units of the prescribed recording packets comprising:

input data discriminating means for discriminating an input signal to determine whether said input signal is said digital video/audio encoded signal or data other than said digital video/audio encoded signal;

first error correction coding means for applying first error correction coding to said digital video/audio encoded signal when said digital video/audio encoded signal is input;

second error correction coding means for applying second error correction coding to input data when said data other than said digital video/audio encoded signal is input, and for generating parity; and recording means for recording (1) said digital video/audio encoded signal and (2) said data and said parity, and wherein:

when data other than said digital video/audio encoded signal is input, said data is processed with said first error correction coding in said first error correction coding means after being processed with said second error correction coding in said second error correction coding means.

Still yet another aspect of the present invention is a recording apparatus for recording a digital video/audio encoded signal of a prescribed format and data other than said digital video/audio encoded signal on a recording medium in units of prescribed recording packets, comprising:

input data discriminating means for discriminating an input signal to determine whether said input signal is said digital video/audio encoded signal or data other than said digital video/audio encoded signal;

first error correction coding means for applying first error correction coding to said video/audio encoded signal when said digital video/audio encoded signal is input;

third error correction coding means for applying, instead of said first error correction coding, more powerful third error correction coding to input data when said input data is data other than said digital video/audio encoded signal, and for generating parity; and recording means for recording (1) said digital video/audio encoded signal and (2) said data and said parity.

A further aspect of the present invention is a recording method for recording a digital video/audio encoded signal of a prescribed format and data other than said digital video/audio encoded signal on a recording medium in units of prescribed recorded packets, wherein when said video/audio encoded signal is input, said video/audio encoded signal is recorded on said recording medium after applying first error correction coding, and when data other than said video/audio encoded signal is input, said data is recorded on said recording medium after applying second error correction coding together with said first error correction coding and generating parity.

A still further aspect of the present invention is a recording method for recording a digital video/audio encoded signal of a prescribed format and data other than said digital video/audio encoded signal on a recording medium in units of prescribed recording packets, wherein when said video/audio encoded signal is input, said video/audio encoded signal is recorded on said recording medium after applying first error correction coding, and when data other than said video/audio encoded signal is input, said data is recorded on said recording medium after applying, instead of said first error correction coding, more powerful third error correction coding and generating parity.

A yet further aspect of the present invention is a method of acquiring correspondence between a node and a terminal device, which uses a system comprising a computer connected to a network and a plurality of terminal devices connected to said network, wherein when said computer sends a command for driving or stopping a driving of said terminal device into said network, said computer sends out said command while sequentially changing an automatically assigned node number other than the node number of said computer, and said terminal device that received said command starts driving or stops driving.

A still yet further of the present invention is a method of acquiring correspondence between a node and a terminal device according to the another embodiment of the present invention, wherein said driving or said stopping of the driving is monitored, correspondence between the node number sent out together with said command and a timing of said driving or said stopping of the driving based on the timing of the command thus sent out is recognized, and the correspondence between said each node number and said each terminal device is acquired from the result of said recognition.

An additional aspect of the present invention is a method of acquiring correspondence between a node and terminal device according to another embodiment of the present invention, wherein said driving or said stopping of the driving is monitored, correspondence between the node number sent out together with said command and a timing of said driving or said stopping of the driving based on the timing of the command thus sent out is recognized, and the terminal device corresponding to the desired node number is sought from the result of said recognition.

A further additional aspect of the present invention is a method of acquiring correspondence between a node and a terminal device according to other embodiments of the present invention, wherein said terminal device includes illuminating means, and said driving or said stopping of the driving, respectively, means turning on or turning off said illuminating means.

A still further additional aspect of the present invention is a method of acquiring correspondence between a node and a terminal device according to other embodiments of the present invention, wherein said driving means that said terminal device supplies said computer with identifying information with which said terminal device can be identified uniquely, correspondence between the timing of a command for supplying said identifying information and the node number of said command sent out at said timing is recognized, and the correspondence between said each node number and said each terminal device is acquired from the result of said recognition.

A yet further additional aspect of the present invention is a method of acquiring correspondence between a node and a terminal device according to other embodiments of the present invention, wherein said driving means that said terminal device supplies said computer with identifying information with which said terminal device can be identified uniquely, correspondence between the timing of a command for supplying said identifying information and the node number of said command sent out at said timing is recognized, and the terminal device corresponding to the desired node number is located based on the result of said recognition.

A still yet further additional aspect of the present invention is a method of acquiring correspondence between a node and a terminal device according to other embodiments of the present invention, wherein when said network is first reset, said computer creates a list carrying said identifying information and/or a name designating said terminal device in corresponding relationship to said node number on the basis of said identifying information received from said terminal device, and each time said network is reset thereafter, said computer updates said list, and the correspondence between said each node number and said each terminal device is acquired by referencing said list.

A supplemental aspect of the present invention is a method of acquiring correspondence between a node and a terminal device according to other embodiments of the present invention, wherein said identifying information is a node unique ID.

A further supplemental aspect of the present invention is a method of acquiring correspondence between a node and a terminal device, which uses a system comprising a computer connected to a network and a plurality of terminal devices connected to said network, wherein when said computer sends data to be played back on said terminal device into said network, said computer sends out said data while sequentially changing an automatically assigned node number other than the node number of said computer, and said data is played back on said terminal device that received said command.

A still further supplemental aspect of the present invention is a method of acquiring correspondence between a node and a terminal device according to other embodiments of the present invention, wherein said playback is monitored, correspondence between the node number sent out together with said data and the timing for playing back said data is recognized, and the correspondence between said each node number and said each terminal device is acquired from the result of said recognition.

A yet further supplemental aspect of the present invention is a method of acquiring correspondence between a node and a terminal device according to other embodiments of the present invention, wherein said playback is monitored, correspondence between the node number sent out together with said data and a timing for playing back said data is recognized, and the terminal device corresponding to the desired node number is sought from the result of said recognition.

A still yet further supplemental aspect of the present invention is a method of acquiring correspondence between a node and a terminal device according to other embodiments of the present invention, wherein a channel used by said data is assigned in such a manner as to be able to uniquely identify said node number.

Another aspect of the present invention is a method of acquiring correspondence between a node and a terminal device according to other embodiments of the present invention, wherein said identifying information is a numeric value.

Still another aspect of the present invention is a method of acquiring correspondence between a node and a terminal device according to other embodiments of the present invention, wherein said terminal device includes display means, and said driving means displaying the node number of said terminal device on said display means.

Yet another aspect of the present invention is a method of acquiring correspondence between a node and a terminal device according to other embodiments of the present invention, wherein said terminal device is a home VCR.

Still yet another aspect of the present invention is a method of acquiring correspondence between a node and a terminal device according to other embodiments of the present invention, wherein a device number is used instead of said node number.

A further aspect of the present invention is a method of acquiring correspondence between a node and a terminal device according to other embodiments of the present invention, wherein said network is an IEEE 1394 bus.

A still further aspect of the present invention is a program recording medium having a program recorded thereon for enabling a computer to implement all or part of the functions of the method of acquiring correspondence between a node and a terminal device described in any other embodiments of the present invention.

A yet further aspect of the present invention of the present invention is a computer which uses a system comprising said computer connected to a network and a plurality of terminal devices connected to said network, said computer comprising:

an input means for inputting an automatically assigned node number, other than the node number of said computer, to a terminal device having (1) a second interface which receives a command sent out from said computer via said network and (2) control means for performing control so as to execute said command received via said second interface; and a first interface which sends out a command for driving or stopping a driving of said terminal device into said network, while sequentially changing said node number input by said input means, and wherein:

said command is sent to said terminal device via said network.

A still yet further aspect of the present invention is a computer according to other embodiments of the present invention, wherein said driving or said stopping of the driving is monitored, correspondence between the node number sent out together with said command and a timing of said driving or said stopping of the driving based on the timing of the command thus sent out is recognized, and the correspondence between said each node number and said each terminal device is acquired from the result of said recognition.

An additional aspect of the present invention is a computer which uses a system comprising said computer connected to a network and a plurality of terminal devices connected to said network, said computer comprising:

a first interface which, when said network is reset, sends out a command for requesting a node unique ID to said terminal devices into said network, while sequentially changing a node number as a destination ID or by appending to said command a description as a destination ID indicating delivery to all connected devices, and said terminal device comprising (1) a second interface which receives said command sent out from said computer via said network, (2) control means for performing control so as to execute said command received via said second interface, and (3) a second memory which is referenced by said second interface and which stores said node unique ID unique to said device to be transmitted to said computer;

a first memory for storing a list carrying said node unique ID and/or a name designating said terminal device in corresponding relationship to said node number; and converting means for creating said list and storing the same in said first memory at the time of the first reset, and for updating said list for each reset thereafter, and wherein:

when said first interface sends the command for requesting said node unique ID into said network, said second interface returns said node unique ID to said first interface via said network in response to said command, said first interface receives said node unique ID sent out from said second interface via said network, said converting means creates or updates said list by using said node unique ID received from said each terminal device, and correspondence between each node and each terminal device is obtained by referencing said list.

A further additional aspect of the present invention is a computer according to other embodiments of the present invention, wherein a device number is used instead of said node number.

A yet further additional aspect of the present invention is a computer according to other embodiments of the present invention, wherein said network is an IEEE 1394 bus.

A still yet further additional aspect of the present invention is a program recording medium having a program recorded thereon for enabling a computer to implement all or part of the functions of the computer described in other embodiments of the present invention.

A supplemental aspect of the present invention is a terminal device which uses a system comprising a computer connected to a network and a plurality of said terminal devices connected to said network, said terminal device comprising:

a second interface which receives a command sent out via said network from said computer having (1) input means for inputting an automatically assigned node number other than the node number of said computer and (2) a first interface which sends out a command for driving or stopping the driving of said terminal device into said network, while sequentially changing said node number input by said input means; and control means for performing control so as to execute said command received via said second interface, and wherein:

said command is sent to said terminal device via said network.

A further supplemental aspect of the present invention is a terminal device according to other embodiments of the present invention, wherein said driving or said stopping of the driving is monitored, correspondence between the node number sent out together with said command and a timing of said driving or said stopping of the driving based on the timing of the command thus sent out is recognized, and the correspondence between said each node number and said each terminal device is acquired from the result of said recognition.

A still further supplemental aspect of the present invention is a terminal apparatus according to other embodiments of the present invention, further comprising illuminating means, and wherein said driving or said stopping of the driving, respectively, means turning on or turning off said illuminating means.

A yet further supplemental aspect of the present invention is a terminal device which uses a system comprising a computer connected to a network and a plurality of said terminal devices connected to said network, said terminal device comprising:

a second interface which, when said network is reset, receives a command sent out via said network from said computer having (1) a first interface which sends out into said network a command for requesting a node unique ID to said terminal device, while sequentially changing a node number as a destination ID or by appending to said command a description as a destination ID indicating delivery to all connected devices, (2) a first memory for storing a list carrying said node unique ID and/or a name designating said terminal device in corresponding relationship to said node number, and (3) converting means for creating said list and storing the same in said first memory at the time of the first reset, and for updating said list for each reset thereafter;

control means for performing control so as to execute said command received via said second interface; and a second memory which is referenced by said second interface and which stores its own node unique ID to be transmitted to said computer, and wherein:

when said first interface sends the command for requesting said node unique ID into said network, said second interface returns said node unique ID to said first interface via said network in response to said command, said first interface receives said node unique ID sent out from said second interface via said network, said converting means creates or updates said list by using said node unique ID received from each terminal device, and correspondence between said each node and said each terminal device is obtained by referencing said list.

A still yet further supplemental aspect of the present invention is a terminal device which uses a system comprising a computer connected to a network and a plurality of said terminal devices connected to said network, said terminal device comprising:

a second interface which receives a command sent out via said network from said computer having a first interface which sends out into said network a command for requesting said terminal device for transmission of identifying information capable of uniquely identifying said terminal device, while sequentially changing a node number as a destination ID or by appending to said command a description as a destination ID indicating delivery to all connected devices;

control means for performing control so as to execute said command received via said second interface;

a second memory which is referenced by said second interface and which stores said identifying information to be transmitted to said computer, and input means for inputting said identifying information, and wherein:

when said first interface sends the command for requesting said identifying information into said network, said second interface returns said identifying information to said first interface via said network in response to said command, and said first interface receives said identifying information sent out from said second interface via said network, and thereby obtains correspondence between said each node and said each terminal device.

Another aspect of the present invention is a terminal device according to other embodiments of the present invention, wherein said identifying information is a numeric value.

A still another aspect of the present invention is a terminal device according to other embodiments of the present invention, further comprising display means, and wherein said driving means displaying the node number of said terminal device on said display means.

A yet another aspect of the present invention is a terminal device according to other embodiments of the present invention, wherein a device number is used instead of said node number.

A still yet another aspect of the present invention is a terminal device according to other embodiments of the present invention, wherein a device number is used instead of said node number.

A further aspect of the present invention (corresponding to claim 65 of the present invention) is a terminal device according to other embodiments of the present invention, wherein said network is an IEEE 1394 bus.

A still further aspect of the present invention is a program recording medium having a program recorded thereon for enabling a computer to implement all or part of the functions of the terminal device described in other embodiments of the present invention.

A yet further aspect of the present invention is a method of acquiring correspondence between a node and a terminal device, which uses a system comprising a computer connected to a network and a plurality of terminal devices connected to said network, wherein when said computer sends into said network a command for requesting transmission of a node unique ID unique to said terminal device, said computer sends out said command by appending to said command a description as a destination ID indicating delivery to all connected devices, and said terminal device that received said command starts driving or stops driving.

BRIEF DESCRIPTION OF THE DRAWINGS

FIG. 7(2) is a diagram for explaining the data field of a recording packet used in 12.5-Mbps mode in the prior art digital VTR.

FIG. 8(2) is a diagram for explaining the data field of a recording packet used in 12.5-Mbps mode in the data recording method of the invention described in Japanese Patent Application No. 09-067653.

FIG. 24 is a list showing an example of node ID and device number assigned to DVs 1502*a* and 1502*b* according to the prior art.

FIG. 25 is a list showing an example of node unique ID, device name, and device number assigned to DVs 1402*a* and 1402*b* according to the C3rd embodiment of the present invention.

DESCRIPTION OF THE REFERENCE NUMERALS

1. SYSTEM VIRTUAL MACHINE
3. DISPLAY APPLICATION
4. CENTRAL PROCESSING APPLICATION
5. SYSTEM SERVICE
6. I/O MANAGER SUBSET
7. WDM DRIVER
8. WDM COMPLIANT DEVICE
10. CONNECTION VERIFIABLE INFORMATION PROCESSING APPARATUS
11. IFS MANAGER
12. FIRST FSD
13. SECOND FSD
14. I/O SUBSYSTEM
15. WDM NON-COMPLIANT DEVICE DRIVER
16. WDM NON-COMPLIANT DEVICE
17. DEVICE CHECKER
18. MESSAGE TRANSMITTING MEANS
20. DISPLAY SCREEN
30. INFORMATION INTERPRETING MEANS
31. MESSAGE RECEIVING MEANS
32. DEVICE INFORMATION TRANSMITTING MEANS
33. DEVICE INFORMATION ACQUIRING MEANS
34. IFS INFORMATION ACQUIRING AND TRANSMITTING MEANS
35. APP INFORMATION ACQUIRING AND TRANSMITTING MEANS
36. INFORMATION INTERPRETING MEANS
37. DEVICE CHECKER INFORMATION TRANSMITTING MEANS
40. SYSTEM VIRTUAL MACHINE
50. PRIOR ART CONNECTION VERIFIABLE INFORMATION PROCESSING APPARATUS
201, 201B. RECORDING AND PLAYBACK APPARATUS
203. CASSETTE
205, 215. INTERFACE
206, 206B. RECORDING AND PLAYBACK PROCESSING CIRCUIT
210, 210B. PERSONAL COMPUTER (PC)
211. HARD DISK (HDD)
213. CPU
214. MEMORY
100. INPUT DATA DISCRIMINATING MEANS
101. DC DATA GENERATING MEANS
102. EOB APPENDING MEANS
105. DATA FORMAT CONVERTING MEANS
106. AUXILIARY INFORMATION GENERATING MEANS
107. FIRST ERROR CORRECTION CODING MEANS
108. SECOND ERROR CORRECTION CODING MEANS
109. MODULATION/DEMODULATION CIRCUIT
110. FORMATTING MEANS
111. CONTROLLER
1101. PC
1102*a*, 1102*b*. DV
1103. IEEE 1394 BUS
1104. IEEE 1394 INTERFACE
1105*a*, 1105*b*. IEEE 1394 INTERFACE
1106*a*, 1106*b*. RECORDING AND PLAYBACK CIRCUIT
1107*a*, 1107*b*. CONTROL CIRCUIT
1108, 1108*a*, 1108*b*. COMMAND
1109. DEVICE NUMBER
1301. PC
1302*a*, 1302*b*. DV
1303*a*, 1303*b*. CONTROL CIRCUIT
1304*a*, 1304*b*. LED
1401. PC
1402*a*, 1402*b*. DV
1403. CONVERSION CIRCUIT
1404. MEMORY
1405*a*, 1405*b*. IEEE 1394 INTERFACE
1406*a*, 1406*b*. ROM
1407*a*, 1407*b*. NODE UNIQUE ID
1408. DEVICE NAME
1409. CONVERSION INFORMATION
1502*a*, 1502*b*. DV
1503*a*, 1503*b*. RECORDING AND PLAYBACK CIRCUIT
1504*a*, 1504*b*. IEEE 1394 INTERFACE 1505, 1505a, 1505b. DATA
1506a, 1506b. MONITOR
1507a, 1507b. REPRODUCED VIDEO IMAGE
1508a, 1508b. CHANGE INSTRUCTION
1702a, 1702b. DV
1703, 1703a, 1703b. IDENTIFYING INFORMATION
1704a, 1704b. IEEE 1394 INTERFACE
1705a, 1705b. INPUT CIRCUIT
1706a, 1706b. MEMORY
1707a, 1707b. CONTROL CIRCUIT
1801a, 1801b. DV
1802a, 1802b. CONTROL CIRCUIT
1803a, 1803b. DISPLAY CIRCUIT
1804a, 1804b. MEMORY

BEST MODE FOR CARRYING OUT THE INVENTION

Embodiments of the present invention will be described below with reference to drawings.

Embodiment A1

First, the configuration of a connection verifiable information processing system and a connection verifiable information processing apparatus according to an A1st embodiment of the present invention will be described with reference to FIGS. 1, 2, and 3.

Figure 1:
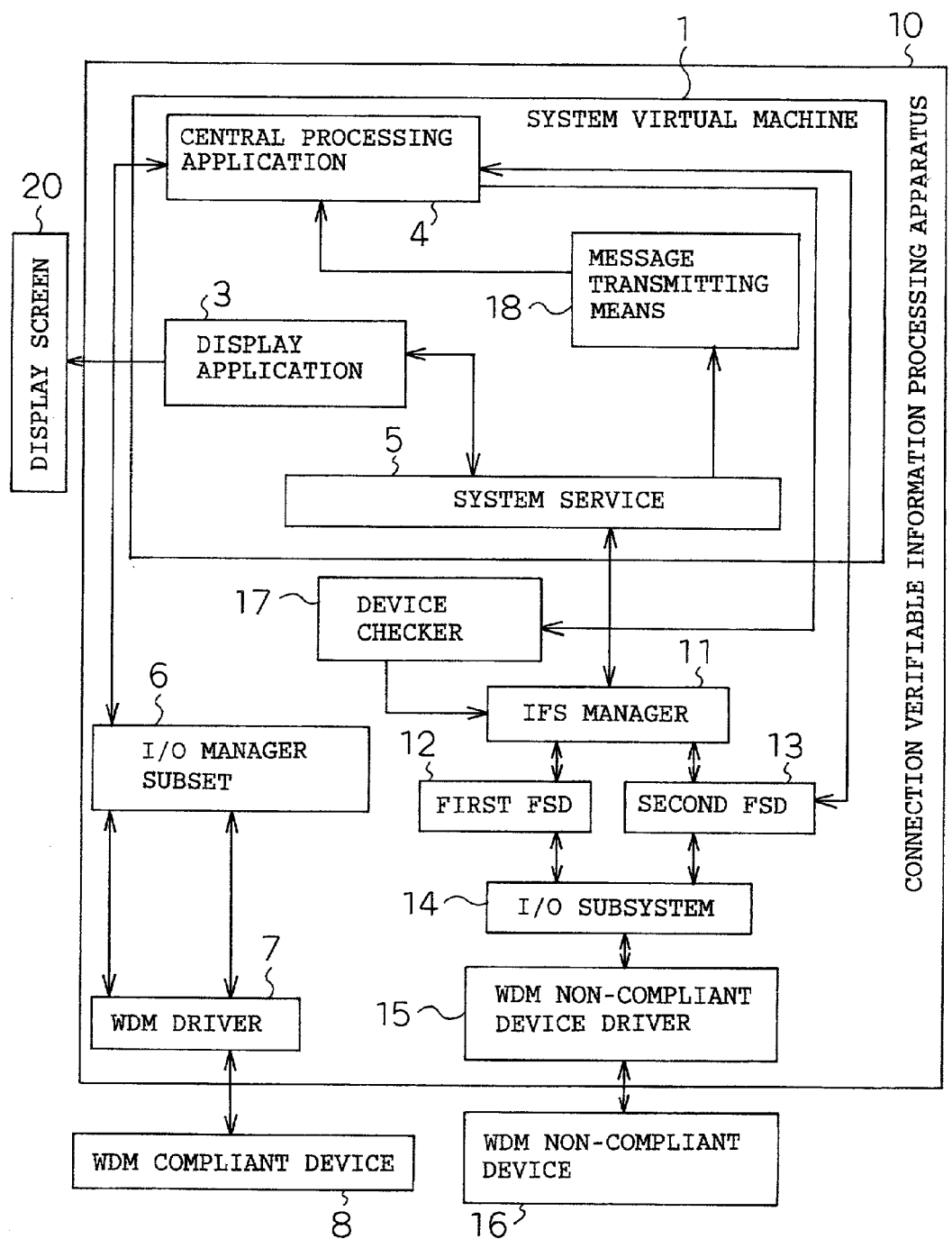
FIG. 1 is a diagram for explaining a connection verifiable information processing system and a connection verifiable information processing apparatus according to an A1st embodiment of the present invention.

FIG. 1 is a diagram for explaining the connection verifiable information processing system and connection verifiable information processing apparatus according to the A1st embodiment of the present invention.

In FIG. 1, reference numeral 10 is the connection verifiable information processing apparatus, 1 is a system virtual machine, 3 is a display application, 4 is a central processing application, 18 is a message transmitting means, 5 is a system service, 6 is an I/O manager subset, 7 is a WDM driver, 8 is a WDM compliant device, 11 is an IFS manager, 12 is a first FSD, 13 is a second FSD, 14 is an I/O subsystem, 15 is a WDM non-compliant device driver, 16 is a WDM non-compliant device, 17 is a device checker, and 20 is a display screen.

The connection verifiable information processing system according to the A1st embodiment of the present invention comprises the connection verifiable information processing apparatus 10, the WDM compliant device 8, and the WDM non-compliant device 16.

On the other hand, the connection verifiable information processing apparatus 10 according to the A1st embodiment of the present invention comprises the system virtual machine 1, the I/O manager subset 6, the WDM driver 7, the IFS manager 11, the first FSD 12, the second FSD 13, the I/O subsystem 14, the WDM non-compliant device driver 15, and the device checker 17.

The system virtual machine 1 comprises the central processing application 4, the message transmitting means 18, and the system service 5. The display application 3 is a means for displaying the "connection information" processed by the system service 5 on the display screen 20, and is an auxiliary means to the connection verifiable information processing apparatus 10.

Figure 4:
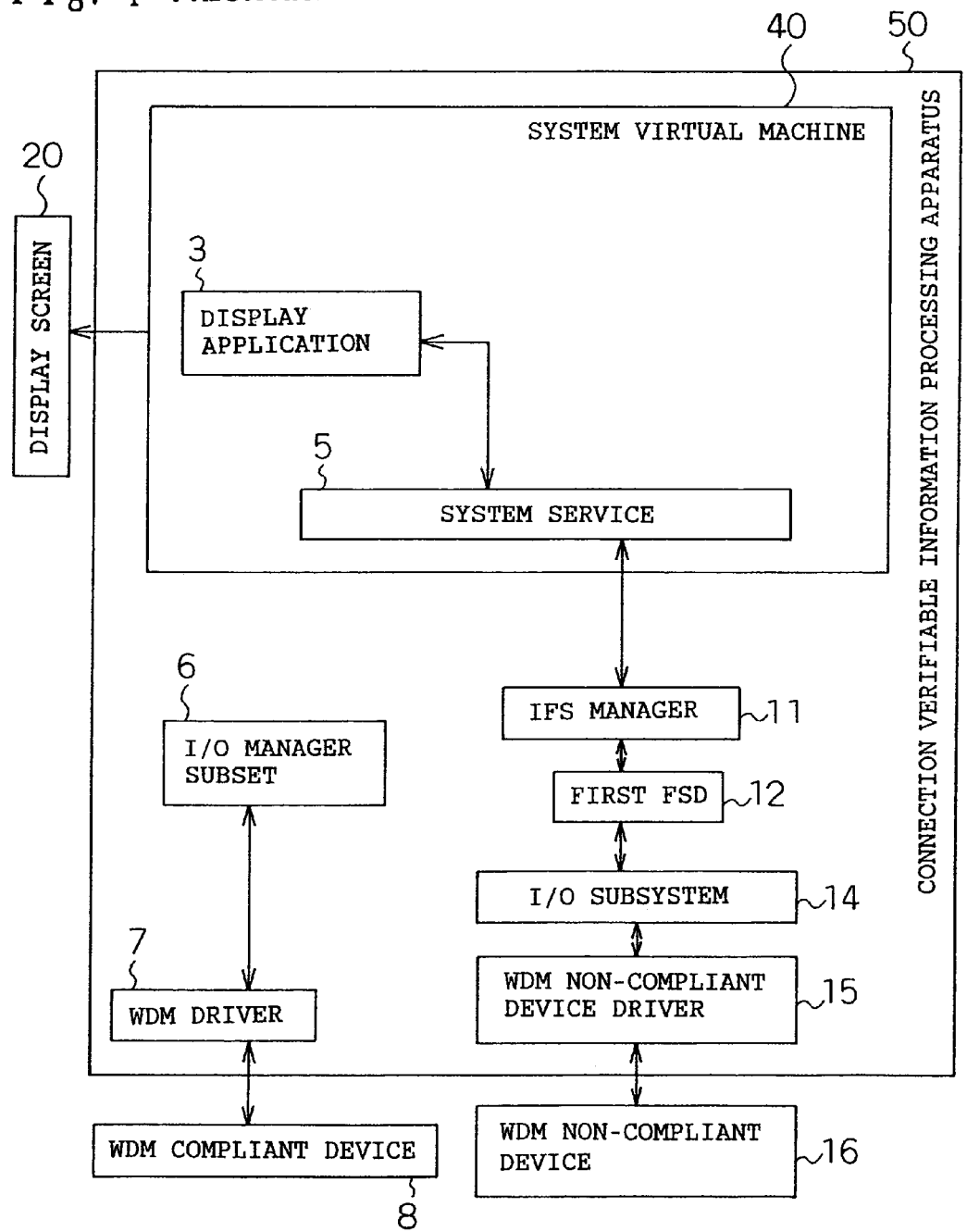
FIG. 4 is a diagram for explaining a prior art connection verifiable information processing apparatus when an OS called Windows 98 is used.

In FIG. 1, the system service 5, the I/O manager subset 6, the WDM driver 7, the IFS manager 11, the first FSD 12, the I/O subsystem 14, and the WDM non-compliant device driver 15 are the same as the respective constituent means of the prior art connection verifiable information processing apparatus 50 explained with reference to FIG. 4 in the "Description of the Prior Art".

The display application 3 also is the same as the one explained with reference to FIG. 4. Further, the WDM compliant device 8 and the WDM non-compliant device 16 are the same as the WDM compliant device 8 or the WDM non-compliant device 16, respectively, explained with reference to FIG. 4.

That is, the WDM compliant device 8 is a DV, and the WDM non-compliant device 16 is an FDD unit.

Figure 2:
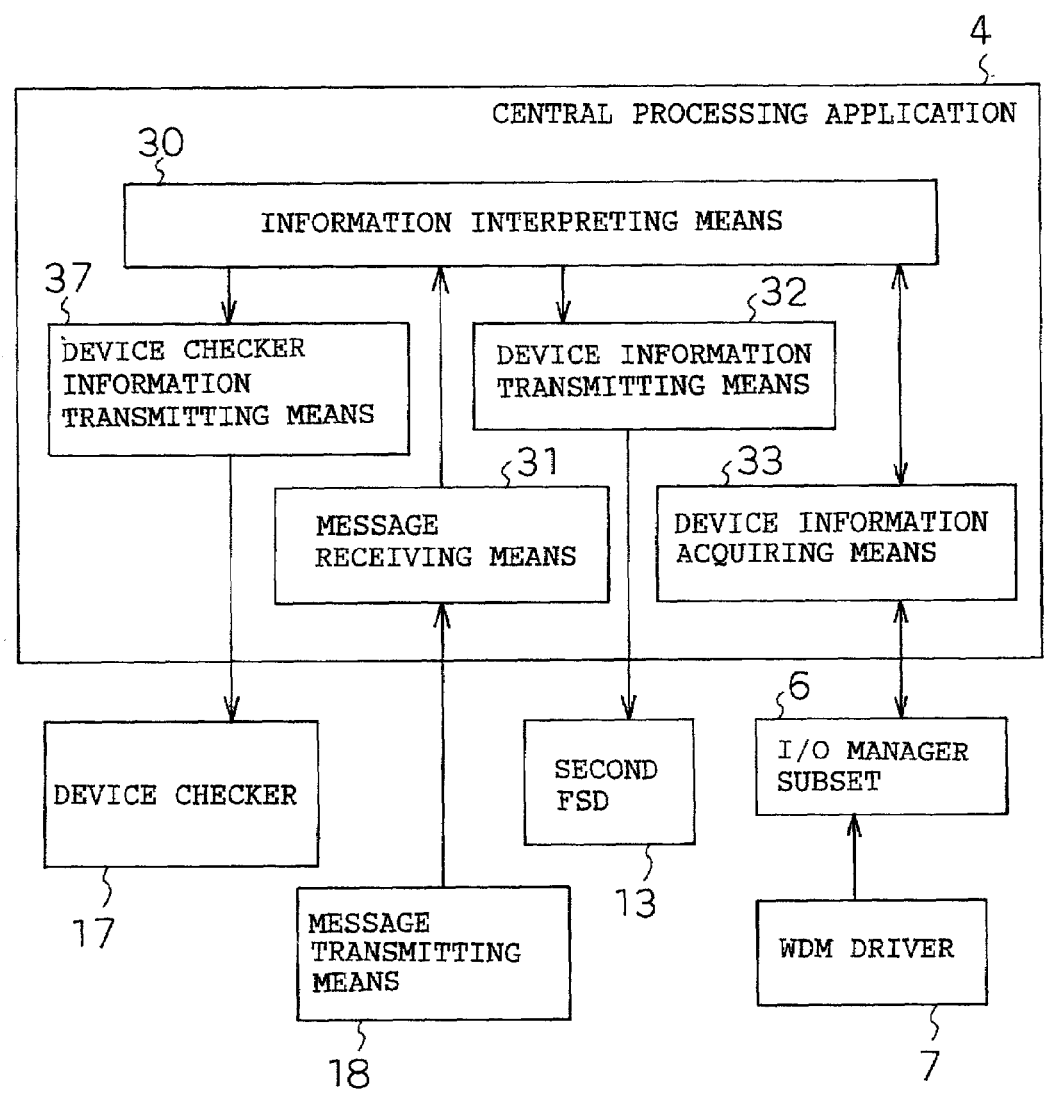
FIG. 2 is a diagram showing the configuration of a central processing application 4 in FIG. 1.

FIG. 2 is a diagram showing the configuration of the central processing application 4 in FIG. 1. In FIG. 2, reference numeral 30 is an information interpreting means, 31 is a message receiving means, 32 is a device information transmitting means, 33 is a device information acquiring means, and 37 is a device checker information transmitting means.

Figure 3:
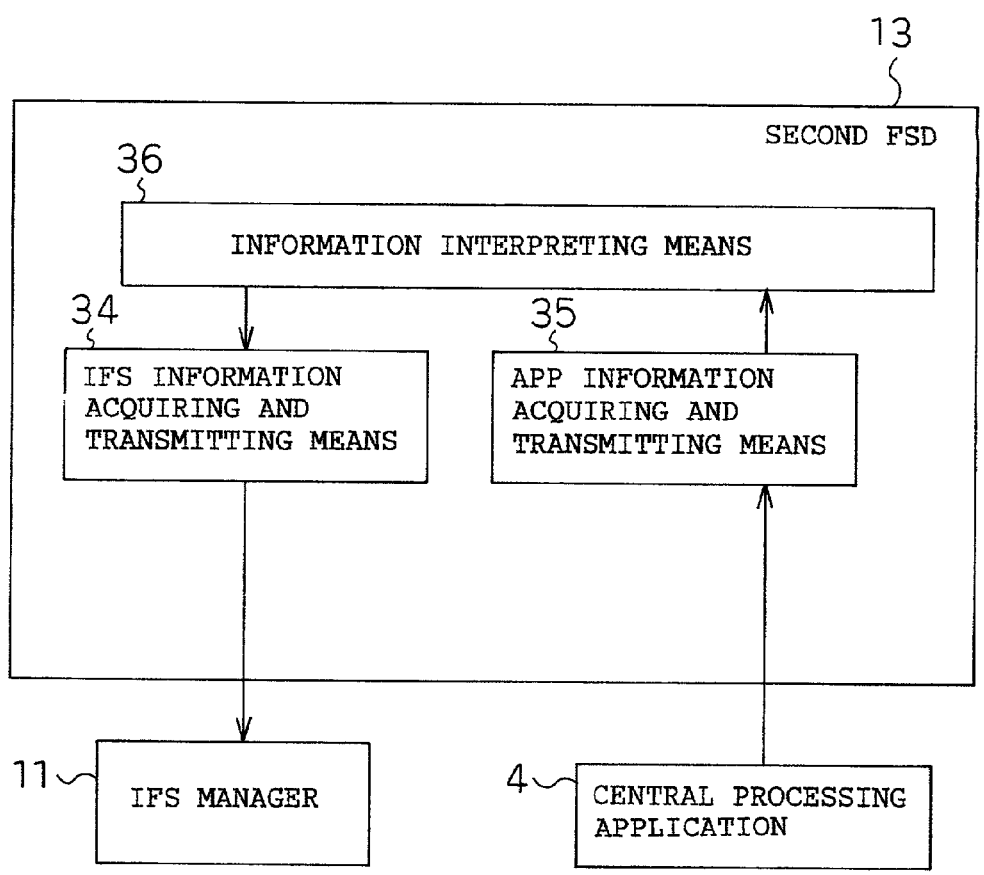
FIG. 3 is a diagram showing the configuration of a second FSD 13 in FIG. 1.

FIG. 3 is a diagram showing the configuration of the second FSD 13 in FIG. 1. In FIG. 3, reference numeral 34 is an IFS information acquiring and transmitting means, 35 is an APP information acquiring and transmitting means, and 36 is an information interpreting means.

In the A1st embodiment, the system service 5 is used as an example of the first transmit request means described in claims 1 and 2. The system service 5 is also used as an example of the information processing means. The device information acquiring means 33 in the central processing application 4 and the I/O manager subset 6 are together used as an example of the second transmit request means. The I/O manager subset 6 and the WDM driver 7 are together used as an example of the response information receiving means. Further, the information interpreting means 36 in the second FSD 13 is used as an example of the converting means.

The WDM compliant device 8 is used as an example of the connection information outputting means described in claim 1 or as an example of the connection information outputting apparatus described in claim 2. The I/O manager subset 6 is used as an example of the judging means described in claim 3. Further, the display application 3 is used as an example of the display means described in claim 10.

Next, the operation of the connection verifiable information processing system and connection verifiable information processing apparatus according to the A1st embodiment of the present invention will be described with reference to FIGS. 1, 2, and 3. The operation described hereinafter refers to the operation for transmitting "information concerning the connection of the connection verifiable information processing apparatus 10 to the WDM compliant device 8 (DV) or the WDM non-compliant device 16 (FDD unit)", not to the operation for transmitting contents. The description for the transmission of contents is therefore omitted here.

First, a description will be given of the operation performed to examine whether or not the WDM non-compliant device 16 (FDD unit) is connected to the connection verifiable information processing apparatus 10.

To examine whether or not the WDM non-compliant device 16 (FDD unit) is connected to the connection verifiable information processing apparatus 10, the system service 5 in the connection verifiable information processing apparatus 10 issues a first transmit request to the IFS manager 11 to request an output of information concerning the connection.

The first transmit request is transferred from the IFS manager 11 to the WDM non-compliant device driver 15 by passing through the first FSD 12 and the I/O subsystem 14 in this order, and is output from the WDM non-compliant device driver 15. The first transmit request output from the WDM non-compliant device driver 15 is input to the WDM non-compliant device 16 (FDD unit) if the WDM non-compliant device 16 (FDD unit) is connected to the connection verifiable information processing apparatus 10; responding to the first transmit request, the WDM non-compliant device 16 (FDD unit) outputs response information containing information concerning its own device type, i.e., FDD.

The response information is input to the WDM non-compliant device driver 15, and is returned via the I/O subsystem 14, first FSD 12, and IFS manager 11 to the system service 5 for interpretation. In this way, when the response information is returned to the connection verifiable information processing apparatus 10, it is determined that the WDM non-compliant device 16 (FDD unit) is connected to the connection verifiable information processing apparatus 10.

On the other hand, if the WDM non-compliant device 16 (FDD unit) is not connected to the connection verifiable information processing apparatus 10, the first transmit request output from the WDM non-compliant device driver 15 is not input to the WDM non-compliant device 16 (FDD unit) and, therefore, no response information is output; as a result, the connection verifiable information processing apparatus 10 does not receive any response information.

That is, no response information is returned to the system service 5. In this way, when no response information is returned to the connection verifiable information processing apparatus 10, it is determined that the WDM non-compliant device 16 (FDD unit) is not connected to the connection verifiable information processing apparatus 10.

The information concerning the connection of the WDM non-compliant device 16 (FDD unit) to the connection verifiable information processing apparatus 10 is transferred from the system service 5 to the display application 3 for display on the display screen 20 when there is a user instruction. By viewing the connection information displayed on the display screen 20, the user can verify whether or not the WDM non-compliant device 16 (FDD unit) is connected to the connection verifiable information processing apparatus 10.

As described above, in the present embodiment, the operation performed to examine whether or not the WDM non-compliant device 16 (FDD unit) is connected to the connection verifiable information processing apparatus 10 is the same as that of the prior art.

Next, the operation performed to examine whether or not the WDM compliant device 8 (DV) is connected to the connection verifiable information processing apparatus 10 will be described for two separate cases: one concerning the case when the connection verifiable information processing apparatus 10 is being powered up, and the other concerning the case when the connection verifiable information processing apparatus 10 is operating.

First, the operation for the case when the connection verifiable information processing apparatus 10 is being powered up will be described.

When the connection verifiable information processing apparatus 10 is powered up, the device information acquiring means 33 in the central processing application 4 performs control so that the I/O manager subset 6 issues a second transmit request for requesting an output of information concerning the connection in order to examine whether or not the WDM compliant device 8 (DV) is connected to the connection verifiable information processing apparatus 10. The second transmit request is output via the WDM driver 7.

The second transmit request is input to the WDM compliant device 8 (DV) if the WDM compliant device 8 (DV) is connected to the connection verifiable information processing apparatus 10; responding to the second transmit request, the WDM compliant device 8 (DV) outputs response information containing information concerning its own device type, i.e., DV, information identifying the manufacturer, information about the manufacturing date, and information about the produce name. The response information is input to the WDM driver 7.

The WDM driver 7 passes the response information to the device information acquiring means 33 in the central processing application 4 via the I/O manager subset 6. Upon receiving the response information from the WDM driver 7, the device information acquiring means 33 passes it to the information interpreting means 30 which then sends information to the effect that "DV is connected" to the device checker 17 via the device checker information transmitting means 37. The information to the effect that "DV is connected" is converted by the information interpreting means 30 into a format interpretable by the IFS manager 11, or more properly into a format interpretable by the system service 5, before being sent to the device checker 17.

Furthermore, the information interpreting means 30, based on the manufacturer information, manufacturing date information, and product name information, locates particular folder information corresponding to the input manufacturer information, manufacturing date information, and product name information from among a plurality of predetermined folder information candidates, and sends that particular folder information to the second FSD 13 via the device information transmitting means 32.

If folder information corresponding to the response information is not found among the predetermined folder information candidates, the information interpreting means 30 sends arbitrarily determined folder information to the second FSD 13 via the device information transmitting means 32.

The device checker 17, upon receiving the information to the effect that "DV is connected", outputs to the IFS manager 11 the information indicating that the WDM compliant device 8 (DV) is connected.

The folder information transmitted from the information interpreting means 30 in the central processing application 4 via the device information transmitting means 32 is acquired by the APP information acquiring and transmitting means 35 in the second FSD 13, converted by the information interpreting means 36 into folder information of the format interpretable by the IFS manager 11, and transmitted via the IFS information acquiring and transmitting means 34 for input into the IFS manager 11.

The IFS manager 11 passes the folder information and the information to the effect that "DV is connected" to the system service 5. The folder information and the information to the effect that "DV is connected" are thus input into the system service 5 for storing therein.

Here, since the folder information and the information to the effect that "DV is connected", input into the system service 5, are of the format interpretable by the system service 5, when there is a user instruction the folder information and the information to the effect that "DV is connected" are transferred from the system service 5 to the display application 3 for display on the display screen 20.

By viewing the connection information displayed on the display screen 20, the user can verify whether or not the WDM compliant device 8 (DV) is connected to the connection verifiable information processing apparatus 10. When it is connected, the user can also verify the manufacturer name, manufacturing date, and product name.

On the other hand, if the WDM compliant device 8 (DV) is not connected to the connection verifiable information processing apparatus 10, the second transmit request output from the WDM driver 7 is not input to the WDM compliant device 8 (DV) and, therefore, no response information is output; as a result, no response information is returned to the I/O manager subset 6.

Further, when the WDM compliant device 8 (DV) is not connected to the connection verifiable information processing apparatus 10, the whole or part of the WDM driver 7 may not exist; in that case, the I/O manager subset 6 cannot issue the second transmit request, nor does it receive any response information.

In this way, when no response information is received by the WDM driver 7, the WDM driver 7 sends information to the effect that "DV is not connected" to the device information acquiring means 33 in the central processing application 4.

The information is then passed onto the information interpreting means 30; the information interpreting means 30 then transmits the information to the effect that "DV is not connected" to the device checker 17 via the device checker information transmitting means 37 after converting the information into a format interpretable by the IFS manager 11, or more properly into a format interpretable by the system service 5.

The device checker 17, upon receiving the information to the effect that "DV is not connected", sends to the IFS manager 11 the information indicating that the WDM compliant device 8 (DV) is not connected. The IFS manager 11 does not send information concerning such a yet-to-be-connected device to the system service 5.

Accordingly, when there is a user instruction, the information "DV is not connection" is displayed on the display screen 20 by the display application 3. By viewing the connection information displayed on the display screen 20, the user can verify whether or not the WDM compliant device 8 (DV) is connected to the connection verifiable information processing apparatus 10.

Next, a description will be given of the operation performed to examine whether or not the WDM compliant device 8 (DV) is connected to the connection verifiable information processing apparatus 10 while the connection verifiable information processing apparatus 10 is operating.

While the connection verifiable information processing apparatus 10 is operating, the device information acquiring means 33 in the central processing application 4 performs control so that the I/O manager subset 6 issues the second transmit request at regular intervals, for example, every two seconds, to examine whether or not the WDM compliant device 8 (DV) is connected to the connection verifiable information processing apparatus 10. In accordance with that control, the WDM driver 7 outputs the second transmit request at regular intervals.

Here, the operation will be described for the case where, when the connection verifiable information processing apparatus 10 is being powered up, the WDM compliant device 8 (DV) is connected to the connection verifiable information processing apparatus 10 and, thereafter, the WDM compliant device 8 (DV) is disconnected from the connection verifiable information processing apparatus 10 while the connection verifiable information processing apparatus 10 is operating.

When the WDM compliant device 8 (DV) is disconnected from the connection verifiable information processing apparatus 10, the second transmit request is not input to the WDM compliant device 8 (DV) and, therefore, no response information is output; as a result, no response information is returned to the I/O manager subset 6.

Further, when the WDM compliant device 8 (DV) is not connected to the connection verifiable information processing apparatus 10, the whole or part of the WDM driver 7 may not exist; in that case, the I/O manager subset 6 cannot issue the second transmit request, nor does it receive any response information.

In this way, when no response information is returned to the I/O manager subset 6, the I/O manager subset 6 sends information to the effect that "DV is not connected" to the device information acquiring means 33 in the central processing application 4.

The information is then passed on to the information interpreting means 30; the information interpreting means 30 then transmits the information to the effect that "DV is not connected" to the device checker 17 via the device checker information transmitting means 37 after converting the information into a format interpretable by the IFS manager 11, that is, into a format interpretable by the system service 5.

The device checker 17, upon receiving the information to the effect that "DV is not connected", sends to the IFS manager 11 the information to the effect that "the WDM compliant device 8 (DV) is not connected".

The IFS manager 11 sends the information to the effect that "the WDM compliant device 8 (DV) is not connected", received from the device checker 17, to the system service 5 which then judges whether the WDM compliant device 8 (DV) was disconnected or was not connected from the beginning.

Then, when outputting information to the display application 3 in accordance with a user instruction, the system service 5 outputs the information indicating the result of the judgement as to "whether the WDM compliant device 8 (DV) was disconnected during operation of the connection verifiable information processing apparatus 10 or was not connected from the beginning".

As a result, when displaying the connection information on the display screen 20 by the display application 3, if the WDM compliant device 8 (DV) is disconnected during operation of the connection verifiable information processing apparatus 10, the folder information corresponding to the WDM compliant device 8 (DV) disappears from the display screen 20.

When the information to the effect that "the WDM compliant device 8 (DV) is not connected" is received, the system service 5 passes the information also to the message transmitting means 18 for the central processing application 4.

By feeding the information back to the message transmitting means 18 in this way, the central processing application 4 can confirm that the information to the effect that "the WDM compliant device 8 (DV) is not connected" has been input to the system service 5.

Next, the operation will be described for the case where, when the connection verifiable information processing apparatus 10 is being powered up, the WDM compliant device 8 (DV) is not connected to the connection verifiable information processing apparatus 10 and, thereafter, the WDM compliant device 8 (DV) is connected to the connection verifiable information processing apparatus 10 while the connection verifiable information processing apparatus 10 is operating.

When the WDM compliant device 8 (DV) is connected to the connection verifiable information processing apparatus 10, the second transmit request issued from the I/O manager subset 6 is input to the WDM compliant device 8 (DV) via the WDM driver 7; the WDM compliant device 8 (DV) then outputs response information containing information concerning its own device type, i.e., DV, information identifying the manufacturer, information about the manufacturing date, and information about the produce name.

The response information is input to the WDM driver 7, and then transferred to the device information acquiring means 33 in the central processing application 4 via the I/O manger subset 6.

When the response information is input, the device information acquiring means 33 passes the response information to the information interpreting means 30 which then transmits information to the effect that "DV is connected" to the device checker 17 via the device checker information transmitting means 37. The information to the effect that "DV is connected" is converted by the information interpreting means 30 into a format interpretable by the IFS manager 11, that is, into a format interpretable by the system service 5, before being sent to the device checker 17.

Furthermore, the information interpreting means 30, based on the manufacturer information, manufacturing date information, and product name information, locates particular folder information corresponding to the input manufacturer information, manufacturing date information, and product name information from among a plurality of predetermined folder information candidates, and sends that particular folder information to the second FSD 13 via the device information transmitting means 32.

If the corresponding folder information is not found, the information interpreting means 30 sends arbitrarily determined folder information to the second FSD 13 via the device information transmitting means 32.

The device checker 17, upon receiving the information to the effect that "DV is connected", outputs to the IFS manager 11 the information indicating that the WDM compliant device 8 (DV) is connected.

The folder information transmitted from the information interpreting means 30 in the central processing application 4 via the device information transmitting means 32 is acquired by the APP information acquiring and transmitting means 35 in the second FSD 13, converted by the information interpreting means 36 into folder information of the format interpretable by the IFS manager 11, and transmitted via the IFS information acquiring and transmitting means 34 for input into the IFS manager 11.

The IFS manager 11 passes the folder information and the information to the effect that "DV is connected" to the system service 5. Here, since the information output into the system service 5 is of the format interpretable by the system service 5, the system service 5 stores the information received from the IFS manager 11 and judges that "the WDM compliant device 8 (DV) has been connected during operation of the connection verifiable information processing apparatus 10".

Then, if there is a user instruction, the system service outputs the folder information and the information to the effect that "the WDM compliant device 8 (DV) has been connected during operation of the connection verifiable information processing apparatus 10" to the display application 3. The information is displayed on the display screen 20 by the display application 3. That is, the folder information corresponding to the WDM compliant device 8 (DV) is displayed.

In this way, by viewing the connection information displayed on the display screen 20, the user can verify whether or not the WDM compliant device 8 (DV) is connected to the connection verifiable information processing apparatus 10.

When the information to the effect that "DV is connected" is received from the IFS manager, the system service 5 passes the information also to the message transmitting means 18 for the central processing application 4.

By feeding the information back to the message transmitting means 18 in this way, the central processing application 4 can confirm that the information to the effect that "DV is connected" has been input to the system service 5.

With the above operation, even when hot plugging is done by connecting or disconnecting the WDM compliant device 8, represented by a DV, to or from the connection verifiable information processing apparatus 10 while the connection verifiable information processing apparatus 10 is operating, the connection or disconnection state of the WDM compliant device 8 can be displayed on the display screen 20 by using the display application 3 such as Windows Explorer.

Further, when the WDM compliant device 8 such as a DV is connected to the PC, the displayed folder is changed according to the manufacturer information and product name information.

However, the method of changing the folder by reflecting the manufacturer information and product name information is not limited to one particular method. For example, the folder may be changed based only on the manufacturer information without reflecting the product name information. Alternatively, only the manufacturer information and product name information for a specific manufacturer may be reflected and a fixed folder may be used for devices from other manufacturers. Which method to use depends on what functions the application has that is used as the display application 3 to assist the connection verifiable information processing apparatus 10.

In the above A1st embodiment, the device information acquiring means 33 in the central processing application 4 has been described as performing control so that the I/O manager subset 6 issues the second transmit request at regular intervals, for example, every two seconds, to examine whether or not the WDM compliant device 8 (DV) is connected to the connection verifiable information processing apparatus 10; alternatively, the control may be performed so that the second transmit request is issued, not at regular intervals, but at irregular intervals.

Furthermore, instead of the device information acquiring means 33 controlling the I/O manager subset 6 to issue the second transmit request, the I/O manager subset 6 itself may be configured to issue the second transmit request autonomously at regular or irregular intervals.

In FIG. 1 used for the explanation of the A1st embodiment, the second FSD 13 is shown connected to the I/O subsystem 14; it should be noted that the second FSD 13 is connected in the same manner that the first FSD 12 is connected to the I/O subsystem 14 in the prior art configuration described with reference to FIG. 4. The second FSD 13 is so connected, not for data transfer between the second FSD 13 and the I/O subsystem 14, but because the second FSD 13 should be handled at the same level as the first FSD 12.

In the above A1st embodiment, all or part of the constituent elements of the connection verifiable information processing apparatus 10 may be implemented by hardware, or by software having functions equivalent to the corresponding functions of the hardware.

Furthermore, as presented in claim 13, a program recording medium having a program recorded thereon for enabling a computer to implement the functions of all or part of the constituent means of the connection verifiable information processing apparatus 10 described in any one of claims 2 to 11, also falls within the scope of the present invention.

The above embodiment has been described by dealing with the case where both the WDM non-compliant device and WDM compliant device as terminal devices are connected, but the invention is not restricted to this particular configuration; for example, the configuration may be such that only the WDM compliant device is connected. In this case also, the same effect as described above can be achieved. In the latter case, the first FSD 12 and the WDM non-compliant device driver 15 shown in FIG. 1 need not necessarily be provided.

As is apparent from the above description, the present invention can provide a connection verifiable information processing system, a connection verifiable information processing apparatus, and a connection verifiable information processing method, wherein the information processing means, which processes response information of the first format corresponding to the first transmit request that the first transmit request means outputs to request an output of connection information, can be made to process response information of the second format corresponding to the second transmit request that the second transmit request means outputs to request an output of connection information different from that requested by the first transmit request.

Embodiments of the present invention will be described below with reference to drawings.

Embodiment B1

Figure 5:
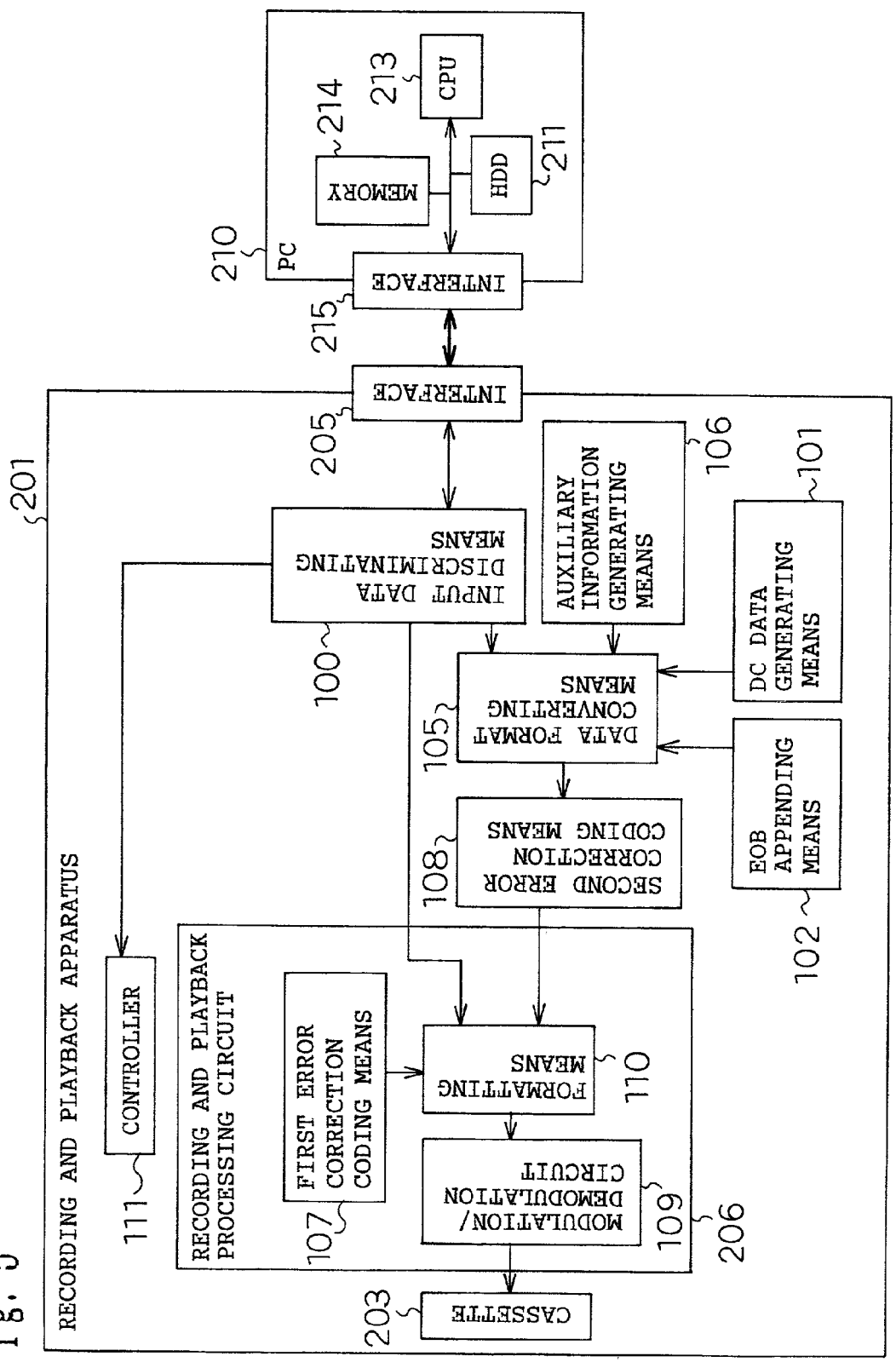
FIG. 5 is a block diagram showing an apparatus configuration for implementing a data recording method according to a B1st embodiment of the present invention.

FIG. 5 is a block diagram showing an embodiment of the present invention, and the configuration of the embodiment will be described with reference to the same drawing.

In FIG. 5, reference numeral 201 is a recording and playback apparatus. Reference numeral 203 is a cassette for recording data formatted, error correction coded, modulated, etc. by a recording and playback processing circuit 206. Reference numeral 206 is the recording and playback processing circuit that applies processing such as formatting, error correction coding, and modulation on the data received via an interface 205.

Further, reference numeral 210 is a personal computer (PC). Reference numeral 211 is a hard disk (HDD). Reference numeral 213 is a CPU. Reference numeral 214 is a memory. Reference numerals 205 and 215 are interfaces for performing data transfer to and from an external device. Reference numeral 100 is an input data discriminating means for discriminating whether data input from the hard disk 211 in the PC 210 is DV data or not.

Further, reference numeral 101 is a DC data generating means for generating DC data for a blue back screen, a blackout screen, or a screen indicating that data other than DV data is recorded. Reference numeral 102 is an EOB appending means for inserting an EOB (end of block) which is placed in concatenating fashion with the DC data. Reference numeral 105 is a data format converting means for converting the input data into a format equivalent to that of DV data when the input data is not DV data.

Further, reference numeral 106 is an auxiliary information generating means for setting information indicating how PC data is arranged and other information such as information about a recorded tape itself for the management of the tape, information about the device used for recording, and information about the software used for recording. Reference numeral 107 is a first error correction coding means for applying prescribed error correction coding (with an outer code and an inner code). Reference numeral 108 is a second error correction coding means for applying additional error correction coding when the data demands higher reliability than DV data does. Reference numeral 109 is a modulation/demodulation circuit for performing prescribed modulation/demodulation.

Further, reference numeral 110 is a formatting means for converting data into a video recording packet format. Reference numeral 111 is a controller for controlling the overall operation of the recording and playback apparatus 201. Hereinafter, elements designated by the same reference numerals are assumed to be identical in configuration and function.

The operation of the recording and playback apparatus having the above configuration will be described below.

The following description of the present embodiment deals with the case where a data file stored on the hard disk of the PC is transferred to the recording and playback apparatus for recording.

The input data discriminating means 100 discriminates whether the data transferred from the hard disk 211 of the PC 210 is DV data or not.

In this case, the data can be discriminated based on the extension part of the data name or management information appended to the data, or on auxiliary information such as VAUX or values set in auxiliary information provided for PC data recording.

The discrimination can also be accomplished at the interface 205 by examining the header information, etc. of a transferred packet. In this case, the input data discriminating means 100 also discriminates the condition of the data to be output, that is, whether the data is data conforming to the DV standard 25 Mbps mode or data conforming to the low-rate 12.5 Mbps mode.

If it is determined that the input data is DV data as the result of the above discrimination, the input data is passed unchanged to the formatting means 110.

Figure 6:
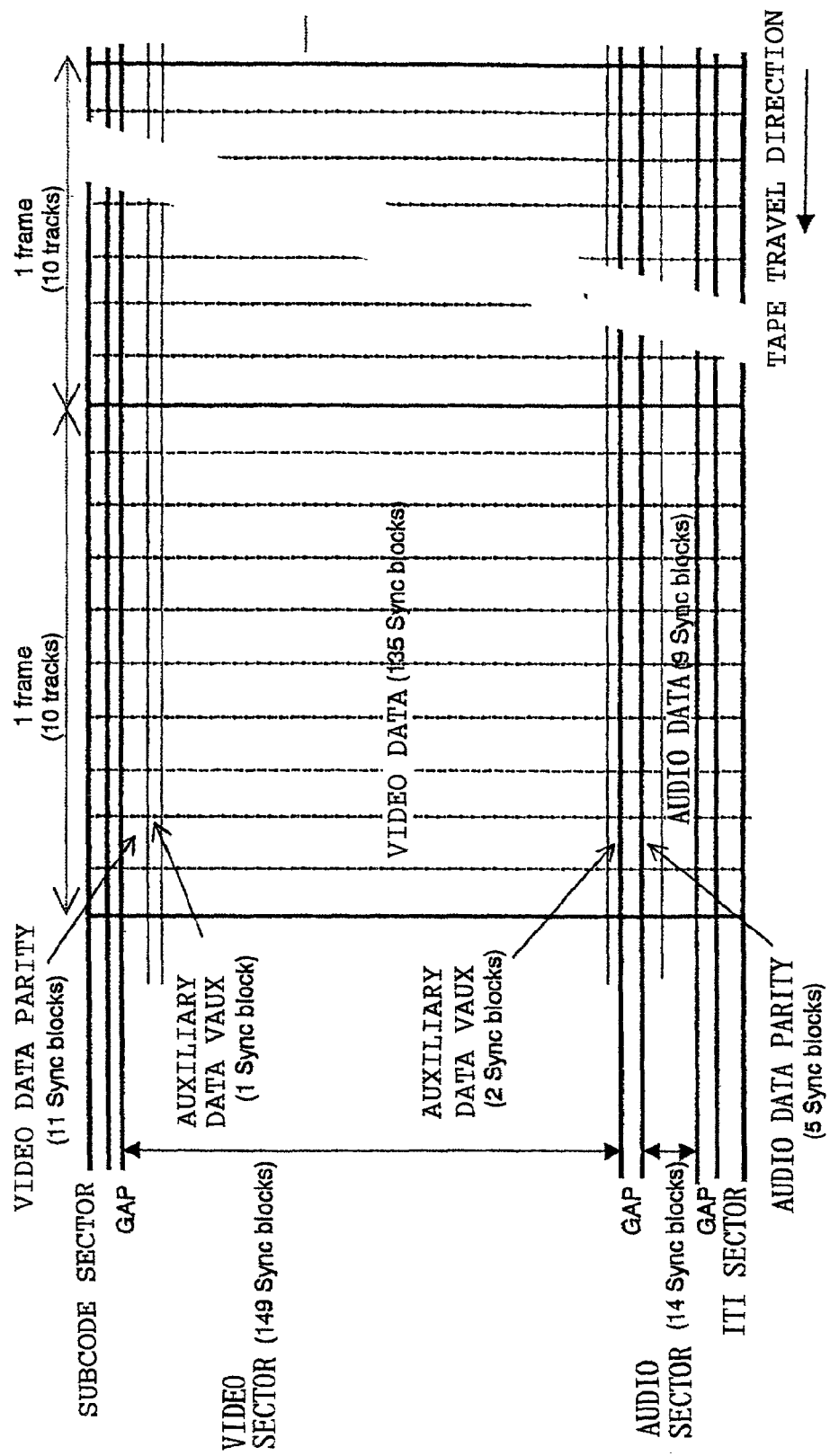
FIG. 6 is a diagram for explaining a method of recording data on a digital VTR according to the prior art.

In this case, the video data is converted into video recording packets of the track format shown in FIG. 6, and prescribed error correction coding (with an outer code and an inner code) is applied by the first error correction coding means 107. After that, the data is fed into the modulation/demodulation circuit 109 where prescribed modulation/demodulation is applied to convert the data into a recording signal for recording on the cassette 203.

Figure 7:
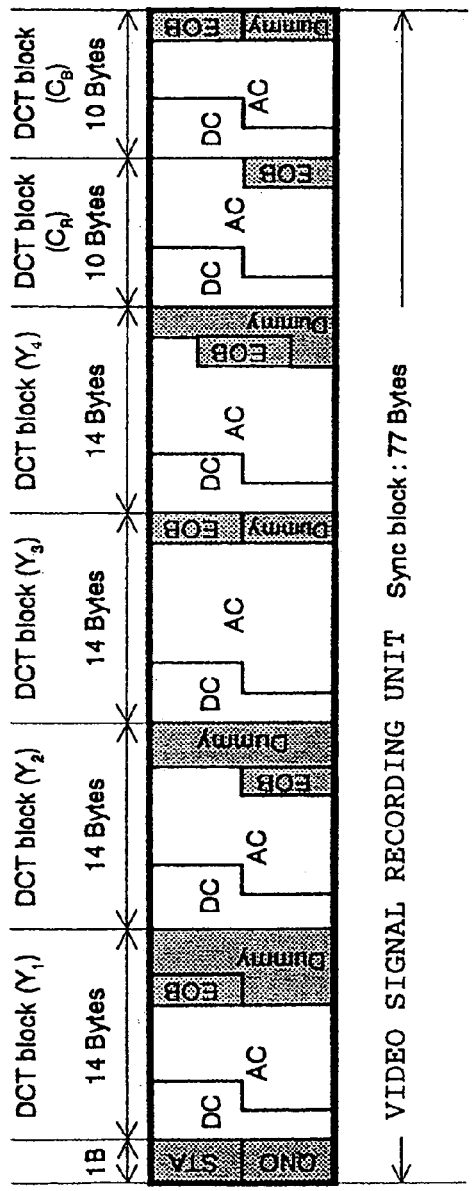
FIG. 7(1) is a diagram for explaining the data field of a recording packet used in 25-Mbps mode in the prior art digital VTR.
Figure 7:
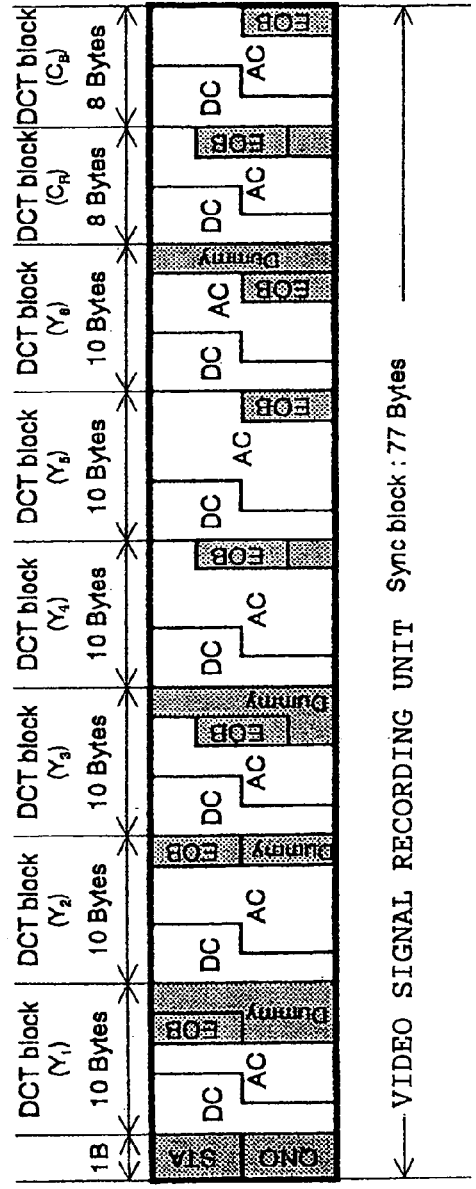

Each packet carries DCT (discrete cosine transform) coded data in six DCT blocks; as previously described, the DC component of the data is placed in the fixed position as shown in FIG. 7(1) or, in the case of data conforming to the low-rate 12.5 Mbps mode, in the fixed position as shown in FIG. 7(2).

On the other hand, if the input data is non-DV data (for example, PC data), the input data is passed to the data format converting means 105. The data format converting means 105 converts it into a format equivalent to that of DV data and also generates necessary information unique to recording packets. The discrimination information from the input data discriminating means 100 or the interface 5 is supplied to the controller 111 so that the controller 111 can switch the overall operation of the recording and playback apparatus 1 to a suitable state.

For example, the controller 111 selects recording rate in accordance with the data rate of the input data and performs control so that recording packet header or system data such as VAUX or AAUX is set correctly. For DV, recording rates such as 25 Mbps mode and 12.5 Mbps mode are selectable.

Figure 8:
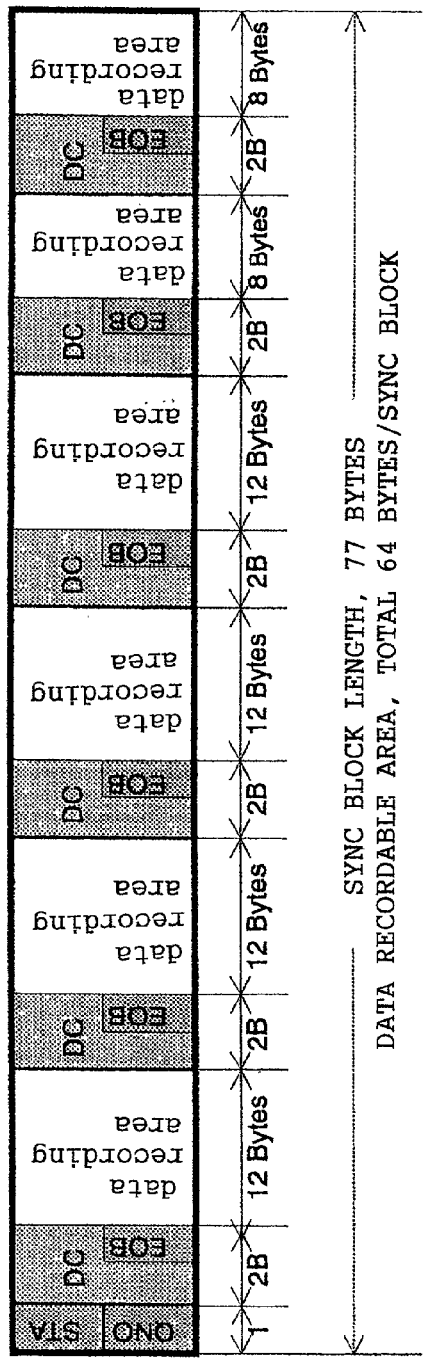
FIG. 8(1) is a diagram for explaining the data field of a recording packet used in 25-Mbps mode in the data recording method of the invention described in Japanese Patent Application No. 09-067653.
Figure 8:
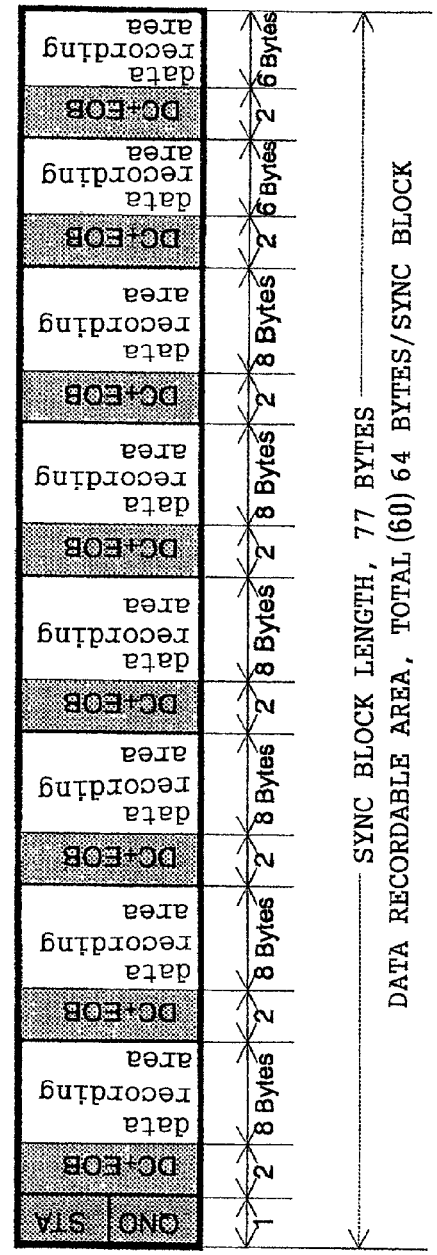

FIG. 8(1) is a diagram for explaining how non-DV data is recorded in a video recording packet when recording the data in the 25 Mbps mode.

As shown in FIGS. 8(1) and 8(2), in this format, immediately after, the area where the DC component of each DCT coded data is placed (in the DV format, one-bit motion-related information, two-bit class information, and nine-bit quantized value of the DC component are arranged in this area), an EOB code that indicates the end of the information in the DCT block concerned, is generated and appended. Here, a brief description will be given of the motion-related information. In the DVC format, when there is little or no motion in the portion corresponding to the DCT block concerned, an 8×8 DCT is used, and when there is motion, a 2×4×8 DCT is used. The motion-related information described above is a bit that indicates which of the DCT modes between them is used.

With the above arrangement, the 12-byte area (in the case of recording in 25-Mbps mode) or the eight-byte area (in the case of recording in 12.5-Mbps mode) from the EOB to the beginning of the next DCT coded data is rendered not valid for the decoding and reproduction of conventional DV data.

As a result, within one recording packet, areas totaling 64 bytes are rendered not valid for the decoding and reproduction of conventional DV data, as shown in FIG. 8(1), and whatever type of data is assigned to these areas, that does not affect the image reproduced from the VTR of the DV format, that is, only the image decoded from the DC component data is displayed.

As shown in FIG. 8(1), the recording packet according to the present embodiment has the format such that in each area corresponding to each DCT block described with reference to FIG. 7(1), the DC component of the DCT coded data and the EOB are placed in the first two-byte area and the non-DV data (for example, PC data) is placed in the subsequent 12-byte area or eight-byte area (indicated as data recording area in the figure).

Here, a description will be given focusing on the operation of the data format converting means 105 for arranging the data as described above.

The data format converting means 105 inserts (1) the prescribed DC data generated by the DC data generating means 101 and (2) the EOB appended by the EOB appending means 102 in concatenating fashion with the DC data, and places (3) the non-DV data, for example, PC data, in the data recording area.

The DC data generated by the DC data generating means 101 can be any data that can generate a blue back screen or blackout screen or a screen indicating that data other than DV data is recorded.

As the result of the above operation, the 12-byte or eight-byte area (a total of 64 bytes as one recording block) located between the EOB and the beginning of the next DCT coded data is regarded as a data area not valid for the decoding and reproduction of conventional DV data.

Accordingly, whatever data is assigned to this area, the data will have no ill effect on the reproduced image. That is, the reproduced image is formed from the DCT coded data consisting only of the DC component.

Therefore, by assigning PC data to the areas totaling 64 bytes in size, the PC data can be recorded without causing any ill effect on the reproduced image.

Alternatively, if, in the packet shown in FIG. 8(1), an error code (a special pattern indicating an error and disabling the use of data recorded therein) is assigned to the DC data area and EOB code area, and PC data is assigned to the areas totaling 64 bytes in size, the PC data can be recorded without causing any ill effect on the reproduced image, as in the above case.

If higher reliability is demanded for the thus recorded PC data than for DV data, the second error correction coding means 108 applies additional error correction coding. The additional error correction coding will be described later with reference to FIGS. 9 to 12.

FIG. 8(2) is a diagram for explaining how non-DV data is recorded in a video recording packet when recording the data in the 12.5 Mbps mode.

Just like the case of FIG. 8(1), the eight-byte or six-byte area (a total of 60 bytes as one recording block) located between the position of the EOB and the beginning of the next DCT coded data is regarded as a data area not valid for the decoding and reproduction of conventional DV data. Therefore, PC data can be recorded in such areas, as in the above case.

In the DV format shown in FIG. 8(2), however, of the 12 bits of DC data, one bit is a value (which corresponds to the motion-related information) that specifies the selection of the DCT mode (2×4×8 mode or 8×8 mode) and two bits form a value (which corresponds to the class information) that specifies the selection of the Class No. (the setting of the quantization level for DCT frequency components).

In this case, by placing the EOB immediately following the DC component, as in the foregoing case, the AC area is regarded as having no data. This is equivalent to all AC components being zero; accordingly, whatever value is placed in the one-bit or two-bit area, that will have no effect on the reproduced image.

Further, since the screen is one that is reconstructed from the DC component alone, its picture quality is not a requirement; considering this, if the LSB (Least Significant Bit) of the actual quantized value of the DC component consisting of the remaining nine bits is inverted, that does not cause any significant effect on the reproduced image.

Accordingly, these areas totaling four bits in size can also be used as data recording areas.

As the result of the above operation, the four-bit (0.5 byte [sic; 0.5 byte]) area and the eight-byte or six byte area (a total of 64 bytes as one recording block) located between the EOB and the beginning of the next DCT coded data are regarded as data areas not valid for the decoding and reproduction of conventions DV data, and whatever data is assigned to these areas, the data will have no effect on the reproduced image.

That is, the reproduced image is formed from a small block having only the DC component data. Therefore, by assigning PC data to the areas totaling 64 bytes in size, the PC data can be recorded without causing any ill effect.

If the four-bit area is not used as a data recording area, the eight-byte or six-byte area (a total of 60 bytes as one recording block) located between the EOB and the beginning of the next DCT coded data is used as the data recording area.

As in the foregoing case, when higher reliability is demanded for the recorded PC data than for DV data, the second error correction coding means 108 applies additional error correction coding.

The data that has undergone the above conversion is now converted to a recording signal of the prescribed format by the recording and playback processing circuit 206, and then recorded on the cassette 3 while controlling the whole recording and playback apparatus by the controller 111.

More specifically, when the input data is DV data, the formatting means 110 selects to accept the data input directly from the input data discriminating means 100. On the other hand, when the input data is non-DV data, the formatting means 110 selects to accept the data that has undergone conversion in the data format converting means 105 and, if necessary, additional error correction coding in the second error correction coding means 108.

Then, the formatting means 110 appends prescribed information such as VAUX, AAUX, etc. and converts the data to the track format such as shown in FIG. 6, and the first error correction coding means 107 applies prescribed error correction coding (with an outer code and an inner code). After that, the modulation/demodulation circuit 109 applies prescribed modulation/demodulation to convert the data to the recording signal.

Next, the additional error correction coding performed in the second error correction coding means 108 will be described.

The same Reed-Solomon code as used, for example, in the first error correction coding can be used as the error correction code.

Figure 9:
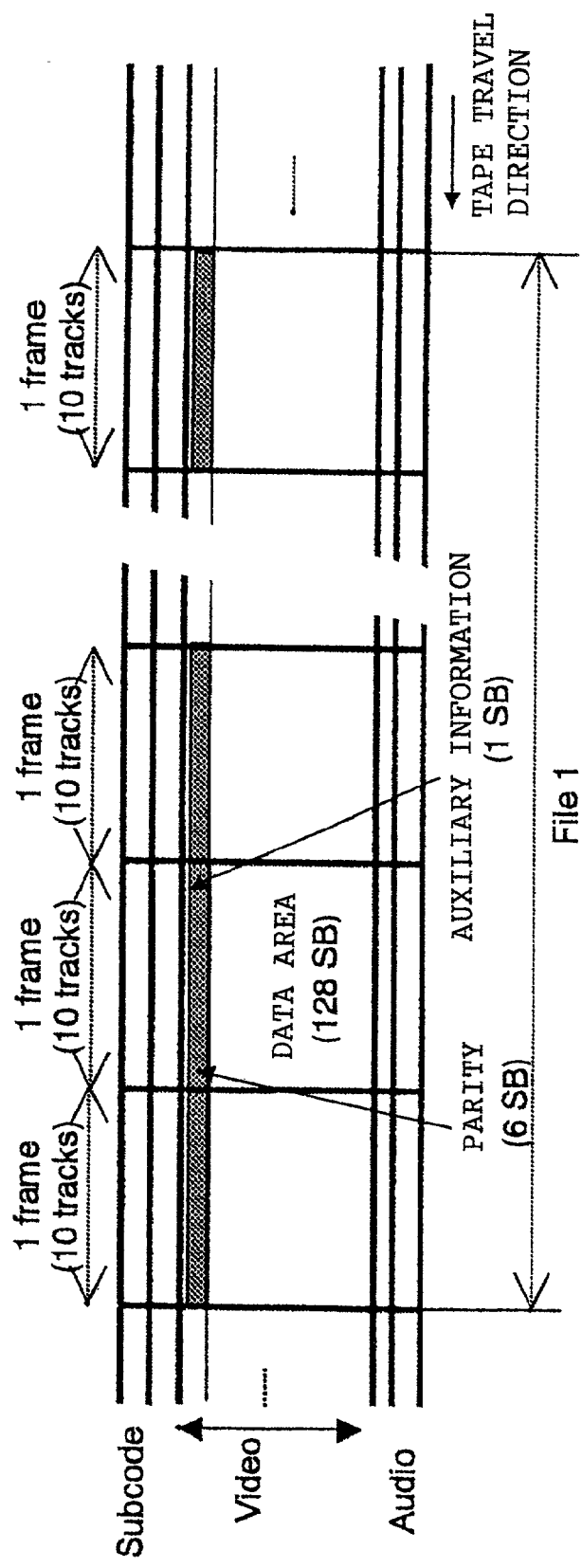
FIG. 9 is a diagram showing an example of a first error correcting parity recording method according to a second error correction coding means of the present invention.

One example of the second error correction coding is shown in FIG. 9.

In the Video sector within each track, 128 recording packets are used as data areas for recording PC data. That is, up to 64 bytes×128 packets/track=8192 bytes of PC data can be recorded per track.

Of the remaining seven packets in the Video sector, one packet is used for recording auxiliary information relating to the recording of the PC data, and parities of the additional error correction code for the PC data assigned to the 128 packets are recorded in the remaining 6 packets.

The auxiliary information relating to the recording of the PC data is, for example, information indicating how the PC data is arranged in the data area (since PC data is not stream data like a video signal, it is necessary to indicate how many bytes the PC data consists of and where it begins and where it ends) and, if necessary, information concerning the recorded tape itself for the management of the tape, information about the device used for recording, or information concerning the software used for recording can also be set as the auxiliary information.

Figure 10:
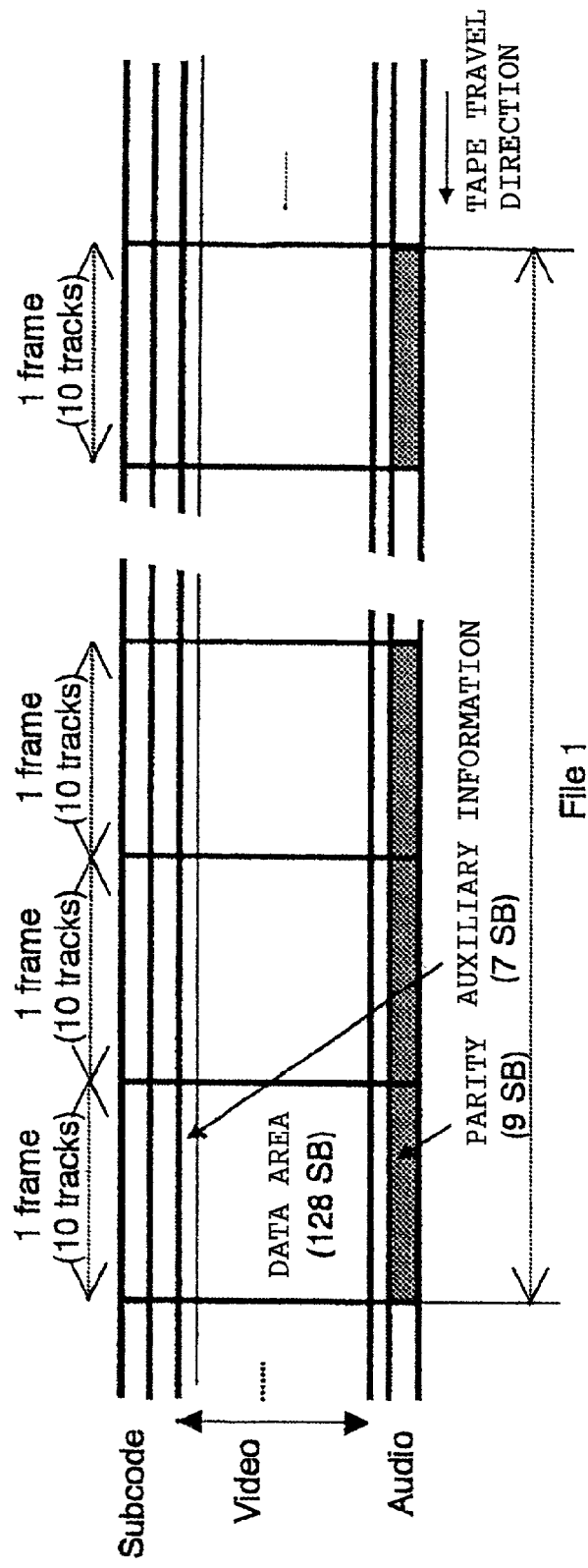
FIG. 10 is a diagram showing an example of a second error correcting parity recording method according to the second error correction coding means of the present invention.

A second example of the second error correction coding is shown in FIG. 10. In the Video sector within each track, 128 recording packets are provided as data areas for recording PC data. The remaining seven recording packets in the Video sector are used for recording auxiliary information relating to the recording of the PC data.

Parities of the additional error correction code for the PC data recorded in the 128 data areas are recorded in the nine audio recording packets of the Audio sector.

Figure 11:
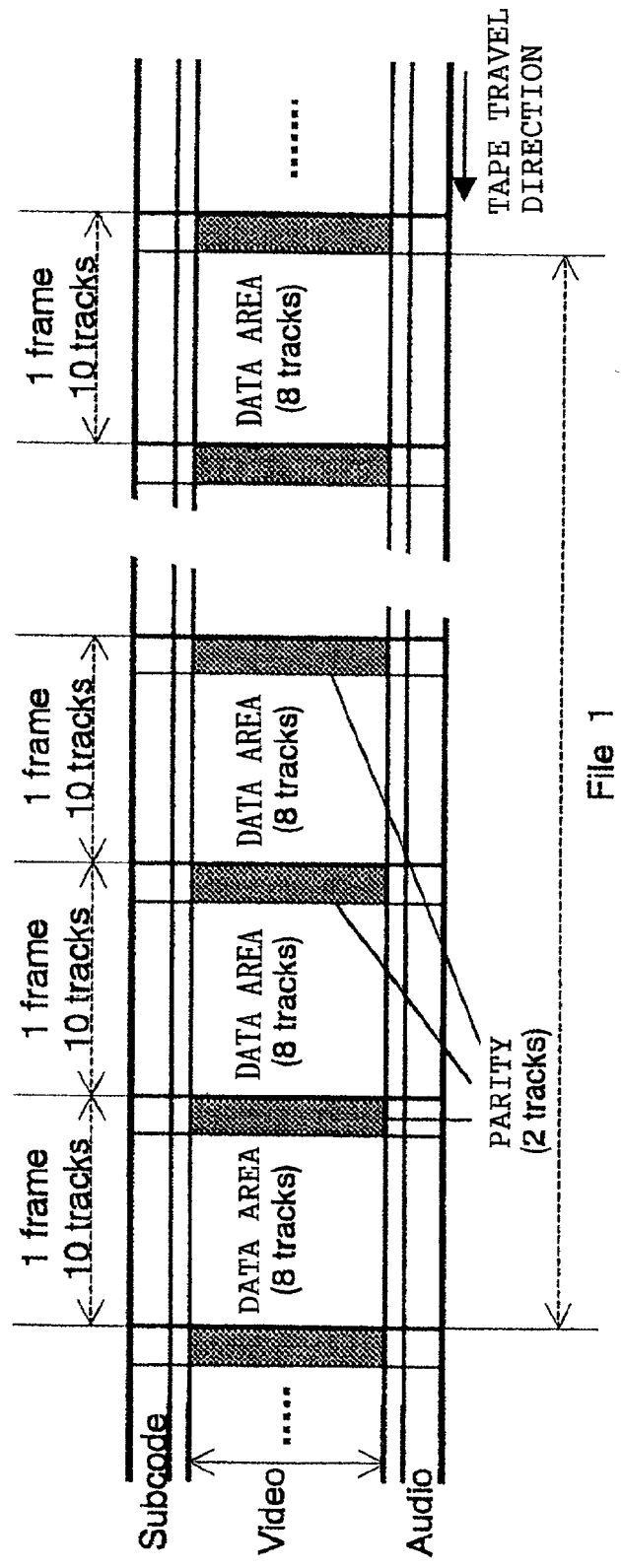
FIG. 11 is a diagram showing an example of a third error correcting parity recording method according to the second error correction coding means of the present invention.

A third example of the second error correction coding is shown in FIG. 11. Seven recording packets in each track are used for recording auxiliary information relating to the recording of PC data. As for the remaining 128 recording packets per track, the recording packets in eight tracks per frame (one frame=10 tracks) are used as data areas for recording PC data, and the recording packets in two tracks are used for recording parities of the additional error correction code.

In this case, up to 64 bytes×128 packets/track×8 tracks=65536 bytes of PC data can be recorded per frame.

Figure 12:
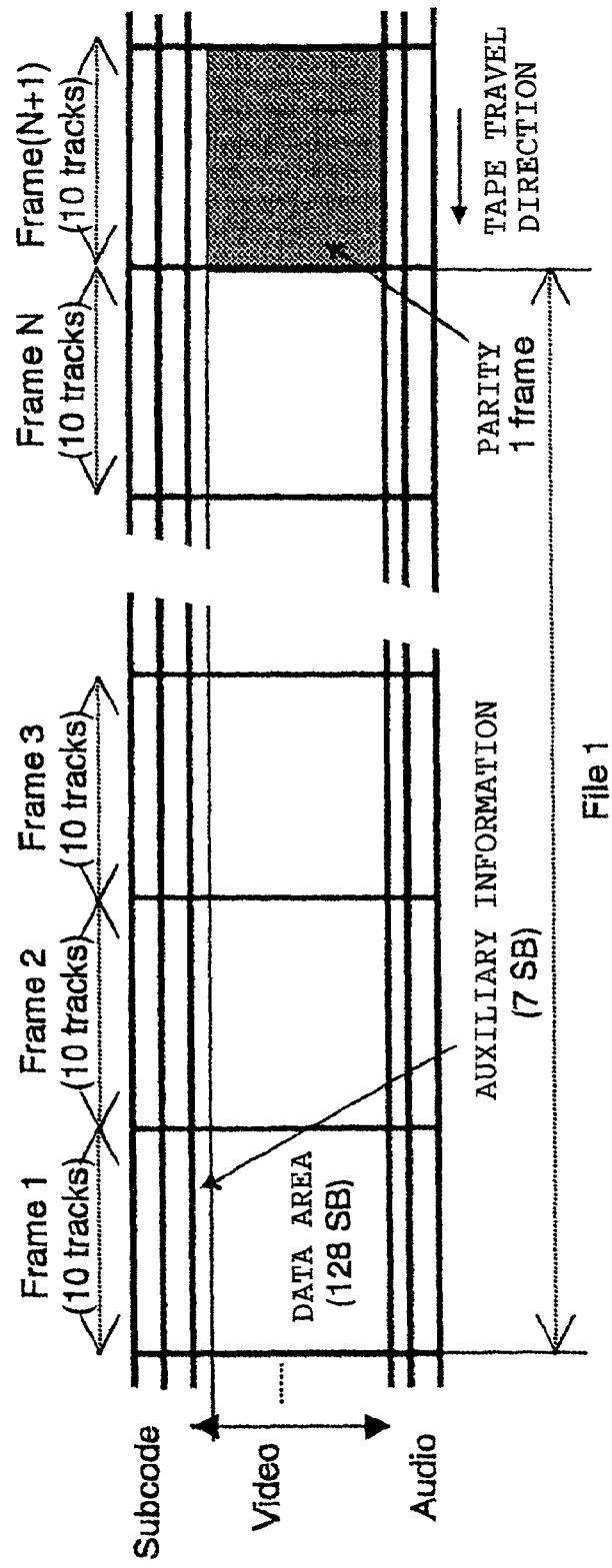
FIG. 12 is a diagram showing an example of a fourth error correcting parity recording method according to the second error correction coding means of the present invention.

A fourth example of the second error correction coding is shown in FIG. 12. Seven recording packets in each track are used for recording auxiliary information relating to the recording of PC data. As for the remaining 128 recording packets per track, by treating (N+K) frames as a unit the recording packets in N frames are used as data areas for recording PC data and the recording packets in K frames are used for recording parities of the additional error correction code.

In FIG. 12, the trailing K (=1) frame is used for the recording of parities of the additional error correction code. In this case, up to 64 bytes×128 packets/track×10 tracks/frame×N frames=81920×N bytes of PC data can be recorded per unit, i.e., in (N+K) frames.

Here, N may be a prescribed value or may be varied according to the size of the PC data to be recorded.

As described above, since the error correction coding applied in dual fashion (with an outer code and an inner code) in the prior art is applied on top of that, a sufficient error correction capability can be obtained. In the present data streamer specification, it is required that the error rate after error correction be held within about $10^{-17}$; this requirement can be satisfied sufficiently by applying the second error correction coding as described in the present embodiment.

The present invention is not limited to applying the first error correction coding [sic; the first error correction coding] after applying the second error correction coding [sic; the second error correction coding], as described in the present embodiment, when the input data is non-DV data. When the data is non-DV data, the third error correction coding [sic; the third error correction coding] may be applied to the data instead of applying the first error correction coding [sic; the first error correction coding].

That is, in the case of DV data, the first error correction coding [sic; the first error correction coding] is applied, and in the case of non-DV data for which a higher error correction quality is required than that for DV data, the third error correction coding is applied. Here, a code having a more powerful error correction capability than the first error correction coding [sic; the first error correction coding] is used in the third error correction coding [sic; the third error correction coding].

By so doing, a powerful error correction capability, as achieved in the present embodiment, can be provided for non-DV data such as PC data that demands high reliability.

Embodiment B2

Figure 13:
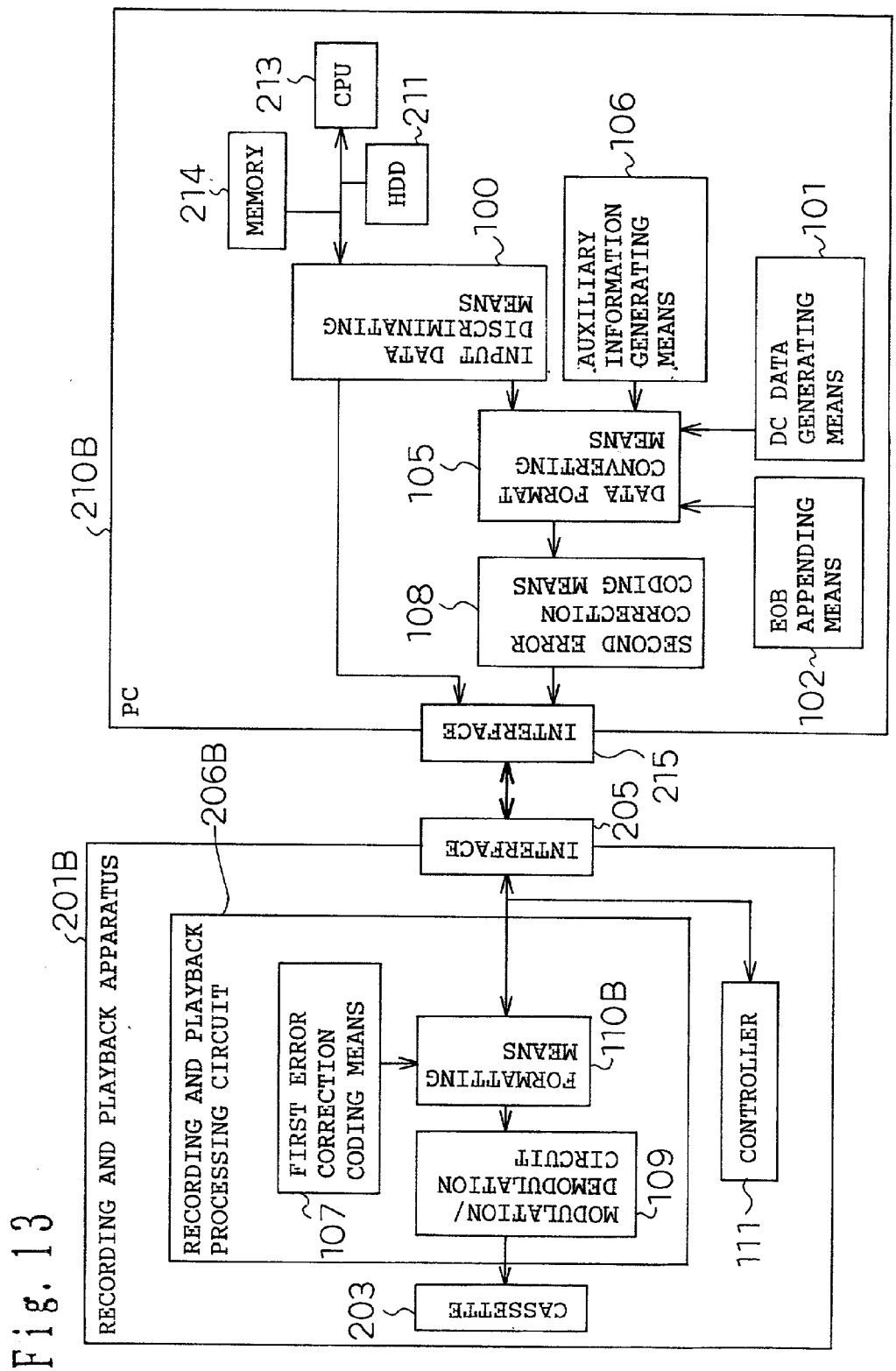
FIG. 13 is a block diagram showing an apparatus configuration for implementing a data recording method according to a B2nd embodiment of the present invention.
Figure 14:
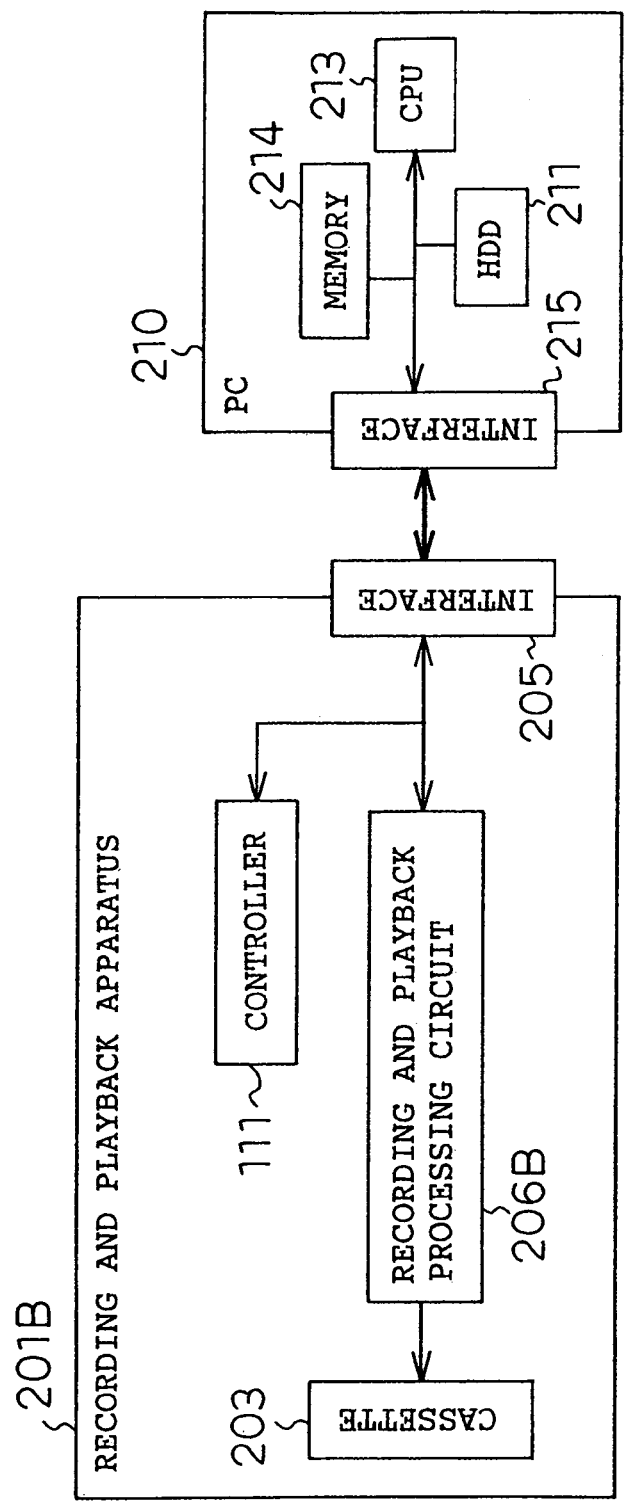
FIG. 14 is a block diagram showing an apparatus configuration for implementing a data recording method according to the prior art.

FIG. 13 is a block diagram showing an embodiment of the present invention, and the configuration of the embodiment will be described with reference to the same drawing.

In FIG. 13, reference numeral 201B is a recording and playback apparatus. Reference numeral 203 is a cassette for recording data formatted, error correction coded, modulated, etc. by a recording and playback processing circuit 206B. Reference numeral 206B is the recording and playback processing circuit that applies processing such as formatting, error correction coding, and modulation on the data received via an interface 205.

Further, reference numeral 210B is a personal computer (PC). Reference numeral 211 is a hard disk (HDD). Reference numeral 213 is a CPU. Reference numeral 214 is a memory. Reference numerals 205 and 215 are interfaces for performing data transfer to and from an external device. Reference numeral 100 is an input data discriminating means for discriminating whether data input from the hard disk 211 is the PC 210B [sic; 201B] is DV data or not.

Further, reference numeral 101 is a DC data generating means for generating DC data for a blue back screen, a blackout screen, or a screen indicating that data other than DV data is recorded. Reference numeral 102 is an EOB appending means for inserting an EOB (end of block) which is placed in concatenating fashion with the DC data.

Further, reference numeral 105 is a data format converting means for converting the input data into a format equivalent to that of DV data when the input data is not DV data. Reference numeral 106 is an auxiliary information generating means for setting information indicating how PC data is arranged and other information such as information about a recorded tape itself for the management of the tape, information about the device used for recording, and information about the software used for recording.

Reference numeral 107 is a first error correction coding means for applying prescribed error correction coding (with an outer code and an inner code). Reference numeral 108 is a second error correction coding means for applying additional error correction coding when the data demands higher reliability than DV data does. Reference numeral 109 is a modulation/demodulation circuit for performing prescribed modulation/demodulation.

Further, reference numeral 110B is a formatting means for converting data into a video recording packet format. Reference numeral 111 is a controller for controlling the overall operation of the recording and playback apparatus 201B.

The operation of the PC having the above configuration and the recording and playback apparatus connected to it will be described below.

The following description of the present embodiment deals with the case where a data file stored on the hard disk of the PC is first converted within the PC and then transferred to the recording and playback apparatus for recording.

The input data discriminating means 100 discriminates whether the data input from the hard disk 211 of the PC 210B is DV data or not.

If it is determined that the input data from the hard disk 211 is DV data as the result of the discrimination, the input data is passed unchanged to the interface 215.

If it is determined that the input data is non-DV data, the video data is converted to a video recording packet format such as shown in FIG. 7, and then transferred to the recording and playback apparatus 201B for recording.

When the data from the hard disk 211 is non-DV data, the data is input to the data format converting means 105. The data format converting means 105 converts it into a format equivalent to that of DV data and also generates prescribed information that recording packets need. Further, based on the discrimination information from the input data discriminating means 100, the data format converting means 105 sets other information to appropriate values.

For example, recording rate must be selected according to the data rate of the input data, and values in the recording packet header or system data such as VAUX or AAUX must be set correctly.

As in the case of the B1st embodiment, using the data format converting means 100, DC data generating means 101, EOB appending means 102, auxiliary information generating means 106, and second error correction coding means 108, the data is converted so that the data can be placed in recording packets in accordance with the format shown in FIG. 8(1) in the case of the 25 Mbps mode or in accordance with the format shown in FIG. 8(2) in the case of the 12.5 Mbps mode, and the data thus converted is transferred to the interface 215.

With the above operation, the data can be converted to the data format compatible with the existing digital VTR recording format, and data files of non-DV data can be recorded using existing digital VTRs without any problem.

As for the additional error correction coding performed in the second error correction coding means 108, data reliability can be increased compared with that of DV data by applying the coding as shown in FIG. 9, 10, 11, or 12, as in the B1st embodiment.

The data that has undergone the above conversion is transferred from the interface 215 to the recording and playback apparatus 206B via the interface 205, and recorded on the cassette 203 by the recording and playback circuit 206B.

The discrimination information from the interface 205 is supplied to the controller 111 so that the controller 111 can switch the overall operation of the recording and playback apparatus 1 to a suitable state. For example, recording rate is selected according to the data rate of the input data, and recording packet header or system data such as VAUX or AAUX is set correctly.

The formatting means 110B appends prescribed information such as VAUX, AAUX, etc. and converts the data to the track format such as shown in FIG. 6, and the first error correction coding means 107 applies prescribed error correction coding (with an outer code and an inner code). After that, the modulation/demodulation circuit 109 applies prescribed modulation/demodulation to convert the data to the recording signal.

As described above, as in the B1st embodiment, since the error correction coding applied in dual fashion (with an outer code and an inner code) in the prior art is applied on top of that, a sufficient error correction capability can be obtained. In the present data streamer specification, it is required that the error rate after error correction be held within about $10^{-17}$; this requirement can be satisfied sufficiently by applying the second error correction coding as described in the present embodiment.

The present invention is not limited to employing the second error correction coding method.

Further, the kind of error correction code and the amount of parity may be changed between PC data and management information, and the kind of error correction code and the amount of parity may be varied according to the kind of PC data.

In the case of PC data, when the required error correction capability differs according to the data (it is quite possible that the required error correction capability differs, if the data storage period, the design specifications for the device and recording media, etc. differ), the specification relating to the error correction coding may be made variable.

When the specification is made variable, if information indicating the use or non-use of an error correction code, information concerning the error correction code used (including information concerning management such as maximum number of retries in Verify or Read-After-Write operations, as well as values unique to the code, such as code length, parity number, and interleave intervals), information concerning the recorded location of the second recording packet, etc. are recorded as auxiliary information, then error correction decoding can be done correctly when reproducing the data.

It will also be recognized that the number of recording packets, the number of tracks, the number of frames, etc. described in the present embodiment are only illustrative and may be changed as appropriate.

Further, if the location of parity is changed from that described in the present embodiment, the same effect as described above can be obtained. For example, the recording packets where parities are placed in the example of FIG. 9, the tracks where parities are placed in the example of FIG. 11, and the frame where parities are placed in the example of FIG. 12 may be selected as desired.

The data format converting means, DC data generating means, EOB appending means, auxiliary information generating means, formatting means, and modulation/demodulation circuit described in the present embodiment constitute an example of the recording means of the present invention.

As described above, a conversion method according to a first aspect of the invention for converting input data into a format of a digital video/audio encoded signal, in units of prescribed transmission packets, in which the DC component of each of small blocks constituting a screen is located in a fixed position within each of the transmission packets, is characterized in that:

error correction coding is applied to the input data, and additional parity which is a parity resulting from the error correction coding is placed in a predetermined position within the digital video/audio encoded signal; and an end of block code is added in an area where the code word of each small block is placed, the portion of the small block code word area following the end of block code is set as a general-purpose data carrying area, and the data is placed in the general-purpose data carrying area, thereby accomplishing the conversion.

Further, as described above, a conversion method according to a second aspect of the invention for converting input data into a format of a digital video/audio encoded signal, in units of prescribed transmission packets, in which the DC component of each of small blocks constituting a screen, class information, and motion information are located in fixed positions within each of the transmission packets, is characterized in that:

error correction coding is applied to the input data, and additional parity which is a parity resulting from the error correction coding is placed in a predetermined position within the digital video/audio encoded signal; and the portion of the small block code word area following the end of block code, the area where the class information is recorded, and the area where the motion information is recorded are set as general-purpose data carrying areas, and the data is placed in the general-purpose data carrying areas, thereby accomplishing the conversion.

Further, as described above, a conversion method according to a third aspect of the invention is related to the conversion method of the first or second aspect of the invention, and characterized in that:

the portion following the end of block code in each small block within a first prescribed recording packet is set as an additional parity recording area, the portion following the end of block code in each small block within a second prescribed recording packet is set as a general-purpose data recording area, and the input data is recorded in the general-purpose data recording area; and the conversion is performed so that the additional parity is placed in an additional parity recording area set within the general-purpose data recording area of the first prescribed packet, and so that the input data is placed in the general-purpose data recording area of the second prescribed packet.

Further, as described above, a conversion method according to a fourth aspect of the invention is related to the conversion method of the first or second aspect of the invention, and characterized in that: when the kind of the input data is a digital video/audio signal of a prescribed format, the input data is output unchanged, while when the input data is data other than a digital video/audio signal of the prescribed format, the input data is converted by placing it in the general-purpose data recording area.

All or part of the constituent elements of the recording apparatus, recording system, or recording method of the present invention may be implemented using dedicated hardware, or may be implemented in software using a computer program.

Furthermore, a program recording medium having a program recorded thereon for enabling a computer to implement the functions of all or part of the constituent elements of the recording apparatus, recording system, or recording method of the present invention also falls within the scope of the present invention.

As is apparent from the above description, the present invention can provide a recording apparatus, a recording system, and a recording method, capable of providing a sufficient error correction capability, while maintaining compatibility with the existing digital VTR format, and while making file-by-file access possible, when recording a data file other than video and audio signals of a prescribed digital VTR format.

Embodiment C1

A C1st embodiment of the present invention will be described below with reference to FIGS. 15 and 16.

Figure 15:
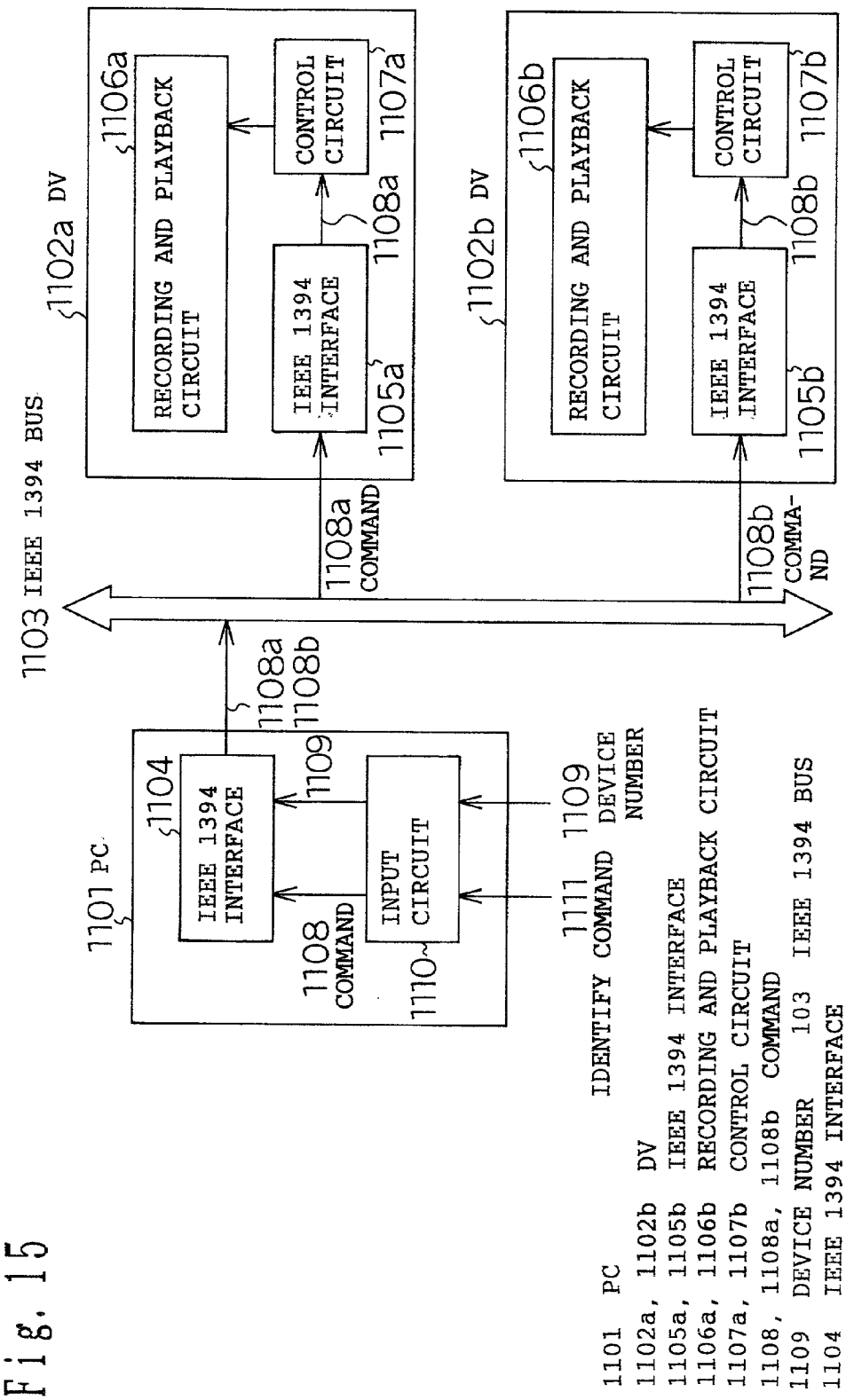
FIG. 15 is a block diagram showing the configuration of a PC and DVs connected to an IEEE 1394 bus according to a C1st embodiment of the present invention.

FIG. 15 shows an example of a PC and DVs connected to an IEEE 1394 bus. In FIG. 15, reference numeral 1101 is the PC which controls the DVs 1102a and 1102b via the IEEE 1394 bus 1103. Reference numerals 1102a and 1102b are the DVs which record and play back data by being controlled from the PC 1101 via the IEEE 1394 bus 1103. Reference numerals 1105a and 1105b are IEEE 1394 interfaces for transferring commands and data via the IEEE 1394 bus 1103. Reference numerals 1106a and 1106b are recording and playback circuits for recording and playing back data. Reference numerals 1107a and 1107b are control circuits which receive commands from the IEEE 1394 interfaces 1105a and 1105b and control the recording and playback circuits 1106a and 1106b in accordance with the contents of the commands. Reference numeral 1111 is an identify command for identifying a device corresponding a device number.

Next, the operation of the present embodiment having the above configuration will be described.

Figure 16:
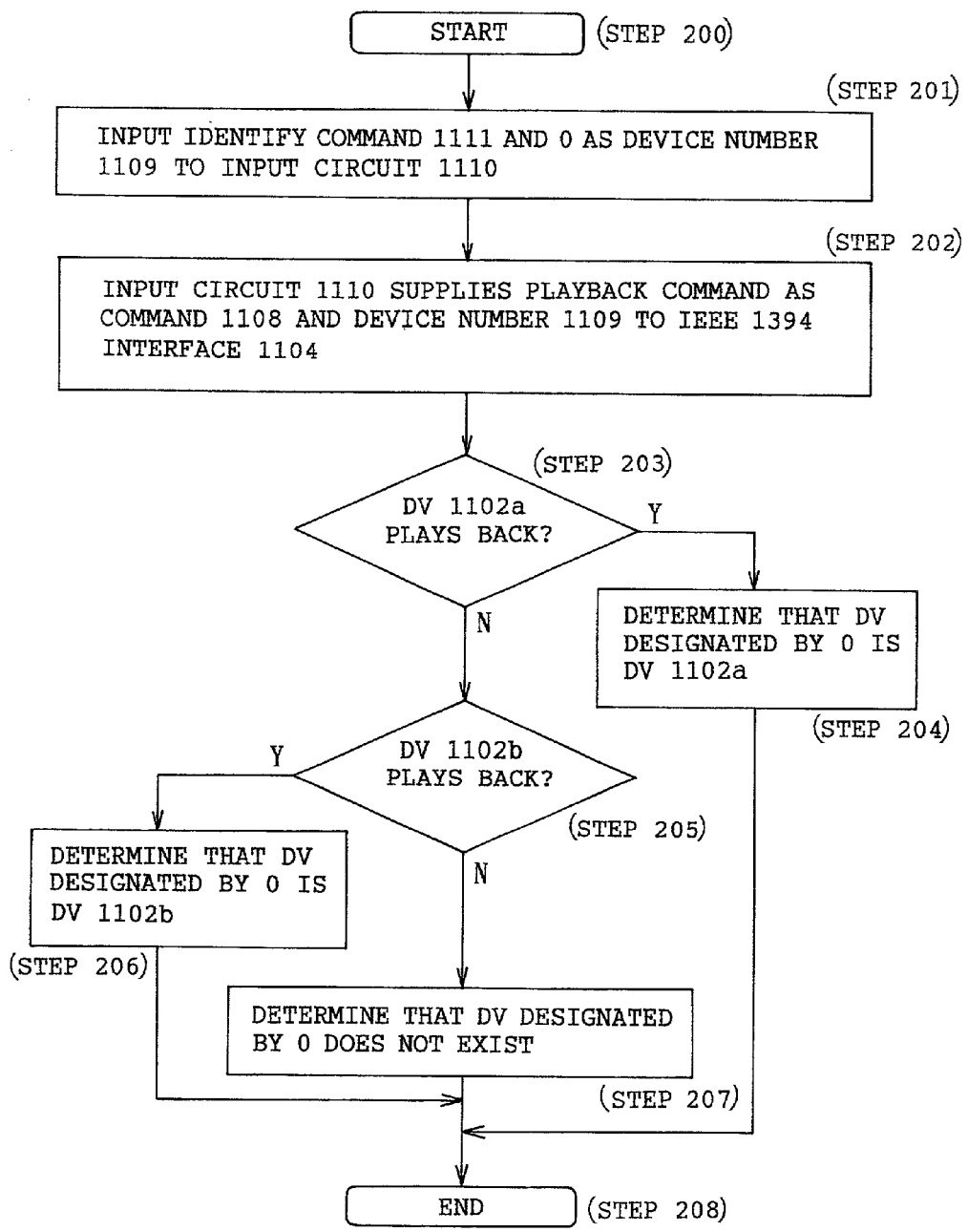
FIG. 16 is a flow chart illustrating a device identification method according to the C1st embodiment of the present invention.

FIG. 16 shows an example of a device identification method.

As explained in the description of the prior art, when controlling the operation of the DV 1102a, the value of the device number (1109) assigned to the DV 1102a and the command 1108 specifying the operation are input to the IEEE 1394 interface 1104.

Suppose that two device numbers (1109), for example, 0 and 1, are already assigned, either one to DV 1102a and the other to DV 1102b. The method of examining which DV is assigned the device number (1109) 0 can be presented in the form of a flow chart, for example, as shown in FIG. 16.

In FIG. 16, the process starts from step 200, followed by step 201 where 0 as the device number (1109) for identification and the device identify command 1111 are input.

In step 202, an input circuit 110 supplies 0 as the device number (1109) and a playback command as the command 1108 to the IEEE 1394 interface 1104.

In step 203, it is checked whether the DV 1102a has started playing back. If the DV 1102a has started playing back, the process proceeds to step 204; otherwise, the process proceeds to step 205.

In step 204, it is determined that the DV assigned the device number (1109) of 0 is the DV 1102a, and the process proceeds to step 208.

In step 205, it is checked whether the DV 1102b has started playing back. If the DV 1102b has started playing back, the process proceeds to step 206; otherwise, the process proceeds to step 207.

In step 206, it is determined that the DV assigned the device number (1109) of 0 is the DV 1102b, and the process proceeds to step 208.

In step 207, it is determined that there is no DV assigned the device number (1109) of 0, and the process proceeds to step 208.

In step 208, the process is terminated.

As described above, in the present embodiment, by inputting the device number (1109) and the identify command 1111 [sic; 111] and by examining which DV responds by playing back, the value of the device number (1109) and the DV assigned the value can be identified.

The time to start the operation for identifying the correspondence between the device number and the actual device corresponding to it need not necessarily be limited to the time that the PC is restarted, but the identifying operation can be started at any desired time, for example, at the time when the user desires to know the correspondence and enters an instruction to that effect. Alternatively, provisions may be made to start the above operation when the PC is restarted or the network is reset or at other appropriate timing, irrespective of the presence or absence of an explicit instruction from the user. This also applies to other embodiments.

In the present embodiment, the playback command is transmitted as the command 1108, but any other operation command may be used as long as it is a command that can check the operation of the DV.

Further, two DVs and one PC are shown connected to the IEEE 1394 bus, but the requirement here is that at least one DV and at least one PC be connected.

The above description has been given by taking the DV as an example of the transmit/receive apparatus, but any kind of transmit/receive apparatus may be used as long as it is capable of operating with an IEEE 1394 interface.

An IEEE 1394 bus has been employed as the bus and an IEEE 1394 interface as the interface, but it will be recognized that any kind of bus or interface may be used as long as the configuration is such that the device number is assigned to control the operation of the transmit/receive apparatus connected to the bus and the device number is subject to change.

Further, the device number (1109) may be assigned appropriately by the PC 1101 or the node ID may be used as the device number itself.

The PC 1101, the DV 1102a, and the DV 1102b may each be constructed using hardware only or both hardware and software.

The DV in the present embodiment is an example of the terminal device of the present invention, the PC in the present embodiment is an example of the computer of the present invention, the transmit/receive apparatus in the present embodiment is an example of the terminal device of the present invention, the IEEE 1394 interface 1104 in the present embodiment is an example of the first interface of the present invention, the IEEE 1394 interfaces 1105a and 1105b in the present embodiment are examples of the second interface of the present invention, the input circuit 110 in the present embodiment is an example of the input means of the present invention, and the control circuits 1107a and 1107b in the present embodiment are examples of the control means of the present invention.

Embodiment C2

A C2nd embodiment of the present invention will be described below with reference to FIG. 17.

Figure 17:
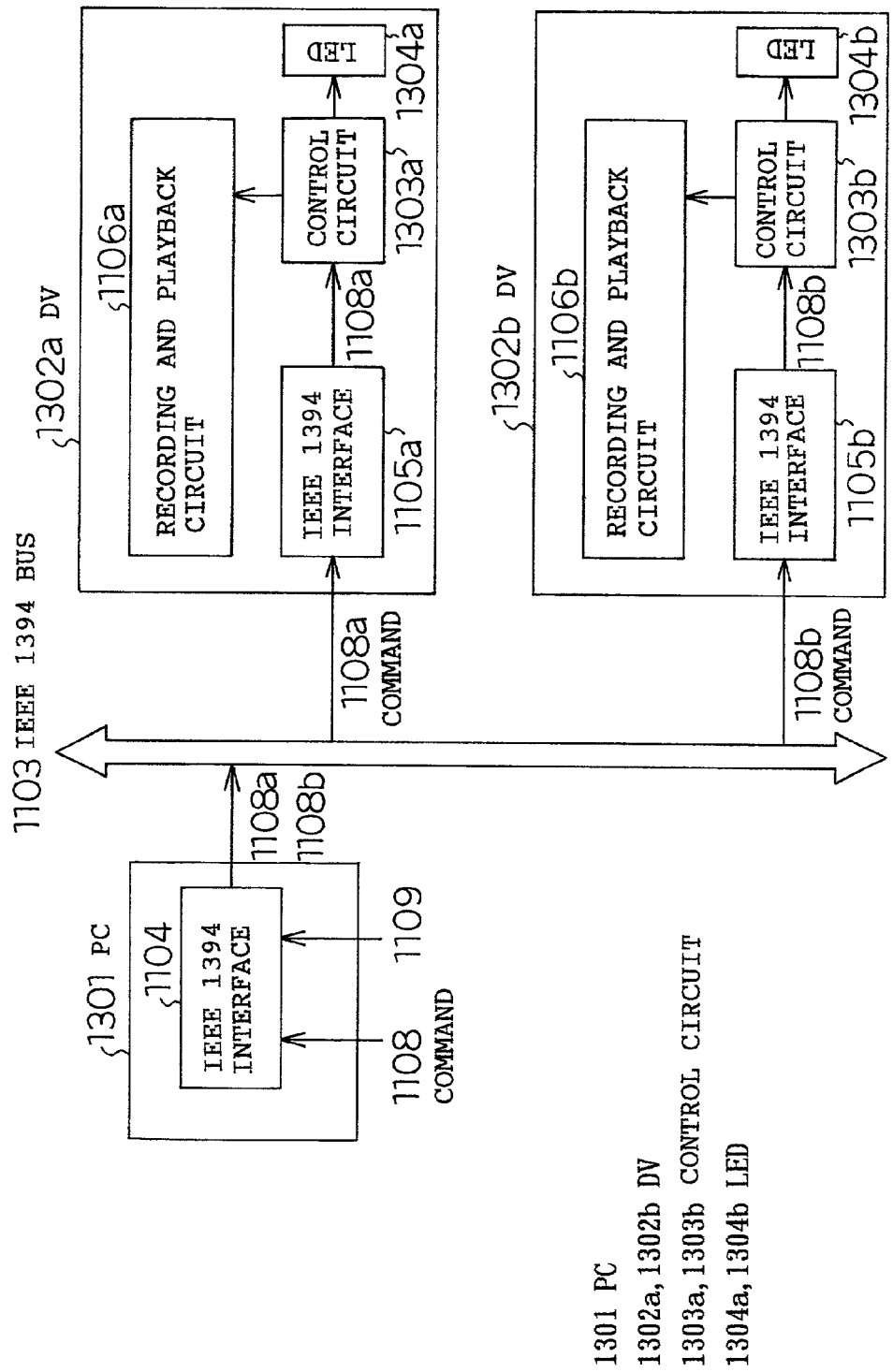
FIG. 17 is a block diagram showing the configuration of a PC and DVs connected to the IEEE 1394 bus according to a C2nd embodiment of the present invention.

FIG. 17 shows an example of a PC and DVs connected to an IEEE 1394 bus. In FIG. 17, reference numerals 1302a and 1302b are the DVs controlled by the PC 1301 via the IEEE 1394 bus 1103.

Further, reference numerals 1303a and 1303b are control circuits for controlling recording and playback circuits 1106a and 1106b and LEDs 1304a and 1304b in accordance with the contents of commands transmitted from the PC 1301 via the IEEE 1394 interface 1103. Reference numerals 1304a and 1304b are the LEDs which turn on and off.

The configuration of the present embodiment differs from the C1st embodiment in that the DVs 1302a and 1302b are provided with the LEDs 1304a and 1304b, respectively.

The operation of the embodiment having the above configuration will be described below.

As explained in the description of the prior art, when controlling the operation of the DV 1302a, the value of the device number (1109) assigned to the DV 1302a and the command 1108 specifying the operation are input to the IEEE 1394 interface 1104.

Suppose, for example, that the value of the device number (1109) indicating the DV 1302a is 0. Here, when 0, as the device number (1109), and a command for turning on the LED, as the command 1108, are input to the IEEE interface 1104, the command 1108 is transmitted to the IEEE 1394 interface 1105a via the IEEE 1394 bus 1103.

The IEEE 1394 interface 1105a passes the received command 1108 to the control circuit 1303a; if the command 1108 is a command for turning on the LED, the control circuit 1303a turns on the LED 1304a.

In this way, when the command for turning on the LED is input as the command 1108 to the IEEE 1394 interface 1103 together with the appropriate device number (1109), the LED on the DV corresponding to the value of the specified device number (1109) illuminates. At this time, if it is not known which DV corresponds to the value of the device number (1109), the DV corresponding to the device number (1109) can be identified by locating the DV whose LED illuminates.

In the present embodiment, two DVs and one PC are shown connected to the IEEE 1394 bus, but the requirement here is that at least one DV and at least one PC be connected.

The above description has been given by taking the DV as an example of the transmit/receive apparatus, but any kind of transmit/receive apparatus may be used as long as it is capable of controlling the operation with an IEEE 1394 interface.

An IEEE 1394 bus has been employed as the bus and an IEEE 1394 interface as the interface, but it will be recognized that any kind of bus or interface may be used as long as the configuration is such that the device number is assigned to control the operation of the transmit/receive apparatus connected to the bus and the device number is subject to change.

Further, the device number (1109) may be assigned appropriately by the PC 1301 [sic; 1301] or the node ID may be used as the device number itself.

The PC 1301, the DV 1302a, and the DV 1302b may each be constructed using hardware only or both hardware and software.

The DV in the present embodiment is an example of the terminal device of the present invention, and the PC in the present embodiment is an example of the computer of the present invention. The transmit/receive apparatus in the present embodiment is an example of the terminal device of the present invention, and the IEEE 1394 interface 1104 in the present embodiment is an example of the first interface of the present invention.

The IEEE 1394 interfaces 1105a and 1105b in the present embodiment are examples of the second interface of the present invention, and the LEDs 1304a and 1304b in the present embodiment are examples of the illuminating means of the present invention. The control circuits 1303a and 1303b in the present embodiment are examples of the control means of the present invention.

Embodiment C3

A C3rd embodiment of the present invention will be described below with reference to FIG. 18.

Figure 18:
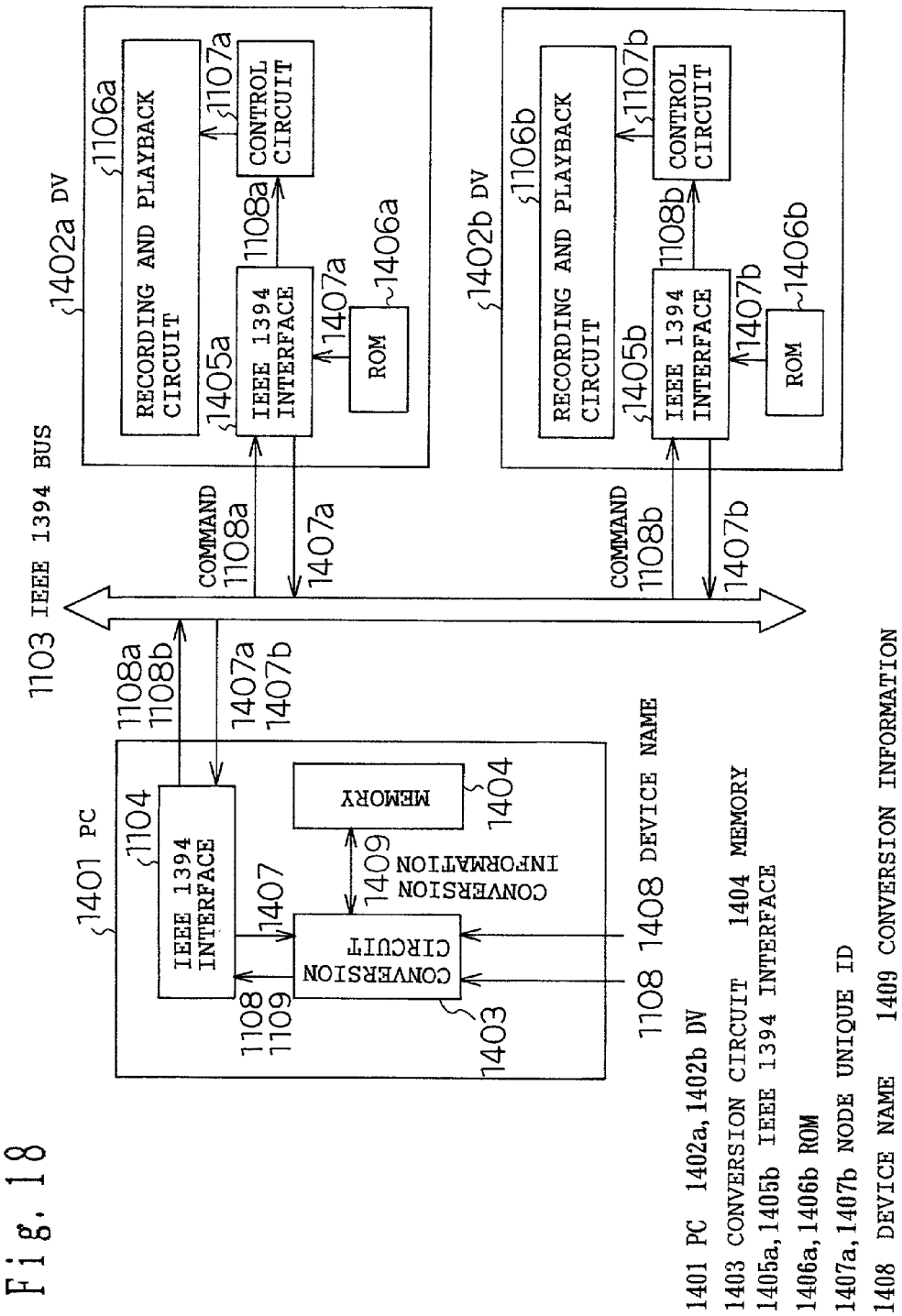
FIG. 18 is a block diagram showing the configuration of a PC and DVs connected to the IEEE 1394 bus according to a C3rd embodiment of the present invention.

FIG. 18 shows an example of a PC and DVs connected to an IEEE 1394 bus.

In FIG. 18, reference numeral 1401 is the PC which controls the DVs 1402a and 1402b via the IEEE 1394 bus 1103. Reference numerals 1402a and 1402b are the DVs which record and play back data by being controlled from the PC 1401 via the IEEE 1394 bus 1103.

Reference numeral 1403 is a conversion circuit which updates conversion information 1409 stored in memory 1404, each time the device number (1109) assigned to the DV 1402a or 1402b is updated. Reference numeral 1404 is the memory for storing a combination of device name 1408, node unique ID 1407, and device number (1109) assigned to each DV 1402a, 1402b.

Reference numerals 1405a and 1405b are IEEE 1394 interfaces for transferring data and commands via the IEEE 1394 bus 1103. Reference numerals 1406a and 1406b are ROMs for storing the node unique IDs of the respective DVs 1402a and 1402b. Reference numerals 1407a and 1407b are the node unique IDs of the respective DVs 1402a and 1402b.

Reference numeral 1408 is the device name that uniquely identifies each DV 1402a, 1402b. Reference numeral 1409 is the conversion information that holds information concerning the combination of the device name 1408, node unique ID 1407, and device number (1109) of each DV. The configuration of the present embodiment differs from that of the C1st embodiment in that the input circuit is replaced by the conversion circuit and memory circuit, and in that each DV includes a ROM.

The operation of the present embodiment having the above configuration will be described below.

FIG. 25 is a diagram showing one example of the conversion information.

As explained in the description of the prior art, when controlling the operation of the DV 1402a, the value of the device number (1109) assigned to the DV 1402a and the command 1108 specifying the operation are input to the IEEE 1394 interface 1104.

The DV 1402a holds its node unique ID 1407a in the ROM 1406a, the node unique ID being unique to the device in that no two devices will have the same number; likewise, the DV 1402b holds its node unique ID 1407b in the ROM 1406b.

By sending a command for presenting the node unique ID as needed, the IEEE 1394 interface 1405a retrieves its node unique ID 1407a from the ROM 1406a, and transmits it to the PC 1401 via the IEEE 1394 bus 1103. The IEEE 1394 interface 1104 passes the received node unique ID 1407a as the node unique ID 1407 to the conversion circuit 1403.

Each DV is preassigned the device name 1408. The combination of the device name 1408, node unique ID 1407, and device number (1109) of each DV is stored as the conversion information 1409 in the memory 1404. The conversion circuit 1403 updates the conversion information 1409 stored in the memory 1404, each time the device number (1109) assigned to each DV is updated.

Suppose, for example, that the information shown in the BEFORE RESTART column in FIG. 25 is stored as the conversion information 1409.

When controlling the operation of the DV 1402a, the appropriate command 1108 and "FIRST" as the device name 1408 are input to the conversion circuit 1403. The conversion circuit 1403 retrieves the conversion information 1409 from the memory 1404, and supplies 0 as the device number (1109) corresponding to "FIRST" to the IEEE 1394 interface 1104 together with the command 1108. The IEEE 1394 interface 1104, as in the case of the prior art, transmits the command 1108 as the command 1108a to the DV 1402a corresponding to the device number (1109) of 0.

The IEEE 1394 interface 1405a passes the received command 1108a to the control circuit 1107a, and the control circuit 1107a instructs the recording and playback circuit 1106a to perform the specified operation in accordance with the contents of the received command 1108a.

Suppose here that the PC 1401 is restarted and the combination of the device number, device name, and node unique ID has changed as shown in the AFTER RESTART column in FIG. 25.

At the same time, the conversion information 1409 stored in the memory 1404 is updated to the contents shown in the AFTER RESTART column in FIG. 25. Though the device number assigned to each DV changes, the combination of the device name and node unique ID remains unchanged; accordingly, the conversion circuit 1403 can correctly convert the input device name 1408 into the device number (1109) of the corresponding DV.

In this way, even in an environment where the device number does not always remain the same, the DV can be correctly identified based on the device name or the node unique ID.

In the present embodiment, two DVs and one PC are shown connected to the IEEE 1394 bus, but the requirement here is that at least one DV and at least one PC be connected.

The above description has been given by taking the DV as an example of the transmit/receive apparatus, but any kind of transmit/receive apparatus may be used as long as it is capable of controlling the operation with an IEEE 1394 interface.

An IEEE 1394 bus has been employed as the bus and an IEEE 1394 interface as the interface, but it will be recognized that any kind of bus or interface may be used as long as the configuration is such that the device number is assigned to control the operation of the transmit/receive apparatus connected to the bus and the device number is subject to change.

Further, the device number (1109) may be assigned appropriately by the PC 1401 [sic; 1401] or the node ID may be used as the device number itself.

The PC 1401, the DV 1402*a*, and the DV 1402*b* may each be constructed using hardware only or both hardware and software.

The DV in the present embodiment is an example of the terminal device of the present invention, and the PC in the present embodiment is an example of the computer of the present invention. The transmit/receive apparatus in the present embodiment is an example of the terminal device of the present invention, and the IEEE 1394 interface 1104 in the present embodiment is an example of the first interface of the present invention.

The IEEE 1394 interfaces 1405*a* and 1405*b* in the present embodiment are examples of the second interface of the present invention. The memory 1404 in the present embodiment is an example of the first memory of the present invention, and the ROMs 1406*a* and 1406*b* in the present embodiment are examples of the second memory of the present invention. The conversion circuit 1403 in the present embodiment is an example of the converting means of the present invention, and the control circuits 1107*a* and 1107*b* in the present embodiment are examples of the control means of the present invention.

Embodiment C4

A C4th embodiment of the present invention will be described below with reference to FIGS. 19 and 20.

Figure 19:
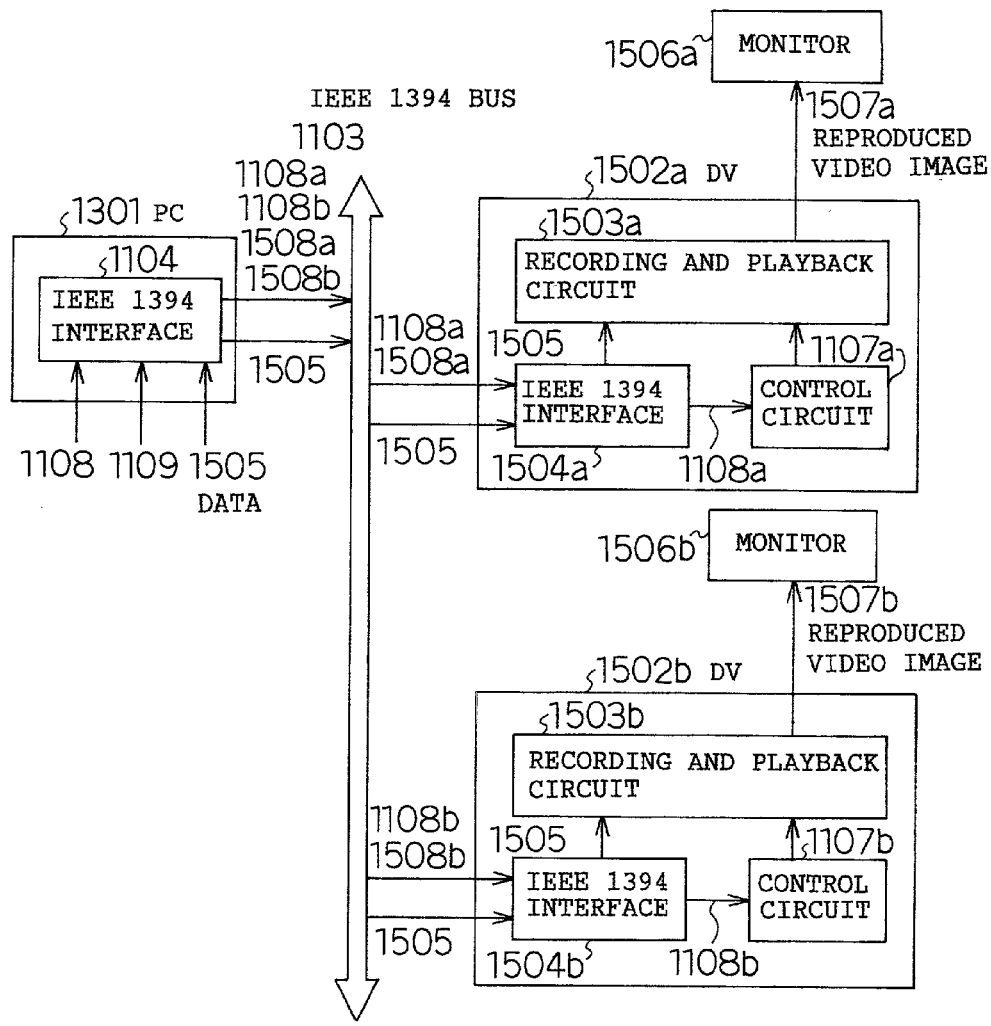
FIG. 19 is a block diagram showing the configuration of a PC and DVs connected to the IEEE 1394 bus according to a C4th embodiment of the present invention.

FIG. 19 shows an example of a PC and DVs connected to an IEEE 1394 bus. In FIG. 19, reference numeral 1501 is the PC which controls the DVs 1502*a* and 1502*b* via the IEEE 1394 bus 1103. Reference numerals 1508*a* and 1508*b* are change instructions for changing the channels over which the respective DVs are currently receiving.

The configuration of the present embodiment differs from that of the C1st embodiment in that the input circuit is omitted from the PC 1501 [sic; 1501 ], and in that the DVs 1502*a* and 1502*b* are provided with monitors 1506*a* and 1506*b*, respectively.

The operation of the present embodiment having the above configuration will be described below.

Figure 20:
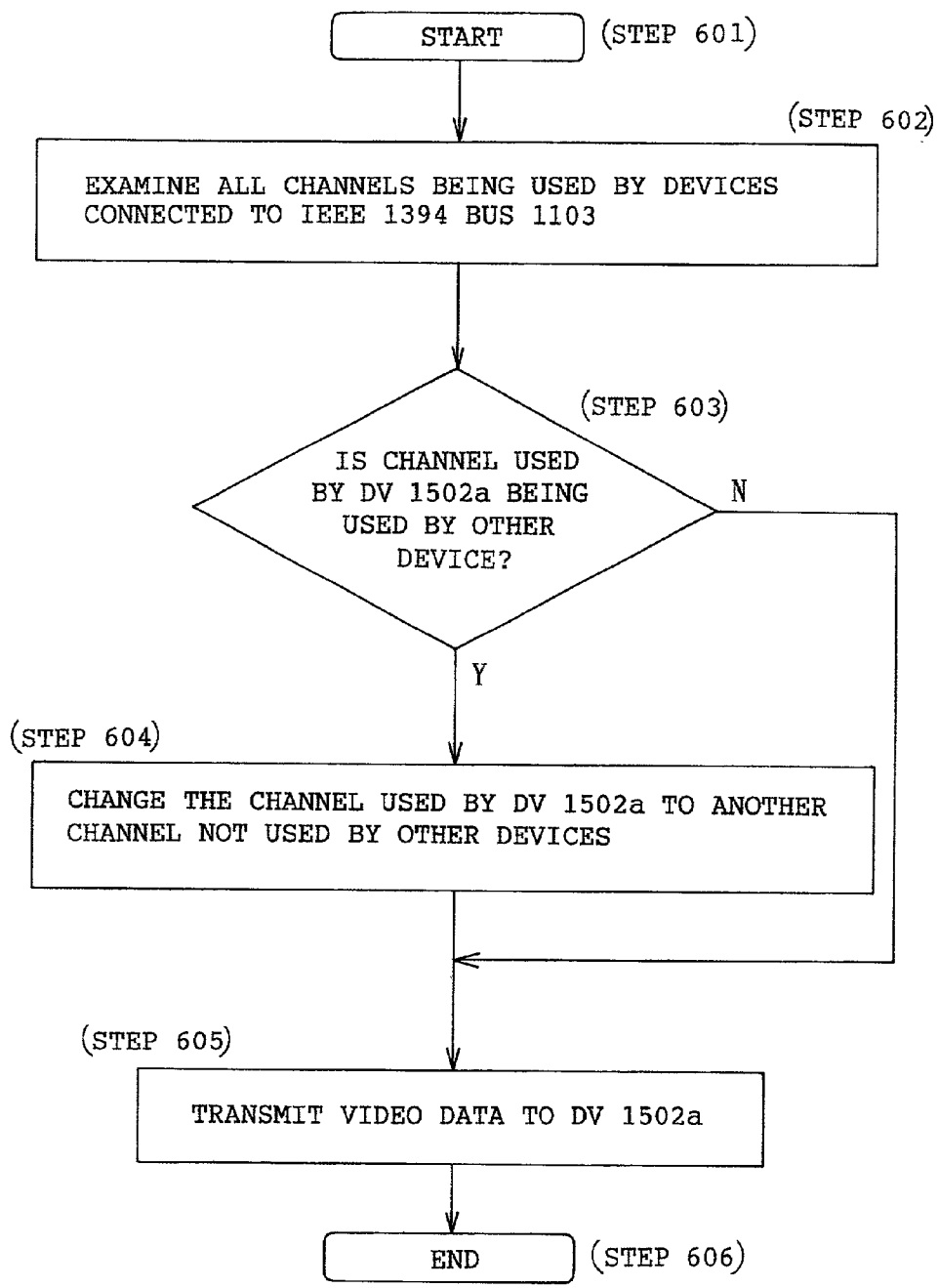
FIG. 20 is a flow chart illustrating a method of transmitting an identifying video image according to the C4th embodiment of the present invention.

FIG. 20 shows an example of a method of transmitting an identifying video image.

In the present embodiment, the method of controlling the operation of the DV 1502*a* from the PC 1501 and the method of transmitting data 1505 from the PC 1501 to the DV 1502*a* are the same as those in the prior art.

The IEEE 1394 interface 1104 has the capability of changing the receive channel used by the DV 1502*a* by sending via the IEEE 1394 bus 1103 to the DV 1502*a* the change instruction 1508*a* for changing the receive channel being used by the DV 1502*a*.

When it is desired to distinguish the DV designated by the value of a certain device number (1109), appropriate video data is input as the data 1505 to the IEEE 1394 interface 1104, together with the desired value as the device number (1109). If the input device number (1109) designates, for example, the DV 1502*a*, the IEEE 1394 interface 1104 transmits the data 1505 to the DV 1502*a*.

The IEEE 1394 interface 1504*a* passes the received data 1505 to the recording and playback circuit 1503*a*, and the recording and playback circuit 1503*a* plays back the data 1505 and displays a reproduced video image 1507*a* on the monitor 1506*a*. By examining on which DV the transmitted data 1505 is played back, the DV designated by the input value of the device number (1109) can be distinguished.

As previously described in connection with the prior art, the IEEE 1394 bus 1103 allows different communications to proceed concurrently over a plurality of channels.

Here, if the DVs 1502*a* and 1502*b* are using the same channel as the receive channel, the data 1505 transmitted from the PC 1501 to the intended receiver, in this case, the DV 1502*a*, is also received by the DV 1502*b* and played back by the recording and playback circuit 1503*b*.

That is, the reproduced video image 1507*b* displayed on the monitor 1506*b* is exactly the same as the reproduced video image 1507*a*, rendering it impossible to distinguish between the DV 1502*a* and the DV 1502*b*.

FIG. 20 shows an example of how the data for distinguishing the DV is transmitted while preventing the data from being played back at the same time on other DVs.

In FIG. 20, the process starts from step 601, followed by step 602 where the IEEE 1394 interface 1104 examines all the channels being used by the devices connected to the IEEE 1394 bus 1103.

In step 603, the channel used by the DV 1502*a* is examined to see if it is being used by any other device. If some other device is using the same channel, the process proceeds to step 604; otherwise, the process proceeds to step 605.

In step 604, the IEEE 1394 interface 1104 transmits the change instruction 1508*a* to the DV 1502*a* to instruct the DV 1502*a* to change its receive channel to another channel not used by other devices, and then the process proceeds to step 605.

In step 605, using the receive channel of the DV 1502*a*, the IEEE 1394 interface 1104 transmits the data 1505 to the DV 1502*a* via the IEEE 1394 bus 1103.

The process is then terminated in step 606.

If the receive channel of the DV connected to the IEEE 1394 bus 1103 and corresponding to the designated device number is changed by specifying the device number as described above, a different receive channel can be assigned to each DV connected to the IEEE 1394 bus 1103.

In this way, by transmitting certain data using the value of a particular device number, and by examining which DV plays back the transmitted data, the DV designated by the value of the particular device number can be distinguished even in an environment where the device number does not always remain the same.

In the present embodiment, two DVs and one PC are shown connected to the IEEE 1394 bus, but the requirement here is that at least one DV and at least one PC be connected.

The above description has been given by taking the DV as an example of the transmit/receive apparatus, but any kind of transmit/receive apparatus may be used as long as it is capable of controlling the operation with an IEEE 1394 interface.

The data 1505 has been described as being video data, but the data 1505 may be audio data or video/audio data, and the audio played back by the recording and playback circuit 1503*a* may be reproduced through a speaker or the like.

An IEEE 1394 bus has been employed as the bus and an IEEE 1394 interface as the interface, but it will be recognized that any kind of bus or interface may be used as long as the configuration is such that the device number is assigned to control the operation of the transmit/receive apparatus connected to the bus and the device number is subject to change.

Further, the device number (1109) may be assigned appropriately by the PC 1501 [sic; 1501] or the node ID may be used as the device number itself.

The PC 1501, the DV 1502a, and the DV 1502b may each be constructed using hardware only or both hardware and software.

The DV in the present embodiment is an example of the terminal device of the present invention, the PC in the present embodiment is an example of the computer of the present invention, and the transmit/receive apparatus in the present embodiment is an example of the terminal device of the present invention Embodiment C5

A C5th embodiment of the present invention will be described below with reference to FIG. 21.

Figure 21:
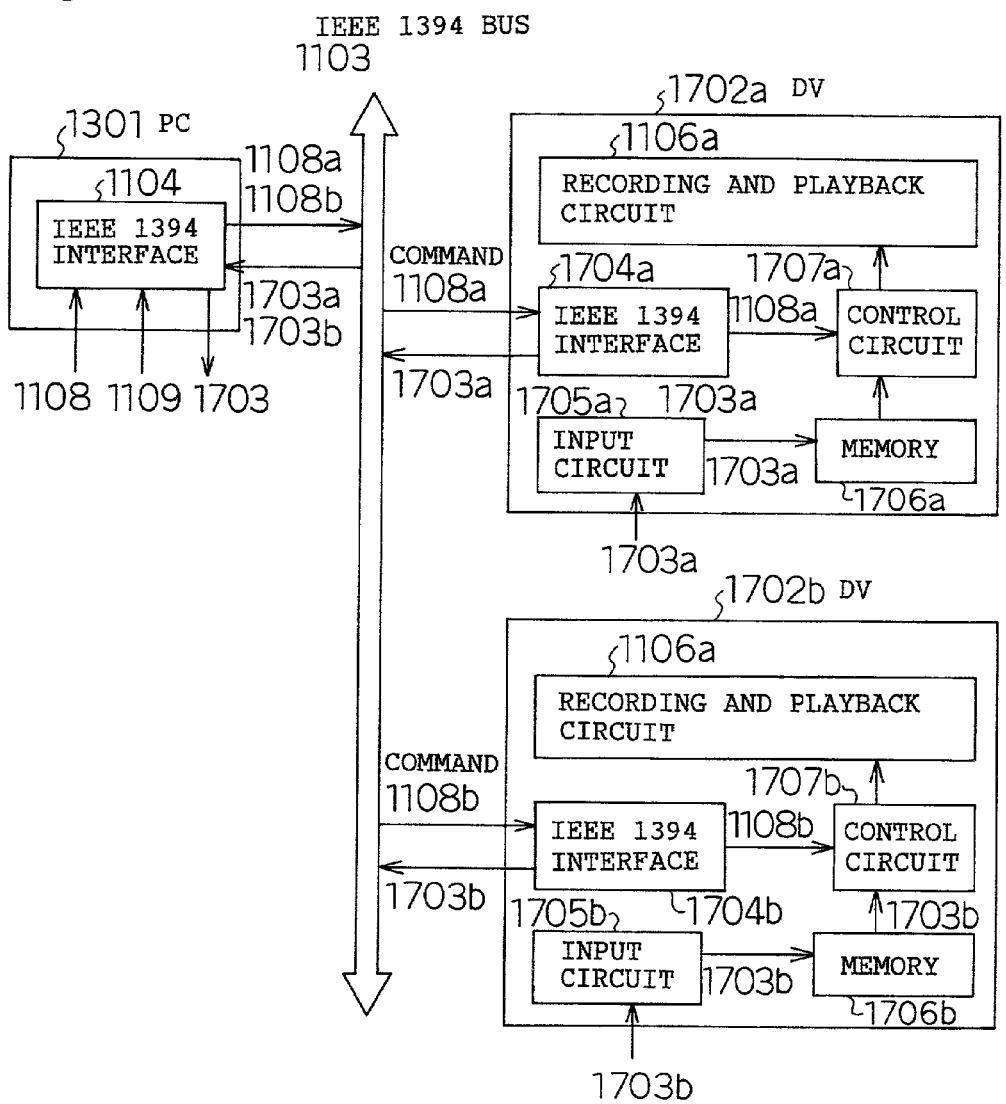
FIG. 21 is a block diagram showing the configuration of a PC and DVs connected to the IEEE 1394 bus according to a C5th embodiment of the present invention.

FIG. 21 shows an example of a PC and DVs connected to an IEEE 1394 bus. In FIG. 21, reference numerals 1702a and 1702b are the DVs controlled by the PC 1301 via the IEEE 1394 bus 1103.

Further, reference numerals 1703a and 1703b are identifying information for uniquely identifying the DV 1702a and DV 1702b, respectively. Reference numerals 1704a and 1704b are IEEE 1394 interfaces for transferring data and commands via the IEEE 1394 bus 1103.

Reference numerals 1705a and 1705b are input circuits for inputting the identifying information. Reference numerals 1706a and 1706b are memories for storing the identifying information input from the input circuits 1705a and 1705b, respectively. Reference numerals 1707a and 1707b are control circuits for controlling the recording and playback circuits 1106a and 1106b in accordance with the contents of commands received via the IEEE 1394 interfaces 1704a and 1704b.

The configuration of the present embodiment differs from that of the C1st embodiment in that the input circuit is omitted from the PC 1301, and in that the DVs 1702a and 1702b are provided with the input circuit 1705a, 1705b and memory 1706a, 1706b.

The operation of the present embodiment having the above configuration will be described below.

In the present embodiment, the method of controlling the operation of the DV 1702a from the PC 1301 is the same as that in the prior art.

The identifying information 1703a input by the input circuit 1705a is stored in the memory 1706a. Here, the identifying information 1703a is information for identifying the DV 1702a, for example, an appropriate numeric value or the like unique to the DV 1702. This identifying information is, for example, a numeric value like a SCSI ID of a SCSI device in which the SCSI ID can be changed using a DIP switch.

When a command for acquiring the identifying information 1703 is received as the command 1108, the control circuit 1707a retrieves the identifying information 1703a from the memory 1706a, and transfers it to the IEEE 1394 interface 1704a. The IEEE 1394 interface 1704a transmits the identifying information 1703a to the PC 1301 via the IEEE 1394 bus 1103.

In this way, by sending a command for acquiring the identifying information for the value of a particular device number, the DV designated by the value of that device number can be identified based on the identifying information acquired from the DV.

In the present embodiment, two DVs and one PC are shown connected to the IEEE 1394 bus, but the requirement here is that at least one DV and at least one PC be connected.

The above description has been given by taking the DV as an example of the transmit/receive apparatus, but any kind of transmit/receive apparatus may be used as long as it is capable of controlling the operation with an IEEE 1394 interface.

An IEEE 1394 bus has been employed as the bus and an IEEE 1394 interface as the interface, but it will be recognized that any kind of bus or interface may be used as long as the configuration is such that the device number is assigned to control the operation of the transmit/receive apparatus connected to the bus and the device number is subject to change.

Further, the device number (1109) may be assigned appropriately by the PC 1101 or the node ID may be used as the device number itself.

The PC 1301, the DV 1702a, and the DV 1702b may each be constructed using hardware only or both hardware and software.

The DV in the present embodiment is an example of the terminal device of the present invention, and the PC in the present embodiment is an example of the computer of the present invention. The transmit/receive apparatus in the present embodiment is an example of the terminal device of the present invention, and the IEEE 1394 interface 1104 in the present embodiment is an example of the first interface of the present invention.

The IEEE 1394 interfaces 1704a and 1704b in the present embodiment are examples of the second interface of the present invention. The memories 1706a and 1706b in the present embodiment are examples of the second memory of the present invention, and the control circuits 1707a and 1707b in the present embodiment are examples of the control means of the present invention. The input circuits 1705a and 1705b in the present embodiment are examples of the input means of the present invention.

Embodiment C6

A C6th embodiment of the present invention will be described below with reference to FIG. 22.

Figure 22:
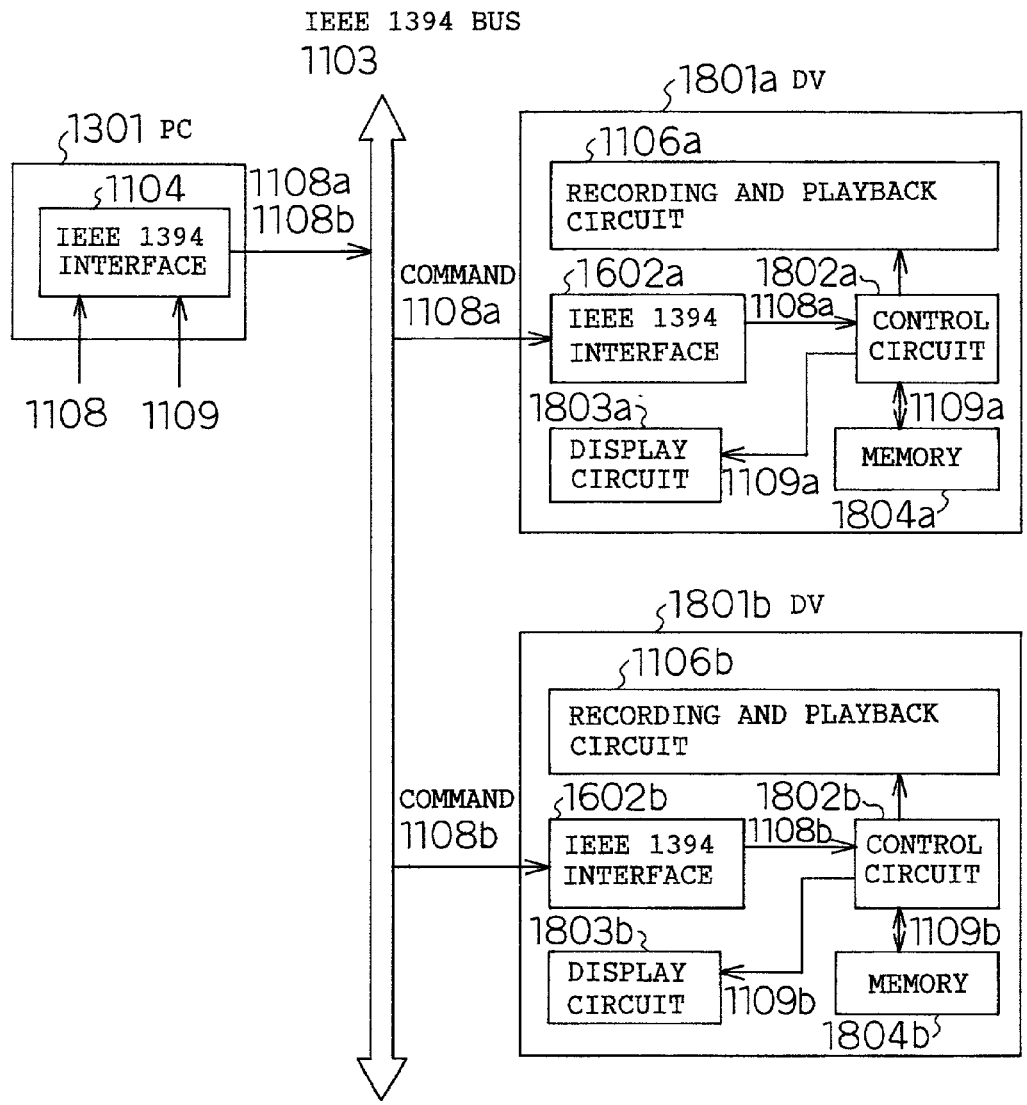
FIG. 22 is a block diagram showing the configuration of a PC and DVs connected to the IEEE 1394 bus according to a C6th embodiment of the present invention.
Figure 23:
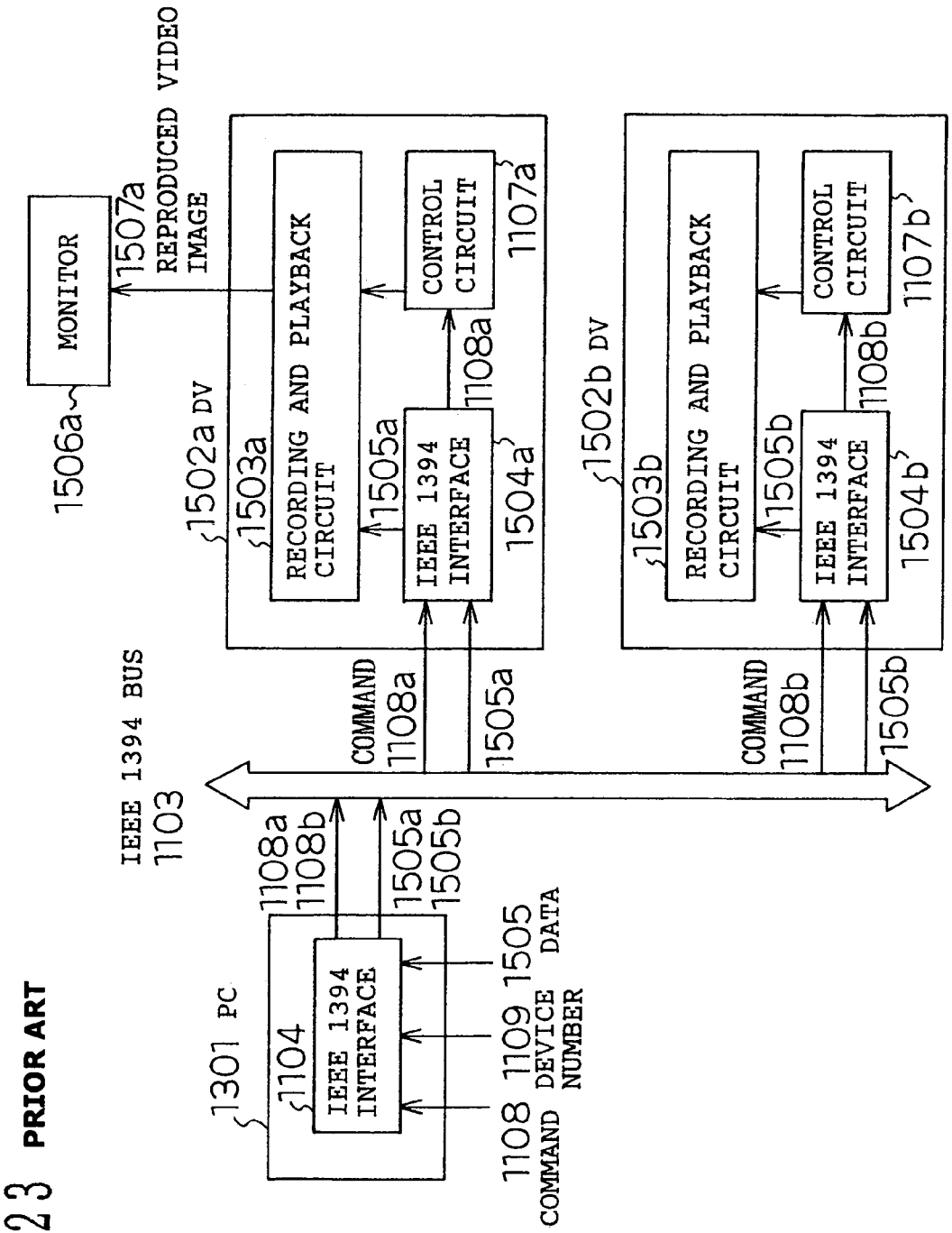
FIG. 23 is a block diagram showing the configuration of a PC and DVs connected to the IEEE 1394 bus according to the prior art.

FIG. 22 shows an example of a PC and DVs connected to an IEEE 1394 bus. In FIG. 22, DV 1801a and DV 1801b are the DVs controlled by the PC 1301 via the IEEE 1394 bus 1103. Reference numerals 1109a and 1109b are the values of the device numbers (1109) assigned to the DV 1801a and DV 1801b, respectively.

Reference numerals 1802a and 1802b are control circuits for controlling display circuits 1803a and 1803b, memories 1804a and 1804b, and recording and playback circuits 1106a and 1106b in accordance with the contents of the commands passed from the IEEE 1394 interfaces 1602a and 1602b. Reference numerals 1803a and 1803b are the display circuits for displaying the respective device numbers. Reference numerals 1804a and 1804b are the memories in which the respective device numbers are recorded.

The configuration of the present embodiment differs from that of the C1st embodiment in that the input circuit is omitted from the PC 1301, and in that the DVs 1801a and 1801b are provided with the display circuit 1803a, 1803b and memory 1804a, 1804b.

The operation of the present embodiment having the above configuration will be described below.

In the present embodiment, the method of controlling the operation of the DV 1801a from the PC 1301 is the same as that in the prior art.

When a command for recording the device number (1109) is received as the command 1108a, the control circuit 1802a extracts the value 1109a of the device number (1109) from the received command 1108a, and records it in the memory 1804a.

When the need arises, the control circuit 1802a retrieves the value 1109a of the device number recorded in the memory 1804a, and has the display circuit 1803a display it.

When the value of the device number (1109) assigned to each DV is changed, the PC 1301 sends the command for recording the device number (1109) to instruct the DVs to record the value of the new device number (1109); in this way, the value 1109a of the device number recorded in the memory 1804a is updated to always reflect the device number (1109) actually assigned to the DV 1801a.

By having each DV display the device number assigned to it, as described above, the DV designated by the value of a particular device number can be distinguished.

In the present embodiment, two DVs and one PC are shown connected to the IEEE 1394 bus, but the requirement here is that at least one DV and at least one PC be connected.

The above description has been given by taking the DV as an example of the transmit/receive apparatus, but any kind of transmit/receive apparatus may be used as long as it is capable of controlling the operation with an IEEE 1394 interface.

An IEEE 1394 bus has been employed as the bus and an IEEE 1394 interface as the interface, but it will be recognized that any kind of bus or interface may be used as long as the configuration is such that the device number is assigned to control the operation of the transmit/receive apparatus connected to the bus and the device number is subject to change.

Further, the device number (1109) may be assigned appropriately by the PC 1301 [sic; 1301] or the node ID may be used as the device number itself.

The PC 1301, the DV 1801a, and the DV 1801b may each be constructed using hardware only or both hardware and software.

The DV in the present embodiment is an example of the terminal device of the present invention, and the PC in the present embodiment is an example of the computer of the present invention. The transmit/receive apparatus in the present embodiment is an example of the terminal device of the present invention, and the display circuit in the present embodiment is an example of the display means of the present invention.

The IEEE 1394 interface 1104 in the present embodiment is an example of the first interface of the present invention. The IEEE 1394 interfaces 1602a and 1602b in the present embodiment are examples of the second interface of the present invention. The control circuits 1802a and 1802b in the present embodiment are examples of the control means of the present invention.

The present invention may be implemented by a program executable by a computer such as a PC; in that case, by recording the program on a recording medium such as a floppy disk, a CD (compact disc), or a magneto-optical disk, and by transferring it to other independent computer such as a PC, the program can be easily executed on the computer.

A program recording medium having a program recorded thereon for enabling a computer to implement the functions of the present invention also falls within the scope of the present invention.

As described above, according to the present invention, a method of acquiring correspondence between node and terminal device, a computer, a terminal device, and a program recording medium can be provided whereby in a network where the device number designating a device changes, the device designed by a particular device number can be easily distinguished.

Furthermore, according to the present invention, by making provision to access a device by using a unique device name instead of the device number, a method of acquiring correspondence between node and terminal device, a computer, a terminal device, and a program recording medium can be provided whereby in a network where the device number identifying a device changes, the device can be easily identified.

POTENTIAL FOR EXPLOITATION IN INDUSTRY

As described above, according to the present invention, the information processing means is configured to process not only the response information of the first format returned in response to the first transmit request output from the first transmit request means, but also the response information of the first format into which response information of the second format has been converted by the converting means; with this configuration, the information processing means, which can process only the response information of the first format, can be made to process the response information of the second format corresponding to the second transmit request that the second transmit request means outputs to request an output of connection information different from that requested by the first transmit request.

What is claimed is:

1. A method of acquiring correspondence between a node and a terminal device, which uses a system comprising a computer connected to a network and a plurality of said terminal devices connected to said network, wherein
when said computer sends a command into said network for operating or stopping an operation of said terminal device, said computer sends out said command with an automatically assigned node number while sequentially changing the automatically assigned node number to a number other than the node number of said computer,
said terminal device in of said plurality of terminal devices said network receives said command and, in response, starts operating or stops the operation,
said computer monitors said operating or said stopping of the operation and recognizes a correspondence between the node number sent out together with said command and a timing of the terminal device operating or stopping the operation based on the timing of the command thus sent out, and
by performing said monitoring and said recognizing for each sequentially changed automatically assigned node number, a correspondence between a plurality of node numbers and said plurality of terminal devices is acquired from said recognition.

2. A method of acquiring correspondence between a node and a terminal device according to claim 1, further comprising the step of:
the terminal device corresponding to a desired node number is sought from said recognition.

3. A method of acquiring correspondence between a node and a terminal device according to claim 1, wherein
said terminal device includes an illuminating means, and said operating or said stopping of the operation, respectively, is turning on or turning off said illuminating means.

4. A method of acquiring correspondence between a node and a terminal device according to claim 1, wherein said command is for said terminal device to supply said computer with identifying information with which said terminal device can be identified uniquely.

5. A method of acquiring correspondence between a node and a terminal device according to claim 4, wherein
said network is first reset, and when said network is first reset said computer creates a list carrying said identifying information or a name designating said terminal device in corresponding relationship to said automatically assigned node number based on said identifying information received from said terminal device, and each time said network is reset thereafter, said computer updates said list, and the correspondence between said plurality of node numbers and said plurality of terminal devices is acquired by referencing said list.

6. A method of acquiring correspondence between a node and a terminal device according to claim 5, wherein said identifying information is a node unique ID.

7. A method of acquiring correspondence between a node and a terminal device, which uses a system comprising a computer connected to a network and a plurality of terminal devices connected to said network, wherein
when said computer sends data into said network to be slaved back on said terminal device, said computer sends out said data with an automatically assigned plurality of node numbers while sequentially changing the automatically assigned node numbers to another number other than a node number of said computer,
said computer monitors said playback, and recognizes a correspondence between the node numbers sent out together with said data and a timing for the terminal device playing back said data, and
by performing said monitoring and said recognizing for each sequentially changed automatically assigned node number, a correspondence between said plurality of node numbers and said plurality of terminal devices is acquired from each result of said recognition.

8. A method of acquiring correspondence between a node and a terminal device according to claim 7, further comprising the step of:
the terminal device corresponding to a desired node number is sought from said recognition.

9. A method of acquiring correspondence between a node and a terminal device according to claim 7, wherein a channel used by said data is assigned in such a manner as to be able to uniquely identify said node number.

10. A method of acquiring correspondence between a node and a terminal device according to claim 4, wherein said identifying information is a numeric value.

11. A method of acquiring correspondence between a node and a terminal device according to claim 2, wherein
said terminal device includes a display means, and
said command is for displaying the desired node number corresponding to said terminal device on said display means.

12. A method of acquiring correspondence between a node and a terminal device according to claim 1, wherein said terminal device is a home VCR.

13. A method of acquiring correspondence between a node and a terminal device according to claim 1, wherein each of said plurality of node numbers is a device number.

14. A method of acquiring correspondence between a node and a terminal device according to claim 1, wherein said network is an IEEE 1394 bus.

15. A program recording medium having a program recorded thereon for causing a computer to implement the functions of the method of acquiring correspondence between a node and a terminal device described in claim 1.

16. A computer which uses a system comprising a computer connected to a network and a plurality of terminal devices connected to the network, said computer comprising:
input means of inputting one of an automatically assigned node number and a device number, other than a node number of said computer, to a terminal device having (1) a second interface which receives a command sent out from said computer via said network and (2) control means for performing control so as to execute said command received via said second interface; and
a first interface which sends out into said network a command for operating or stopping an operation of said terminal device, while sequentially changing said one of said node number and said device number input by said input means, wherein
said command, alone with said one of said node number and said device number, is sent to said terminal device via said network,
said computer monitors said operating or said stopping of the operation and recognizes a correspondence between said one of the node number and the device number sent out together with said command and a timing of said terminal device operating or stopping the operation based on the timing of the command thus sent out, and
by performing said monitoring and said recognizing for each sequentially changed one of said node number and said device number, a correspondence between a plurality of node numbers or device numbers and said plurality of terminal devices is acquired from said recognition.

17. A computer which uses a system comprising said computer connected to a network and a plurality of terminal devices connected to said network, said computer comprising:
a first interface which, when said network is reset, sends out a command for requesting a node unique ID to said terminal devices into said network, while sequentially changing one of a node number and a device number as a destination ID or by appending to said command a description as a destination ID indicating delivery to all connected devices, and said terminal device comprising (1) a second interface which receives said command sent out from said computer via said network, (2) control means for performing control so as to execute said command received via said second interface, and (3) a second memory which is referenced by said second interface and which stores said node unique ID unique to said device to be transmitted to said computer;
a first memory for storing a list carrying said node unique ID or a name designating said terminal device in corresponding relationship to said node number; and
converting means for creating said list and storing the same in said first memory at the time of the first reset, and for updating said list for each reset thereafter, and wherein:
when said first interface sends the command for requesting said node unique ID into said network,
said second interface returns said node unique ID to said first interface via said network in response to said command,
said first interface receives said node unique ID sent out from said second interface via said network, said converting means creates or updates said list by using said node unique ID received from said each terminal device, and correspondence between each node and each terminal device is obtained by referencing said list.

18. A computer according to claim 16, wherein said network is connect by an IEEE 1394 bus.

19. A program recording medium having a program recorded thereon for causing a computer to implement the functions of the computer described claim 16.

20. A terminal device which uses a system comprising a computer connected to a network and a plurality of terminal devices connected to the network, said terminal device comprising:

a second interface which receives a command sent out via said network from said computer having (1) input means for inputting an automatically assigned node number other than a node number of said computer and (2) a first interface which sends out into said network a command for operating or stopping an operation of said terminal device while sequentially changing said node number input by said input means; and a control means for performing control so as to execute said command received via said second interface, wherein said command with said node number is sent to said terminal device via said network, said computer monitors said operating or said stopping of the operation and recognizes a correspondence between the node number sent out together with said command and a timing of said control means operating or stopping the operation based on the timing of the command thus sent out, and by performing said monitoring and said recognizing for each sequentially changed node number, a correspondence between a plurality of node numbers and said plurality of terminal devices is acquired from said recognition.

21. A terminal apparatus according to claim 20, further comprising illuminating means, wherein said operating or said stopping of the operation, respectively, turns on or turns off said illuminating means.

22. A terminal device which uses a system comprising a computer connected to a network and a plurality of said terminal devices connected to said network, said terminal device comprising:

a second interface which, when said network is reset, receives a command sent out via said network from said computer having (1) a first interface which sends out into said network a command for requesting a node unique ID to said terminal device, while sequentially changing a node number as a destination ID or by appending to said command a description as a destination ID indicating delivery to all connected devices, (2) a first memory for storing a list carrying said node unique ID or a name designating said terminal device in corresponding relationship to said node number, and (3) converting means for creating said list and storing the same in said first memory at the time of a first reset, and for updating said list for each reset thereafter;

control means for performing control so as to execute said command received via said second interface; and a second memory which is referenced by said second interface and which stores its own node unique ID to be transmitted to said computer, and wherein:

when said first interface sends the command for requesting said node unique ID into said network, said second interface returns said node unique ID to said first interface via said network in response to said command, said first interface receives said node unique ID sent out from said second interface via said network, said converting means creates or updates said list by using said node unique ID received from each terminal device, and correspondence between said each node and said each terminal device is obtained by referencing said list.

23. A terminal device according to claim 20, wherein said terminal device is a home VCR.

24. A terminal device according to claim 20, wherein each of said plurality of node numbers is a device number used instead of said node number.

25. A terminal device according to claim 20, wherein said network is connect by an IEEE 1394 bus.

26. A program recording medium having a program recorded thereon for causing a computer to implement the functions of the terminal device described in claim 20.

* * * * *

UNITED STATES PATENT AND TRADEMARK OFFICE
CERTIFICATE OF CORRECTION

PATENT NO. : 7,246,180 B1
APPLICATION NO. : 09/744885
DATED : July 17, 2007
INVENTOR(S) : Junji Yoshida et al.

Page 1 of 1

It is certified that error appears in the above-identified patent and that said Letters Patent is hereby corrected as shown below:

Title Page, Item (54) Title
Change "CONNECTION-CONFIRMABLE INFORMATION PROCESSING SYSTEM, CONNECTION-CONFIRMABLE INFORMATION PROCESSING APPARATUS, INFORMATION PROCESSING METHOD BY WHICH CONNECTION IS CONFORMABLE, RECORDER, RECORDING SYSTEM, RECORDING METHOD, METHOD FOR RECOGNIZING CORRESPONDENCE BETWEEN NODE AND TERMINAL, COMPUTER, TERMINAL, AND PROGRAM RECOR" to -- CONNECTION-CONFIRMABLE INFORMATION PROCESSING SYSTEM, CONNECTION-CONFIRMABLE INFORMATION PROCESSING APPARATUS, INFORMATION PROCESSING METHOD BY WHICH CONNECTION IS CONFIRMABLE, RECORDER, RECORDING SYSTEM, RECORDING METHOD, METHOD FOR RECOGNIZING CORRESPONDENCE BETWEEN NODE AND TERMINAL, COMPUTER, TERMINAL, AND PROGRAM RECOR --

Title Page, Item (30) Foreign Application Priority Data
Change "March 19, 1999   (JP)           11/059412" to
-- March 5, 1999   (JP)           11/059412 --

Column 49
Line 24, change "slaved" to -- played --

Signed and Sealed this

Eighteenth Day of December, 2007

JON W. DUDAS
*Director of the United States Patent and Trademark Office*